United States Patent
Simon et al.

(10) Patent No.: US 12,202,679 B2
(45) Date of Patent: Jan. 21, 2025

(54) CASED GOODS INSPECTION SYSTEM AND METHOD THEREFOR

(71) Applicant: Symbotic Canada, ULC, Lafontaine Montreal (CA)

(72) Inventors: Christian Simon, Laval (CA); William Légaré, Terrebonne (CA); Samy Metari, Montreal (CA); Alexandre Dumais, Montreal (CA)

(73) Assignee: Symbotic Canada, ULC (CA)

( * ) Notice: Subject to any disclaimer, the term of this patent is extended or adjusted under 35 U.S.C. 154(b) by 0 days.

(21) Appl. No.: 18/420,218

(22) Filed: Jan. 23, 2024

(65) Prior Publication Data
US 2024/0166450 A1 May 23, 2024

Related U.S. Application Data

(63) Continuation of application No. 17/648,171, filed on Jan. 17, 2022, now Pat. No. 11,878,873.

(60) Provisional application No. 63/287,631, filed on Dec. 9, 2021, provisional application No. 63/138,946, filed on Jan. 19, 2021.

(51) Int. Cl.
  *B65G 43/08* (2006.01)

(52) U.S. Cl.
  CPC ...... *B65G 43/08* (2013.01); *B65G 2201/0238* (2013.01); *B65G 2203/0233* (2013.01); *B65G 2203/041* (2013.01)

(58) Field of Classification Search
  CPC ............ B65G 43/08; B65G 2203/0233; B65G 2203/041; B65G 2201/0238
  See application file for complete search history.

(56) References Cited

U.S. PATENT DOCUMENTS

| | | |
|---|---|---|
| 11,126,950 B2 | 9/2021 | Barber et al. |
| 2010/0082152 A1 | 4/2010 | Mishra et al. |
| 2011/0043802 A1 | 2/2011 | Johnson et al. |
| 2017/0213334 A1 | 7/2017 | Ducharme et al. |

FOREIGN PATENT DOCUMENTS

| | | |
|---|---|---|
| CA | 3029218 | 1/2018 |
| CN | 102232222 | 11/2011 |
| CN | 107430719 | 12/2017 |
| EP | 0330495 | 8/1989 |
| JP | 2007298472 A | * 11/2007 |
| JP | 2011137739 | * 7/2011 |

* cited by examiner

*Primary Examiner* — Gene O Crawford
*Assistant Examiner* — Lester Rushin, III
(74) *Attorney, Agent, or Firm* — Perman & Green, LLP

(57) ABSTRACT

An inspection apparatus, for inspection of cased goods, includes at least one conveyor, at least one camera for capturing case image data of each of the cased goods advanced with the at least one conveyor past the inspection apparatus, and a processor configured to receive the case image data from the at least one camera. The processor is configured to characterize, from the case image data, a case exterior protrusion of the case good as a case flap in open condition, wherein the processor is configured to resolve the case image data and determine the case exterior protrusion is a coherent planar surface, and is programmed with a parameter array of physical characteristic parameters that describe case flap coherency attributes determinative of the coherent planar surface defining an open case flap condition.

24 Claims, 36 Drawing Sheets

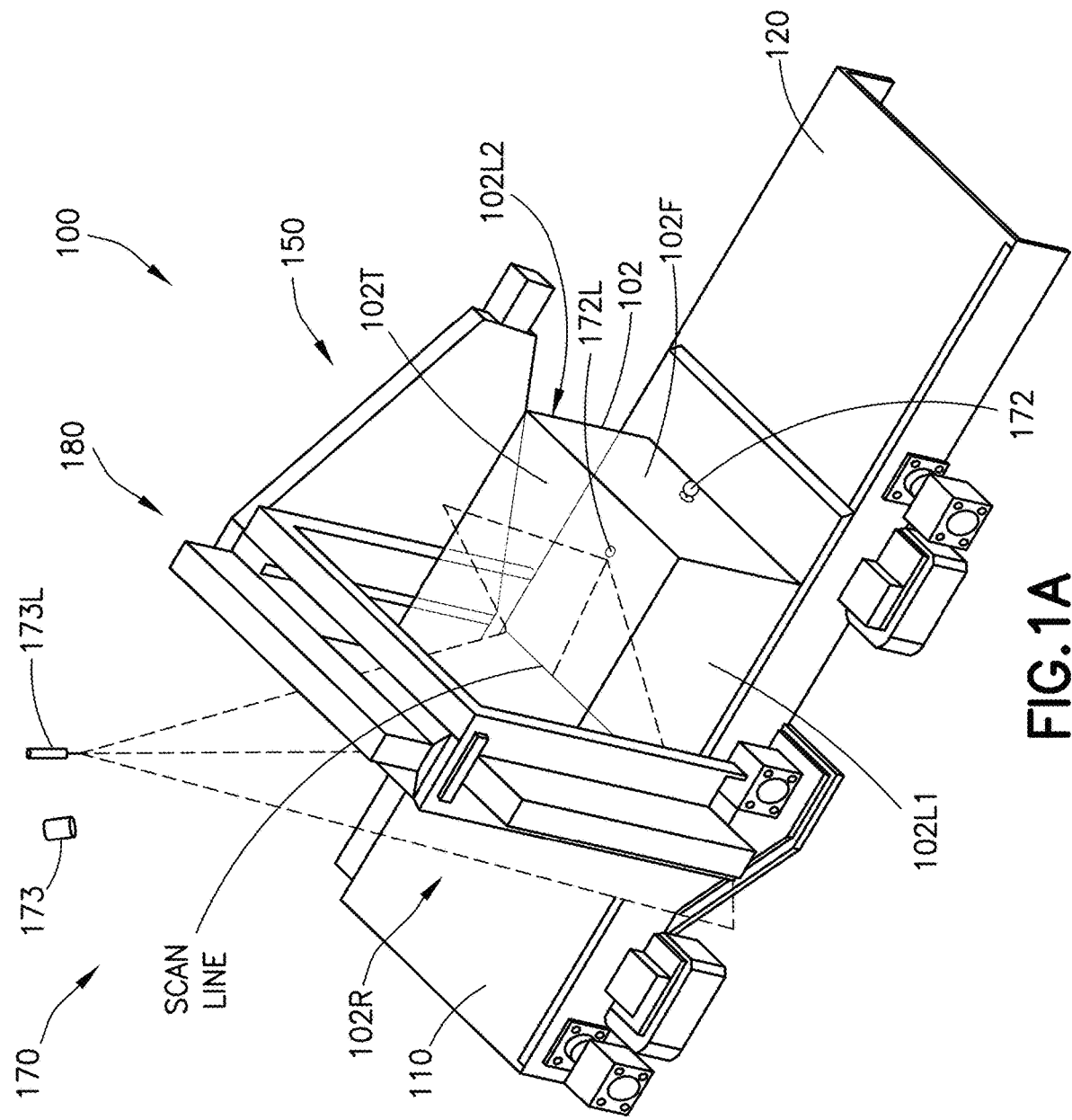

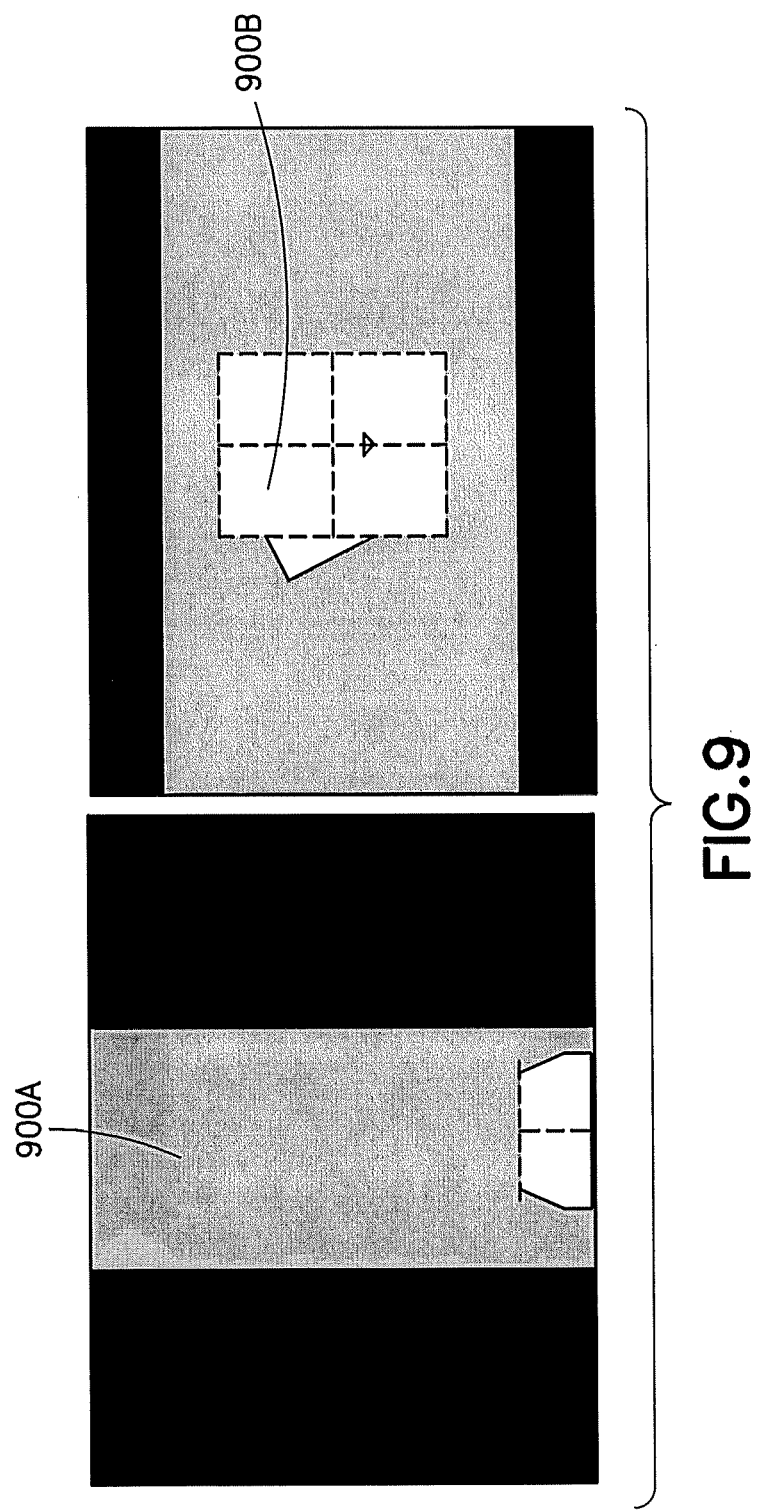

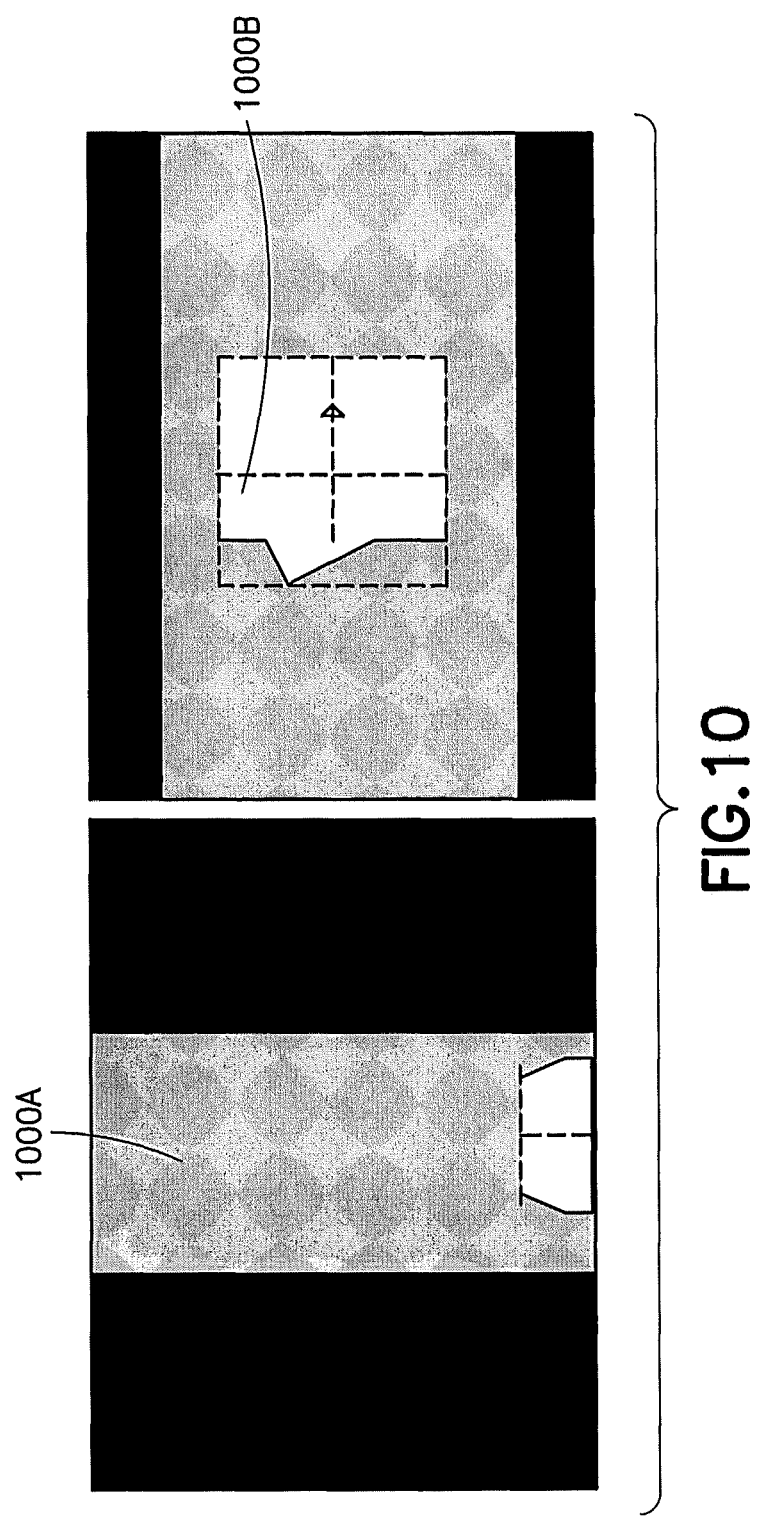

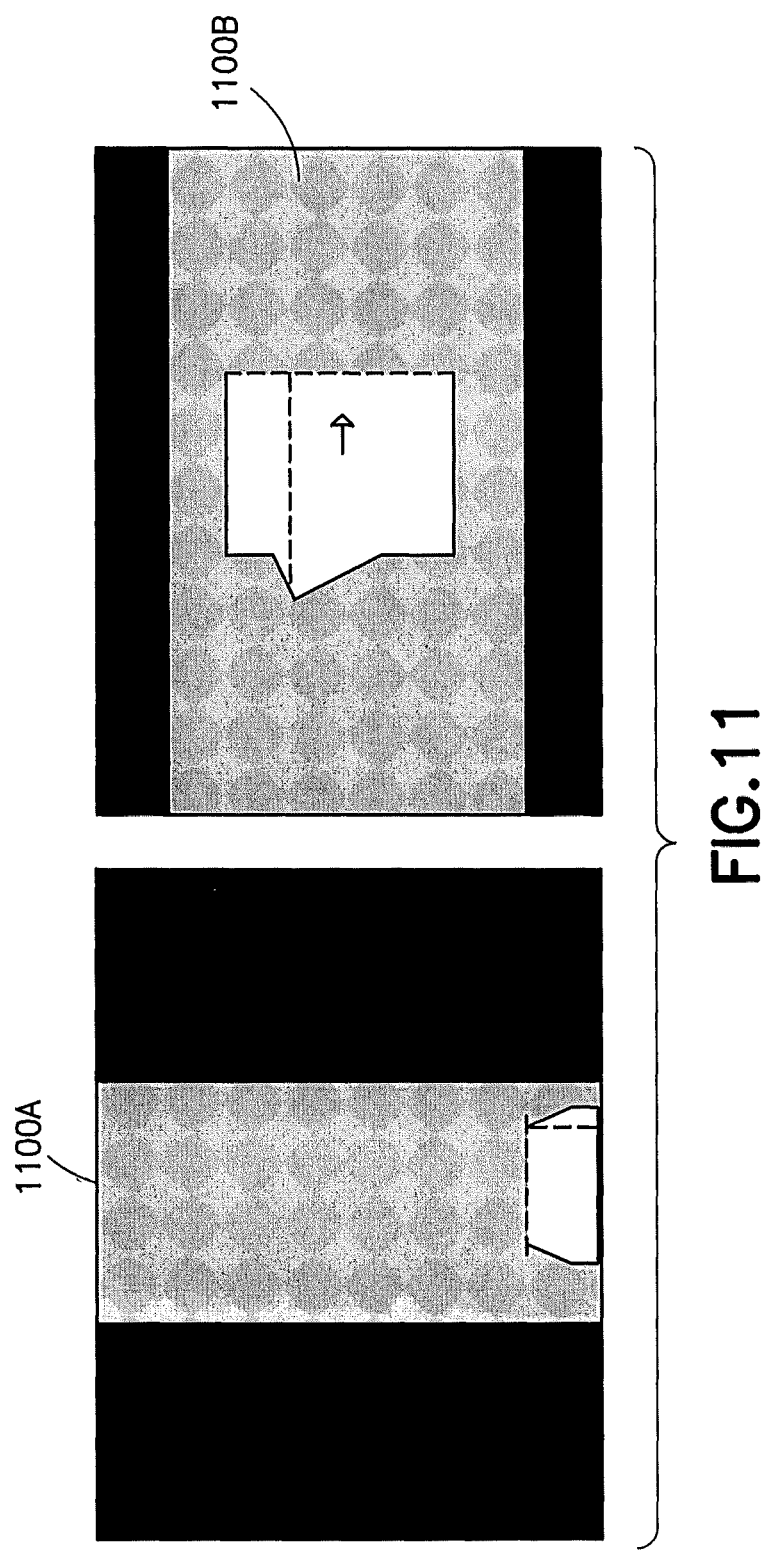

CASED GOODS INSPECTION SYSTEM AND METHOD THEREFOR

CROSS-REFERENCE TO RELATED APPLICATIONS

This application is a continuation of U.S. application Ser. No. 17/648,171, filed on Jan. 17, 2022, (Now U.S. Pat. No. 11,878,873), which is non-provisional of and claims the benefit of United States provisional patent application Ser. No. 63/287,631, filed on Dec. 9, 2021, and U.S. Ser. No. 63/138,946, filed on Jan. 19, 2021, the disclosures of which are incorporated herein by reference in their entireties.

BACKGROUND

1. Field

The aspects of the disclosed embodiment relate to product inspection, and in particular to cased goods inspection systems and methods therefor.

2. Background

There is a need to improve cased goods inspection systems and methods.

Generally, cased goods inspection systems include LED (light emitting diode) array (curtain) lighting. The LEDs in these arrays have a considerable spacing between them (greater than 5 mm), so they only produce a 'sampled' image, instead of imaging the cased goods completely. Other approaches use a laser triangulation method, which is fast, precise and robust, but is sensitive to reflective surfaces like shrink wraps. Some cased goods inspection systems employ image comparisons to detect features (such as open flaps) of the cased goods where numerous images of cased goods having known/predetermined configurations are used for the feature detection. Other cased good inspection systems employ laser scanners to detect features (such as open flaps) of the cased goods.

BRIEF DESCRIPTION OF THE DRAWINGS

The foregoing aspects and other features of the disclosed embodiment are explained in the following description, taken in connection with the accompanying drawings, wherein:

FIGS. 1, 1A, 1B, and 1C are schematic illustrations of a case inspection system in accordance with the aspects of the disclosed embodiment;

FIGS. 9, 9A, 9B, and 9C are schematic diagrams illustrating in side and top views real box product measurements obtained by the processes of FIGS. 3 and 7 in accordance with aspects of the disclosed embodiment;

FIG. 10 is a schematic diagram illustrating in side and top views outside box product measurements obtained by the processes of FIGS. 3 and 7 in accordance with aspects of the disclosed embodiment;

FIG. 11 is a schematic diagram illustrating in side and top views max bulge measurements obtained by the processes of FIGS. 3 and 7 in accordance with aspects of the disclosed embodiment.

DETAILED DESCRIPTION

It is noted that similar features bear similar labels throughout the drawings. It is also noted that references to "top" and "bottom" qualifiers (and other spatial qualifiers) made herein are made solely with reference to the orientation of the drawings as presented in the application and do not imply any absolute spatial orientation.

Figure 1:
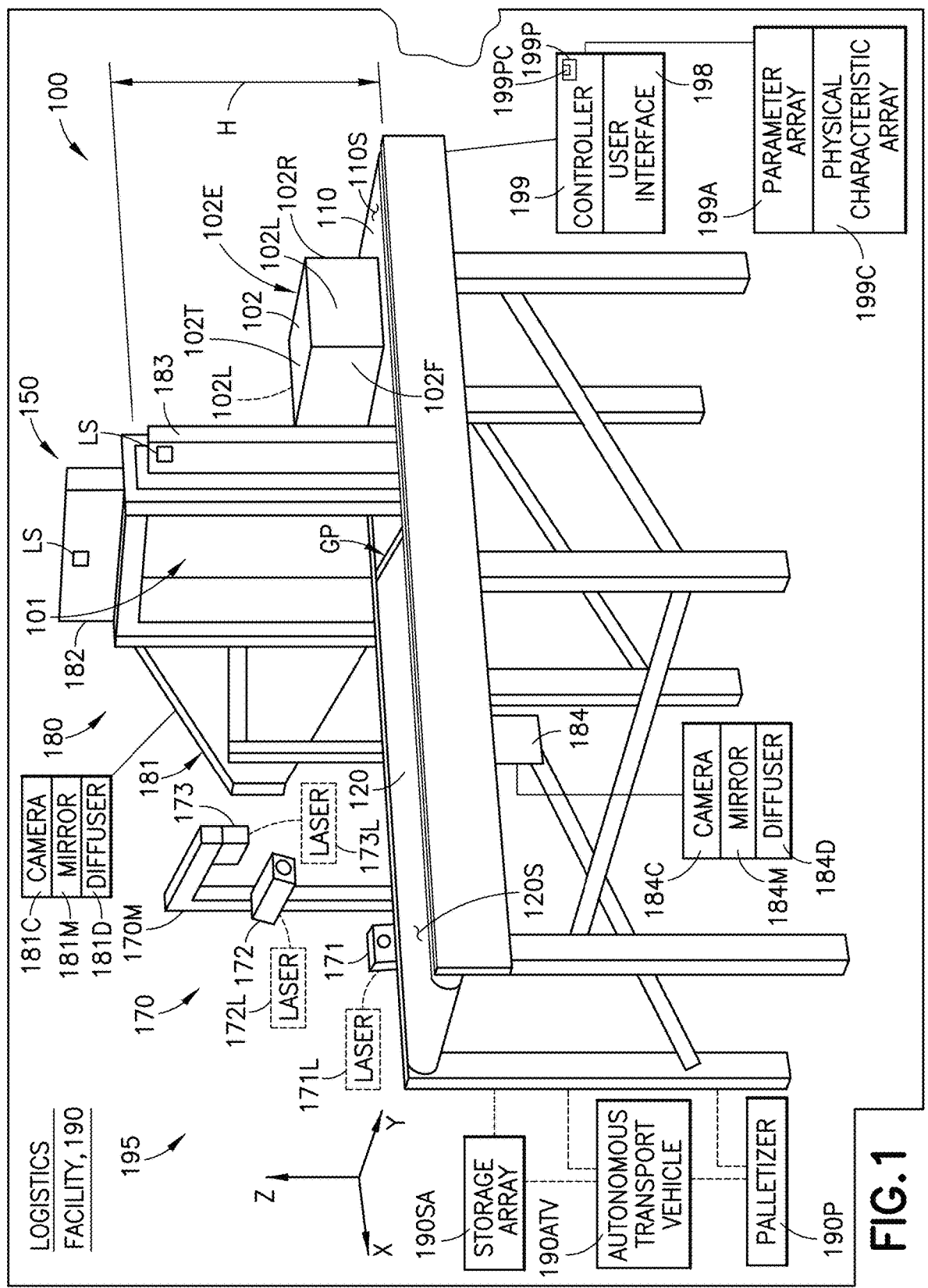

FIG. 1 illustrates an exemplary cased goods inspection system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Figure 2A:
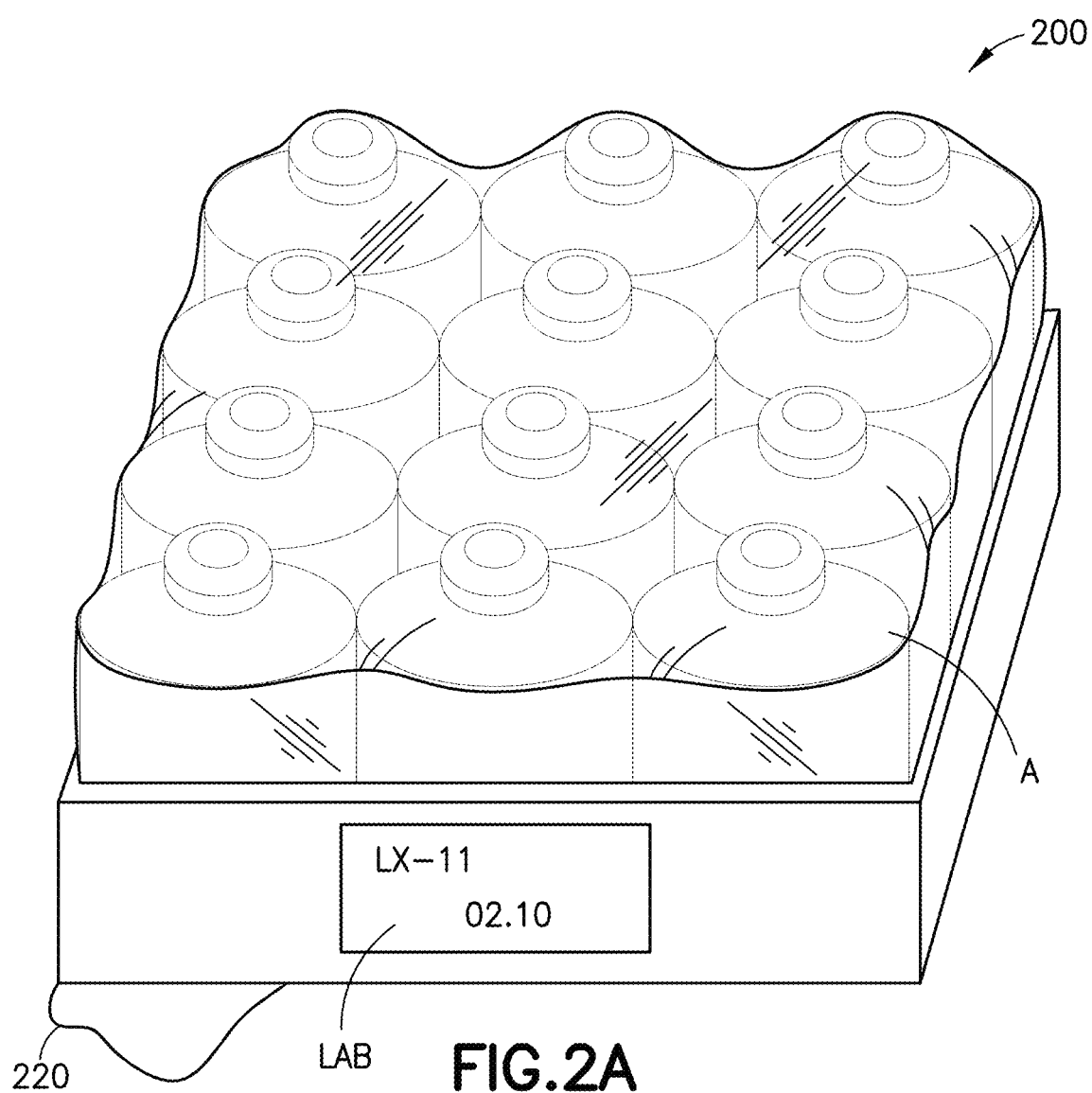
FIGS. 2A and 2B are schematic illustrations of a perspective view of an example of a product case inspected in accordance with aspects of the disclosed embodiment.
Figure 2B:
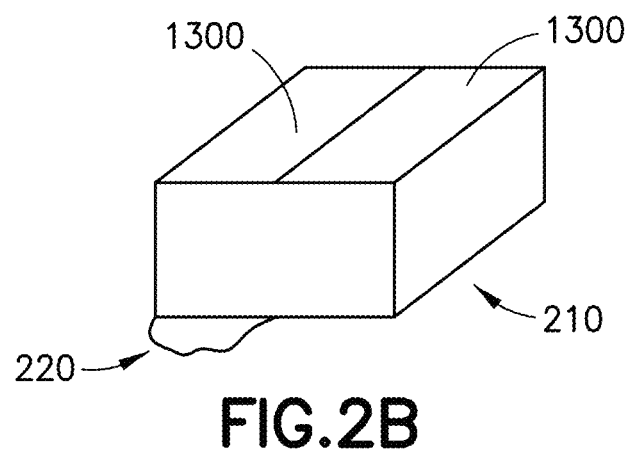

One example of a cased good (s) that is/are handled by the cased goods inspection system 100 is a shrink wrapped product 200 that includes a product container or array of one or more product containers or product (s) included in shrink wrap as illustrated in FIG. 2A. Another example of a cased good (s) is a boxed product 210 (such as a cardboard box or other suitable shipping container), as illustrated in FIG. 2B, that encloses a product container or an array of one or more product containers or uncontained product (s) therein. The term "product" should be construed herein as including any type of consumer good (s) in any type of packaging, such as, without limitations, closed cartons, totes, open top cartons, trays with or without shrink wrapped film, bags and pouches, etc. (i.e., the terms "products" and cased goods is inclusive of the shrink wrapped product 200 and the boxed product 210). The dimensions of the product (s)/case (s) 102 (generally referred to herein as products or cased goods) received (e.g., input products) by the cased goods inspection system 100 may vary greatly between different types of product. For exemplary purposes only typical dimensions (W×L×H) can be between about 4 in×4 in×2 in (about 10 cm×10 cm×5 cm) and about 25 in×30 in×30 in (about 63 cm×76 cm×76 cm). Though the example in FIGS. 2A and 2B are illustrated as having a general hexahedron shape, the product (s) and/or product case may have any desired three-dimensional shape such as cylindrical, curvilinear, pyramidal, ovoid, etc., and one or more surface (s) of any side may be curved or pitched with respect to another side or another surface on the same side. As will be described in greater detail below, one or more of the products 102 include flaps, which can be folded to close an opening of the product container. The aspects of the disclosed embodiment provide for at least detection of these flaps with the flaps in an open or partially open configuration.

The cased goods inspection system or apparatus 100 includes at least one input conveyor 110, at least one output conveyor 120, a vision system 150, a controller 199, and a user interface 198 (see FIGS. 8-12 for exemplary user interface 198 output). The cased goods inspection system 100 forms, at least in part, or is otherwise included in an inbound conveyor system 195 for induction of cased goods 102 into a logistics facility 190, where at least one of the conveyors 110, 120 is configured to advance cased goods 102 into the logistics facility 190. For exemplary purposes only, the cased goods inspection system 100 is in communication with at least one conveyor 110, 120 and receives the cased goods 102 which arrive individually on input conveyor 110 in any orientation and position, where the cased goods 102 are transferred from the input conveyor 110 to the output conveyor 120 as described herein. The output of the cased goods inspection system 100 includes various (quantitative) measurements which characterize each cased goods, for example a case of goods. Examples of quantitative measurements include: "real box", "max box", "max bulge", "orientation angle", "distance from one side of the conveyor", open flaps, concavity (e.g., inward bulge), etc.

The at least one input conveyor 110 is configured to advance the cased goods 102 past the cased goods inspection system 100 (also referred to herein as the "cased goods inspection apparatus 100"). For example, the at least one input conveyor 110 is one or more of a conveyor belt (e.g., mat top high-grip conveyor), roller conveyor, or any other suitable product conveyance configured to transport incoming cased goods 102 from any suitable equipment (e.g., automated or otherwise) or warehouse worker (e.g., human). The at least one input conveyor 110 is configured to move cased goods 102 into and through the vision system 150 with minimized vibration and slippage (e.g., the vibration and slippage are below any suitable predetermined thresholds for vibration and slippage which may depend on the resolution of the vision system 150 components). The at least one output conveyor 120 is substantially similar to the at least one input conveyor 110 and transports the cased goods 102 away from the vision systems 150, 170 to any suitable destination including suitable product handling equipment located downstream of or process-wise after the cased goods inspection system 100.

Referring to FIGS. 1 and 1A-1C, the vision system 150 is positioned (e.g. mounted), at least in part, around and about the conveyors 110 and/or 120 for viewing and measuring characteristics of the cased goods 102 (noted above) advanced with the conveyor (s) 110, 120 past the cased goods inspection system 100. As described herein, the vision system 150 includes at least one camera (such as for example, at least one sensor/imaging device 171-173) arranged to capture case image data of each of the cased goods 102 advanced with the at least one input conveyor 110 past the cased goods inspection system 100.

Figure 1B:
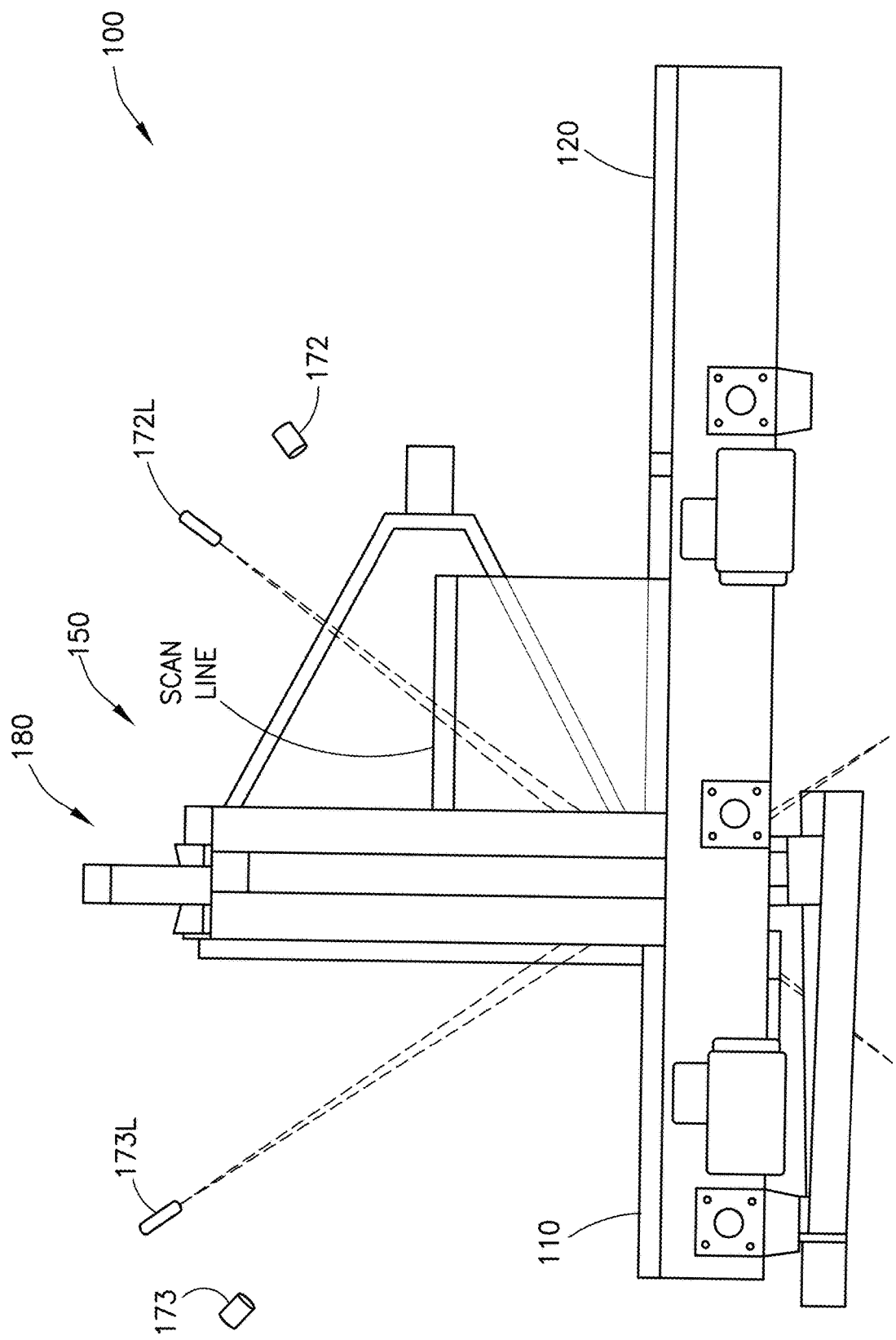
Figure 1C:
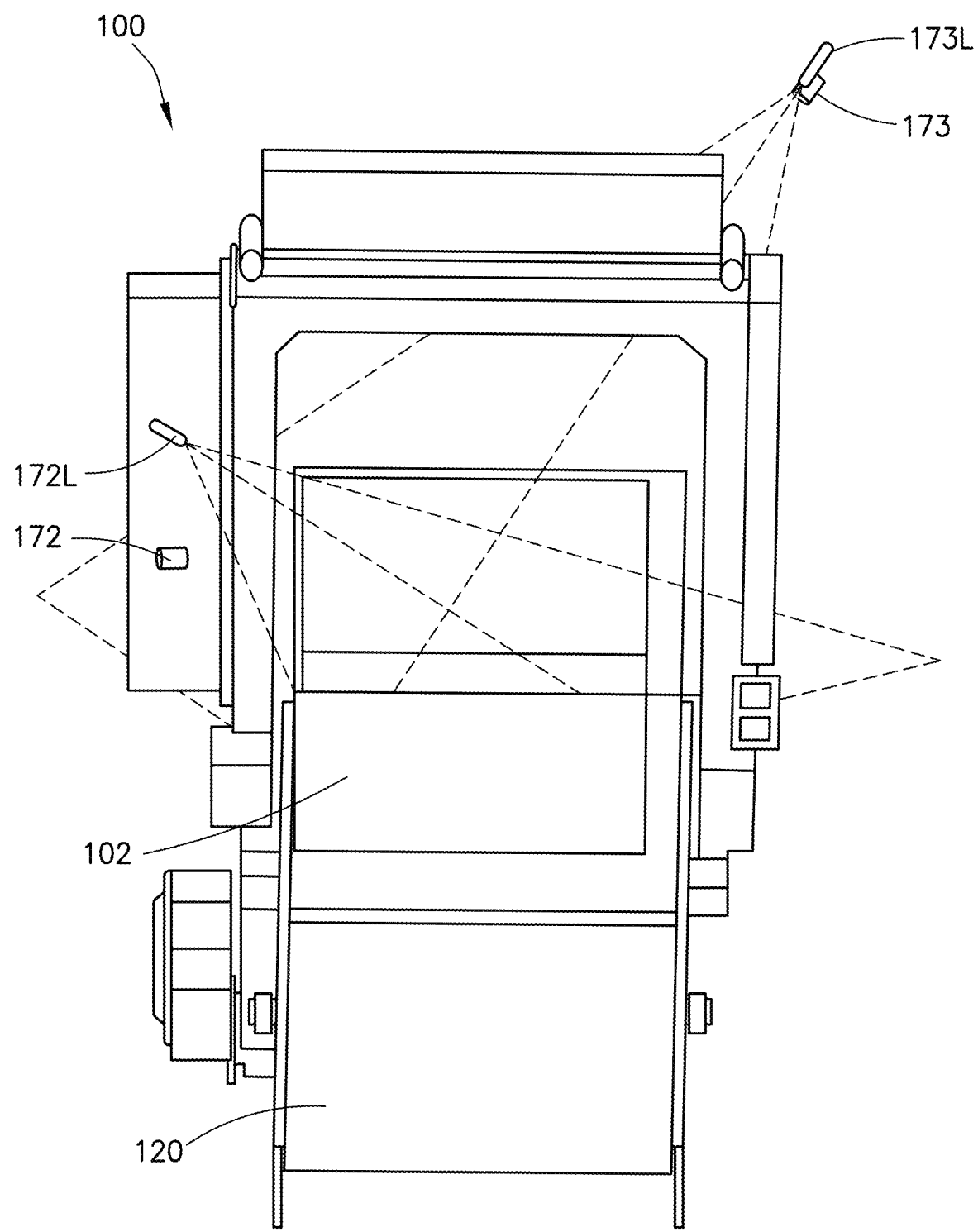

In accordance with the aspects of the disclosed embodiment the vision system 150 includes at least a flap detection system 170 (also referred to herein as an "imaging system" or "detection system") that includes at least one sensor/imaging device 171-173 (referred to herein as sensors 171-173) for detecting open flaps (or otherwise effecting a detection of an open flap), bulges, and/or concavities of the cased goods 102. The sensors are any suitable sensors configured to detect/sense at least flaps, bulges, and/or concavities of the cased goods 102 and include but are not limited to cameras (three are illustrated for exemplary purposes only and it should be understood that there may be more or less than three cameras), laser detection systems, or any other suitable optical or sonic detection system for detecting the flaps of the cased goods 102. The sensors 171-173 may be any suitable cameras such as for example, three-dimensional cameras including but not limited to time-of-flight cameras or any other suitable three-dimensional imaging camera. In one or more aspects of the disclosed embodiment the sensors 171-173 are positioned adjacent one or more of the conveyors 110, 120 for detecting open flaps, bulges, and/or concavities of the cased goods 102 as will be described in greater detail below. As can be seen in FIGS. 1A-1C, in one or more aspects of the disclosed embodiments the flap detection system 170 includes lasers, where each sensor 171-172 (only two cameras are illustrated in FIGS. 1A-1C for exemplary purposes and it should be understood that more or less than two cameras may be provided) is paired with a laser 172L, 173L (noting that sensor 171 may also be paired with a laser 171L that is not illustrated in FIGS. 1A-1C for clarity). The lasers 171L 172L, 173L are configured to emit a sheet of illumination that provides a respective scan line on the cased goods 102 where the scan line illuminates a profile of the cased goods 102. The illumination of the profile with the scan line, in one or more aspects, facilitates (e.g., through image recognition of case image data from the sensors 172, 173) detection of open flaps, bulges and/or concavities of the cased goods 102. In still other aspects, one or more of the sensors 171-173 is/are paired with a respective laser while other sensor (s) 171-173 do not have an associated laser. In one or more aspects, the lasers 171L, 172L, 173L are substantially similar to light sources 182, 183 described herein.

The vision system 150 may further include another imaging system (e.g., a profile detection system 180, also referred to as a case inspection system or station) that is separate and distinct from the at least one sensor 171-173 of the flap detection system 170. The profile detection system 180 images the cased goods 102, separate and distinct from the at least one sensor 171-173 imaging of the cased goods 102, for inspection of the cased goods other than detection of the concavity condition. The profile detection system 180 may be substantially similar to that described in U.S. patent application Ser. No. 15/416,922 filed on Jan. 26, 2017 (and titled "Cased Goods Inspection System and Method", now U.S. Pat. No. 10,946,007), the disclosure of which is incorporated herein by reference in its entirety.

The profile detection system 180 includes at least one sensor/imaging device 181, 184 positioned adjacent one or more of the conveyors 110, 120 and configured to detect/ sense the top and side profiles of the products 102. The at least one sensor/imaging device 181, 184 of the profile defection system 180 is configured so as to capture an image of a shadow of each of the cased goods 102 advanced past the case inspection station 100 as described herein. The at least one sensor (s) 181, 184 of the profile detection system 180 is/are separate and distinct from the flap detection system 170 and the profile detection system 180 images the cased goods 102, separate and distinct from the at least one sensor 171-173 of the flap detection system 170, for inspection of the cased goods 102 other than the detection of the open case flaps.

Here, the profile detection system 180 images the cased goods 102 for controller 199/processor 199P validation of identity of each of the cased goods 102 (e.g., with a predetermined or expected identity of each of the cased goods) and conformity of each of the cased goods 102 with (e.g., predetermined or expected) case size parameters for the validated cased good 102.

In accordance with aspects of the disclosed embodiment, the profile detection system 180 includes a first light source 182 which emits a first sheet of light, e.g. a continuous plane of substantially parallel/collimated light, within a small gap GP between conveyors 110 and 120. For example first light source 182 can be located above conveyors 110, 120 as otherwise shown in FIG. 1 or below the conveyors 110, 120. In one or more aspects, the first light source 182 may be common to (i.e., shared between) both the profile detection system 180 and the flap detection system 170 (e.g., the first light source may serve as one of the lasers 172L, 173L described above or vice versa).

The profile detection system 180 further includes a first camera system 184 located for example opposite first light source 182 with respect to conveyors 110, 120. The first camera system 184 is positioned to receive the parallel/ collimated light emitted by first light source 182 through, for example, the gap GP. For example where the first light source 182 is located above conveyors 110, 120, the first camera system 184 is located below conveyors 110 and 120. In other aspects, the orientation of first light source 182 and first camera system 184 may be rotated as desired about the axis defined by the direction of travel of conveyors 110, 120 maintaining the relationship between light source 182 (e.g., light emitter) and camera system 184 (e.g., light receiver).

A second light source 183 emits a second sheet of light, i.e. a continuous plane of substantially parallel/collimated light, over the small gap between conveyors 110, 120. For example second light source 183 can be located on one side of conveyors 110, 120 (transmission of the parallel/collimated light beams of the second sheet being substantially (orthogonal to the continuous plane of parallel/collimated light of the first sheet of light). In one or more aspects, the second light source 183 may be common to (i.e., shared between) both the profile detection system 180 and the flap detection system 170 (e.g., the second light source may serve as one of the lasers 172L, 173L described above or vice versa).

A second camera system 181 is correspondingly located (e.g. opposite the second light source 183) to receive illumination from the second light source 183 with respect to conveyors 110, 120. The second camera system 181 is positioned to receive the parallel/collimated light emitted by second light source 183. For example, where second light source 183 is located to one side of conveyors 110, 120, the second camera system 181 is located to the other opposite side of conveyors 110, 120.

In accordance with one or more aspects of the disclosed embodiment, at least one light source 182 or 183 can include a light shaper LS made with lenses or mirrors that effects the collimated output beam. The light source is any suitable light source and can include, but is not limited to, one or more of a laser, a light emitting diode (LED), gas lamps, and any other device of electromagnetic radiation suitable for electromagnetic illumination of a target object and which reflection or transmission, of which may be captured by an appropriate imaging system generating an image or pseudo image of the illuminated target object.

The collimated output light beam(s) of the light source (s) 182, 183 provides the sheet (s) of parallel propagating light which, when impeded by the cased good 102, casts an orthographic projection shadow onto an input window of the corresponding camera system 184, 181 opposite the corresponding light source 182, 183. In this regard, the camera system 184, 181 receives an incident collimated input beam output by the corresponding light source.

In the illustrated example, both camera systems 184, 181 include at least a camera, 181C, 184C. The camera systems 184, 181 may also include a mirror 181M, 184M and a diffusion screen 181D, 184D (referred to in the FIGS. as a diffuser). The mirror 181M, 184M is, for example, employed in reducing the footprint of the overall cased goods inspection system by redirecting the sheet of light parallel to the conveyor 110, 120. The diffusion screen 181D, 184D, which may be any suitable type of illumination diffuser, is an example of an input beam shaper spreading the input beam by diffusing the parallel light incident thereon from corresponding light sources 182, 183 so that the corresponding camera 184, 181 (e.g. the camera imaging array having a desired predetermined width, defined structurally or by any suitable controller, such as controller 199, so that the array) can capture and digitize diffused light from the full width of the corresponding light sheet emitted by the light source 182, 183. As may be realized, the camera (s) 184, 181 may image a case (s) and/or products within the full width of the light sheets (which as may be further realized may span the lateral bounds of the conveyor 110, 120 and height H of the inspection system opening 101).

In order to reduce the light footprint or to be able to use a less powerful laser class light source with respect to the flap detection system 170 and the profile detection system 180, smaller sheets of parallel light can be used, with overlap to maintain continuity and cover the larger surface. Any suitable calibration procedure can be used to realign these separate sheets as a single sheet by, for example, software of the controller 199.

As described herein, the at least one sensor/imaging device 171-173 of the flap detection system 170 is connected to the case inspection station 100, separate and distinct from the at least one camera 181, 184. The at least one sensor/imaging device 171-173 is arranged to capture other case image data 1400 of each of the cased goods 102, advanced past the case inspection station 100, than case image data captured by the at least one camera 181, 184. In the example illustrated in FIGS. 1 and 1A-1C, the flap detection system 170 leverages case image data or any other suitable data from the profile detection system 180 as described in greater detail herein. Here, the flap detection system 170 is located downstream, relative to the direction of product travel along the conveyor (s) 110, 120, from the profile detection system 180 (e.g., the products 120 pass through the profile detection system 180 prior to passage through the flap detection system 170); however, in other aspects the flap detection system 170 may be located upstream from the profile detection system 180. The relative positioning of the flap detection system 170 and the profile detection system 180 is such that the flap detection system 170 images one or more exterior sides of the cased goods 102 (in one or more aspects all visible exterior sides not seated against, e.g., the conveyor (s) 110, 120) substantially simultaneously with the profile detection system 180 imaging the cased goods 102 as will be described herein.

Referring to FIG. 1, the flap detection system 170 includes one or more platforms, stanchions, or other suitable supports that are located adjacent to the conveyor (s) 110, 120 and on which sensors/imaging devices 171-173 (and in one or more aspects lasers 171L-173L) are located. It is again noted that while three sensors 171-173 are illustrated in FIG. 1, in other aspects there may be more or fewer than three sensors (such as for example, two sensors illustrated in FIGS. 1A-1C) arranged for imaging all five visible exterior sides of a cased good 102 that is not seated against the conveyor (s) 110, 120. The sensors/imaging devices 171-173 are arranged relative to the conveyors 110, 120 for imaging any suitable number of surfaces of each cased good 102 as the product passes through the flap detection system 170; however, in other aspects, a single sensor/imaging device with suitable prisms or mirrors can also provide the images of the suitable number of surfaces of each cased good 102.

In FIG. 1 the sensors 171-173 are arranged so that each sensor 171-173 images at least one or more respective exterior side of the cased good 102. For example, sensor 171 images a lateral side (and profiles of the longitudinal and top sides) of the cased good 102, sensor 173 images a top (and profiles of the lateral and longitudinal sides) of the cased good 102, and sensor 172 is angled so as to image a lateral side, a top side, and a longitudinal side of the cased good 102. In FIGS. 1A-1C the sensors 172, 173 are angled relative to each other and disposed on opposite sides of the conveyor (s) 110, 120 so as to image both lateral sides, both longitudinal sides, and the top of the cased good 102 (e.g., two sensors image the five visible sides of the cased good 102). In some aspects of the disclosed embodiment, the flap detection system is provided with any suitable lighting (e.g., such as the lasers/collimated light sources described above) that facilitates imaging of the cased goods 102 moving along the conveyor 110, 120. In one aspect, the exposure (e.g., ISO and/or shutter speed) of the sensor/imaging devices 171-173 is such that the cased good 102 moving along the conveyor 110, 120 appears to be stationary and a resulting image of the cased good 102 moving along the conveyor is not blurred, while in other aspects, a "stop motion effect" of the cased good 102 moving along the conveyor 110, 120 may be produced by any suitable strobe lighting.

As noted above, the sensors/imaging devices 171-173 are any suitable sensors/imaging devices such as for example, time-of-flight cameras or any other suitable imager capable of generating, for example, a three-dimensional depth map or point cloud of each cased good 102 travelling along the conveyor 110, 120. In FIG. 1, the sensor/imaging device 172 is positioned adjacent the conveyor 110, 120 to image at least the a leading side 102F of the cased goods 102 (e.g., a front or longitudinal side of each cased good 102 relative to the direction of travel along the conveyor 110, 120—noting that the term "front" is used here for exemplary purposes only and any spatial term may be used). For example, the sensor/imaging device 172 is mounted to stanchion 170M in any suitable manner as to face in a direction substantially opposite the direction of travel along the conveyors 110, 120 so as to image cased goods 102 travelling towards the sensor/imaging device 172. The sensor/imaging device 173 is also mounted on stanchion 170M and is positioned above the conveyors 110, 120 so as to image a plan view of at least a top side 102T of the cased goods 102 travelling along the conveyor 110, 120 (e.g., the "top" side being relative to a side of the cased good 102 seated on the conveyor 110, 120—noting that the term "top" is used here for exemplary purposes only and any spatial term may be used). The sensor/imaging device 171 is mounted on any suitable surface adjacent the conveyor 110, 120 so as to image a lateral side 102L of the cased goods 102 travelling along the conveyor 110, 120. Referring to FIGS. 1A-1C, the sensor 172 is mounted (in a manner similar to that of FIG. 1) so as to be positioned relative to the conveyor (s) 110, 120 for imaging a perspective view of the cased good 102 that includes one lateral side 102L1, the top side 102T, and a trailing or "back" longitudinal side 102R of the cased good 102. The sensor 173 is mounted (in a manner similar to that of FIG. 1) so as to be positioned relative to the conveyor (s) 110, 120 for imaging a perspective view of the cased good 102 that includes the opposite lateral side 102L2, the top side 102T, and a leading or front longitudinal side 102F of the cased good 102. Each of the sensors/imaging devices 171-173 are positioned to produce an image of at least a respective side of the cased goods 102 and, as may be realized, the number of cameras may depend on the particular cased goods being inspected.

As described herein, the at least one camera (e.g., sensor/imaging device 171-173) is arranged to image each exposed case side 102T, 102F, 102R, 102L1, 102L2 of each cased goods 102 advanced with the at least one conveyor 110, 120 past the inspection apparatus 100 so as to image, from a common image of each imaged case side 102T, 102F, 102R, 102L1, 102L2, at least one of a case side concavity condition (or inward variance) and the case exterior protrusion apparent on each imaged case side 102T, 102F, 102R, 102L1, 102L2. The at least one sensor/imaging device 171-173 is arranged to capture the case image data 1400 of each of the cased goods 102 advanced with at least one conveyor 110, 120 past the inspection apparatus 100, so that the case image data embodies at least one of a case side concavity 2300 (also referred to herein as an inward variance—see, e.g., FIG. 23A) and a case exterior protrusion 220 with the at least one of the case side concavity 2300 and the case exterior protrusion 220 apparent on at least one exposed case side 102F, 102R, 102T, 102L1, 102L2 and the at least one exposed case side 102F, 102R, 102T, 120L1, 102L2 is disposed in each exposed case side orientation of the cased goods 102.

In other aspects, the at least one sensor/imaging device 171-173 is arranged to capture the case image data 1400 of each of the cased goods 102 advanced with the at least one conveyor 110, 120 past the inspection apparatus 100, so that the case image data 1400 embodies the concavity condition (or inward variance condition) with the concavity condition apparent on at least one exposed case side 102T, 102L, 102F, 102R (and in some aspects, as described herein, bottom 102B) and the at least one exposed case side is disposed in each exposed case side orientation of the cased goods 102. In addition to or in lieu of case exterior protrusion determination, the at least one exposed case side 102T, 102L, 102F, 102R imaged by the at least one sensor/imaging device 171-173 is disposed so that the concavity condition, resolved from the concavity condition apparent on the imaged at least one exposed case side 102T, 102L, 102R, 102F extends, from the at least one exposed case side 102T, 102L, 102R, 102F, adjacent a conveyor seat surface 110S, 120S on which the cased goods 102 is seated.

The cased goods inspection system 100 includes any suitable controller 199 (which includes any suitable processor 199P such that reference to the controller 199 performing or being configured to perform a task/function describe herein implies processor 199P operation) or any other device or system (local or remote) that includes a computer readable medium having non-transitory computer program code stored thereon that configures the controller 199 to register and analyze case image data from the vision system 150 to calculate desired measurements or other suitable characteristics (as described herein) of the cased goods 102. The controller 199 is operably coupled to the at least one conveyor 110, 120 and communicably coupled to the at least one sensor 171-173, 181, 184 of the vision system 150 in any suitable manner, such as through any suitable wired or wireless connection so as to receive case image data from the at least one sensor 171-173 (see FIGS. 14A-14H for exemplary case image data 1400 from the sensors 171-173), 181, 184 (see FIGS. 5, 6, and 8-11 for exemplary case image data from the sensors 181, 184).

It is noted that the controller 199 (e.g., through processor 199P) is configured so that cased goods inspection based on case good images from the profile detection system 180 is/are resolved separate and distinct from resolving at least one of a case side concavity (also referred to as a case side concavity condition) and an open case flap from the case image data 1400 (see FIGS. 14A-14D) from the at least one sensor 171-173 of the flap detection system 170. The controller 199 is also configured so as to determine the presence of any case side concavity 2300 and any case exterior protrusions 220 (see FIGS. 2A and 2B as well as FIGS. 9-11) of the cased goods 102 from imaging data of the profile detection system 180 separate and distinct from the case image data 1400 captured by the at least one sensor 171-173 of the case detection system 170, and resolve at least one of the case side concavity and the case exterior protrusion 220 as being a respective case side concavity and an open case flap from the case image data 1400 of at least one sensor 171-173 of the flap detection system 170 separate and distinct from images of the profile detection system 180. In one or more aspects, the controller 199 is configured so as to determine a presence of at least one of the case side concavity and the case exterior protrusion 220 from the case image data 1400 captured by the at least one sensor 171-173 of the flap detection system 170, independent of the images of the cased goods 102 captured by the profile detection system 180.

The controller 199 is, in one or more aspects, configured to characterize, from the case image data 1400 generated from a common image (see FIGS. 23B and 23C—e.g., of one of the at least one sensor 171-173 or a combined image from more than one of the at least one sensor 171-173) of the cased goods 102 captured by the at least one sensor 171-173, at least one of case side concavity 2300 (see FIG. 23A, as will be described herein) and the case exterior protrusion 220 of the cased goods 102 as a case flap in an open condition. Here, the at least one exposed case side 102F, 102R, 102T, 102L1, 102L2 imaged by the at least one sensor 171-173 is disposed so that the at least one of the case side concavity 2300 and the case flap in the open condition, resolved from the at least one of the case side concavity 2300 and the case exterior protrusion 220 apparent on the imaged at least one exposed case side 102F, 102R, 102T, 102L1, 102L2 extends, from the at least one exposed case side 102F, 102R, 102T, 102L1, 102L2, adjacent a conveyor seat surface 110S, 120S (FIG. 1) on which the cased goods 102 is seated.

Where the processor is configured to characterize, from the case image data 1400 of the cased goods captured by the at least one sensor 171-173, of at least one case top 102T or at least one case side 102L, 102R, 102F with a concavity condition, the processor 199P is programmed to resolve, from the image data 1400, an inward variance (or concavity) of the at least one case top 102T or the at least one case side 102L, 102R, 120F from predetermined planar coherence characteristics (e.g., such as from expected case dimensions and case good type, e.g., stock keeping unit (SKU) as described herein) of the case top 102T or case side 102L, 102R, 102F. The processor 199P is configured to determine, from the image data 1400, for each resolved inward variance presence a physical characteristic describing the concavity condition of the at least one case top 102T or the at least one case side 102L, 102R, 102F.

Figure 3:
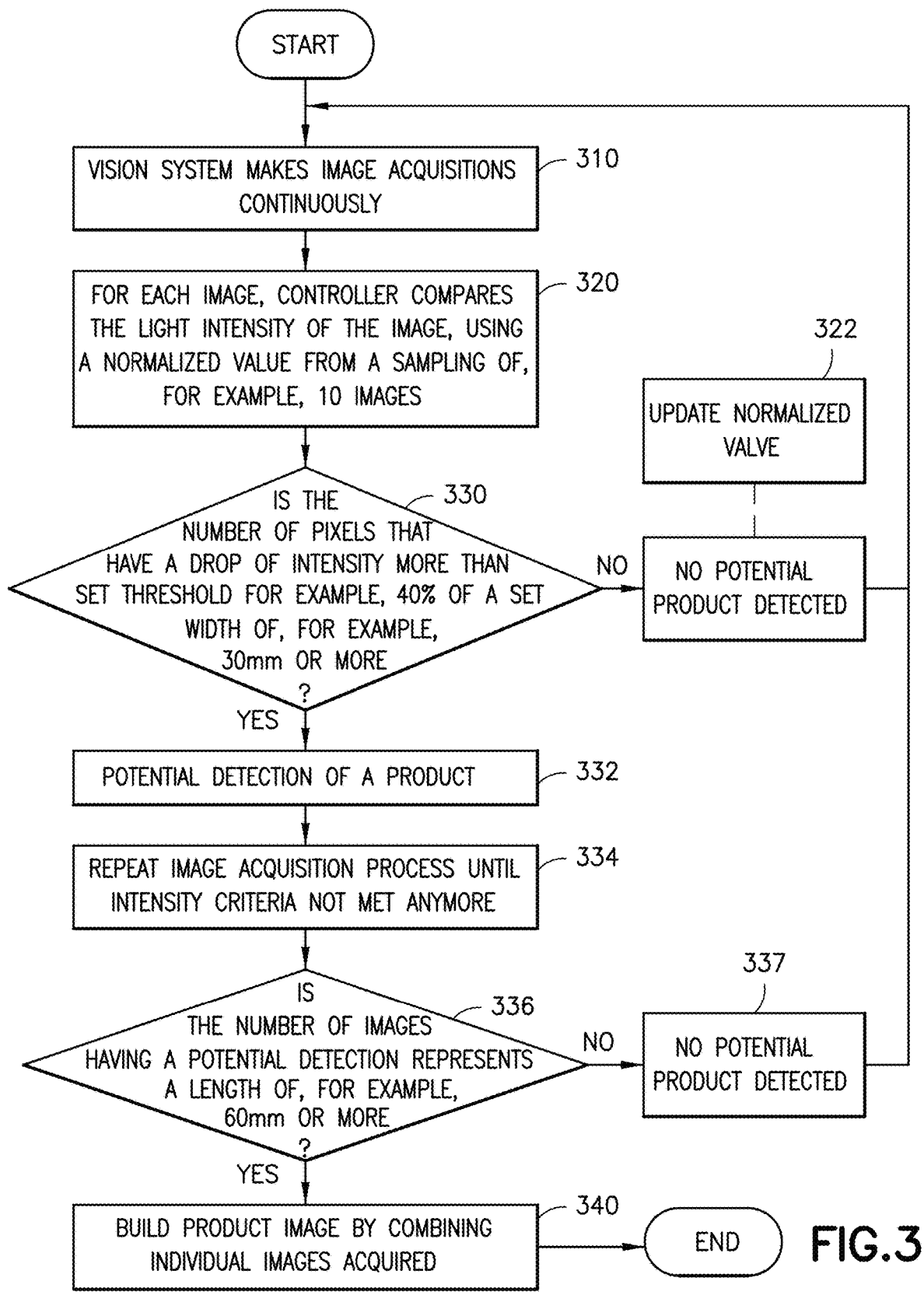
FIG. 3 is a schematic chart illustrating a product detection process flow diagram in accordance with aspects of the disclosed embodiment.

Referring to FIG. 3, an operation of the cased goods inspection system 100 will be described. A cased good 102 arrives on the conveyor 110 in any orientation and position. In one or more aspects, the position of the cased good 102 on the conveyor 110 includes a distance or gap from one side of conveyor 110. FIG. 3 illustrates a product measurement process. The profile detection system 180 makes repeated image acquisitions (FIG. 3, Block 310) into image cache storage (such as of the controller 199 processor 199P), for example triggered by an input conveyor encoder or alternatively by a stepper motor drive circuit advancing at least one of the conveyors 110 and 120.

Figure 4:
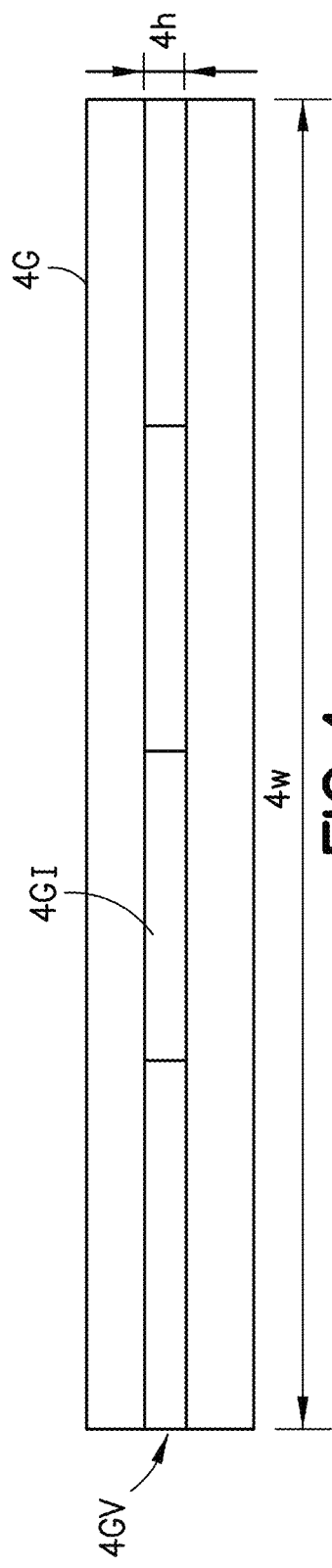
FIG. 4 is a diagram illustrating a general acquired image without product seen by a camera vision system in accordance with aspects of the disclosed embodiment.
Figure 5:
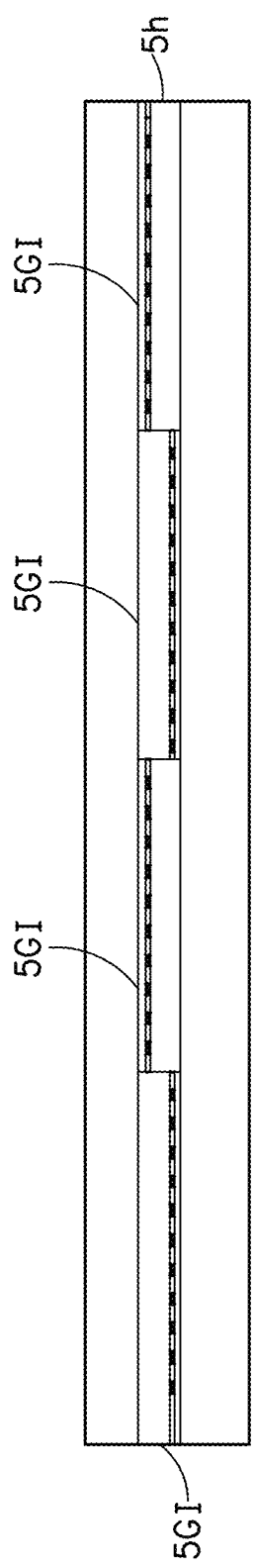
FIG. 5 is a diagram illustrating regions of interest analyzed from the general image illustrated in FIG. 4 in accordance with aspects of the disclosed embodiment.
Figure 6:
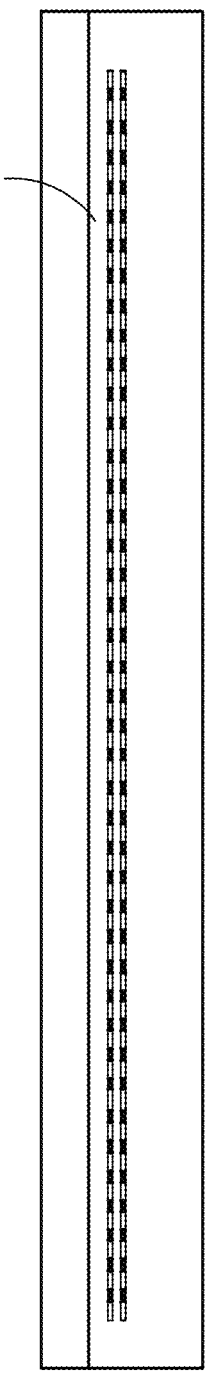
FIG. 6 is a diagram illustrating one analyzed region from FIG. 5 zoomed-in in accordance with aspects of the disclosed embodiment.

FIG. 4 illustrates a representative example of what may be referred to as a raw acquired image obtained (with the imager of the camera of the camera system 181, 184) at a given encoder index value, such as may be generated for four light sources (e.g. as may be used in either light source (s) 182, 183) and one camera system (e.g. camera system(s) 184, 181) implementation. The image includes subregions of illuminated and unilluminated (unexposed) pixels 4GI, 4GV. The image analysis computer program algorithm does not consider the complete acquisition region of the camera image sensor where the pixels are not exposed. Instead, a specific subregion 4GI, for example having a height 4H of 3 pixels and of the complete light sheet width 4W, is considered. FIG. 5 illustrates regions considered 5GI (such as may correspond to such light source), identified with doted rectangles representing registered image subregions 5L, processed the image analyzer. FIG. 6 shows a detail of one specific region 6GI enlarged to better illustrate the region being considered by the image analysis algorithm.

For each acquired image (FIG. 4), the image analysis algorithm compares (FIG. 3, Block 320) pixel light intensity of pixels in the specific region 5h (FIG. 5) being analyzed with a normalized intensity value obtained from a comparable subregion sample, for example from 10 raw baseline sample images. With reference to FIG. 3, the normalizing baseline may be a rolling baseline wherein at each image acquisition step 320 (in which there is no potential detection as will be described), the oldest image in the sample is deleted from registry or erased and replaced by a newly acquire draw image (FIG. 3, Block 322). The number of images used in the baseline sample can be modified. The normalized intensity value can be representative of an ambient lighting level, for example accounting for lighting condition changes in the surrounding environment of the cased goods inspection system, and the presence of dust, liquid residues or small debris on the optical receptor.

Using, for description purposes, the image acquired from the camera system 184 located below the conveyors 110 and 120, the controller 199 verifies (FIG. 3, Block 330) whether the number of pixels in a considered portion of an acquired image (registered by at least one or if desired, acquired images registered by both camera's 184, 181) which have a drop in intensity of more than, for example, about 40% compared to the normalized intensity value, and that represent a width of, for example, about 30 mm (about 1.2 in) or more from the full width of the illumination sheet captured by the acquired image. As may be realized, the width referred to herein as the threshold width of reduced intensity portions of the acquired image may be set as desired based on environmental conditions. The reduced intensity width of the image portion corresponds to and is the result of a spatial intensity reduction caused by sustained, over the duration of acquired image (s), disruption and/or obstruction or block of at least a portion of the input beam(s) forming the illumination sheet, such as due to an object, that may be opaque or translucent in part passing through the beam/sheet. In other words, passage of product, case and/or wrapping through the sheet produces what may also be referred to as a gray level image for at least part of the acquired image width. If this is the case, the controller considers that there is a potential detection (FIG. 3, Block 332) of a product or cased good. The threshold value (both threshold width and threshold intensity variance) of the drop in intensity may be modified as desired (for example intensity drop threshold may be about 10% drop from normalized). As may be realized, both threshold settings are determinative of portion of opaque or translucent material in the illumination sheet, the disruption thereof resulting in a gray image in which such material is both detectable and measurable as will be further described (and the threshold width may be about 5 mm or about 0.2 in). By comparison, a wholly opaque material will reflect resulting in substantially complete obstruction of illumination and consequently in the relevant portion of the, or the graphic projection image.

The above process steps, e.g. FIG. 3, Blocks 310-332 are repeated (FIG. 3, Block 334) as long as the number of pixels in a given acquired image, which have a drop in intensity of more than the predetermined threshold intensity drop (that may also be represented as an absolute intensity value threshold), for example, about 40%, and represents a width greater than the predetermined threshold width of, for example, about 30 mm (about 1.2 in) or more and the process stops when this condition is not true anymore. While this first condition is true (established by exceeding both thresholds), if the number of images that meet this condition represents a potential product length of about 60 mm (about 2.4 in) (as may be determined by a suitable encoder synchronizing acquisition rate, identifying conveyor displacement and rate (e.g., conveyor rate of advance) so as to be correlated or proportional to acquired images and/or image frames) or more, the controller considers that a cased good 102 was detected, or in other words, confirming detection as true (FIG. 3, Block 336) (the potential cased good length for confirmation of cased good may be set more or less, such as about 10 mm (about 0.4 in) of displacement. In this case, the controller 199 combines (with a combiner 199PC (FIG. 1) of the processor 199P) previously acquired upstream images representing, for example, about 60 mm (about 2.4 in) of conveyor displacement (the representative length may be more or less, e.g. about 10 mm or about 0.4 in) in front of the image setting the detection of the detected cased good 102, the number of images in which cased good 120 was detected, and subsequently acquired downstream images representing, for example, about 60 mm (about 2.4 in) of conveyor displacement after the cased good 102 detection assertion, from both camera systems 181 and 184, to construct (FIG. 3, Block 340) a composite contiguous complete combined image of the cased good 102 from the series of images acquired during the aforementioned durations before and after cased good 102 detection (the duration (s) pre and/or post detection) may be varied and need not be symmetrical. If the number of images that meet the first and second conditions (i.e. threshold and duration 330, 336) represent a potential product less than, for example, about 60 mm (about 2.4 in) in width/length, the controller asserts that the detection (FIG. 3, Block 337) was a false detection, or that the detected cased good 102 is below the minimal accepted length/width the image acquisition process continues normally. This system is robust to noise or parasitic signals like falling debris.

As noted, while both conditions are asserted, contiguous construction of the combined image (or pseudo image) of the scanned cased good 102 continues past, for example, about 60 mm (about 2.4 in) until a maximum accepted product dimension is reached. In other words, upon controller 199 determination that acquired image (s) (corresponding to desired conveyor travel, e.g., about 60 mm or 2.4 in) for example, of camera system 184 (through such determination may be effected from acquired images if both cameras 184, 181) no longer satisfies the above noted thresholds (e.g. the considered portion of the acquired images have neither the width nor an intensity drop, greater than the set thresholds (e.g. about 30 mm (1.2 in), about 40% drop)), the controller 199 registers the accepted cased good dimension (such as from the registered conveyor displacement from the encoder coincident with image acquisitions that exceed thresholds). Accordingly, the controller 199 (via suitable programming) effecting raw image acquisition for combination into the scanned cased good combined image may continue for another, for example, about 60 mm (about 2.4 in) after the maximum accepted product dimension was surpassed. It is understood, that the "combined image" (or pseudo image) and the "combined product image" correspond to the relative positions and orientations of illumination sources and include images of substantially orthogonal sides of the cased good such as a side view image (e.g., of one or more lateral side 102L) and a top view image (e.g., of top side 102T).

Figure 7:
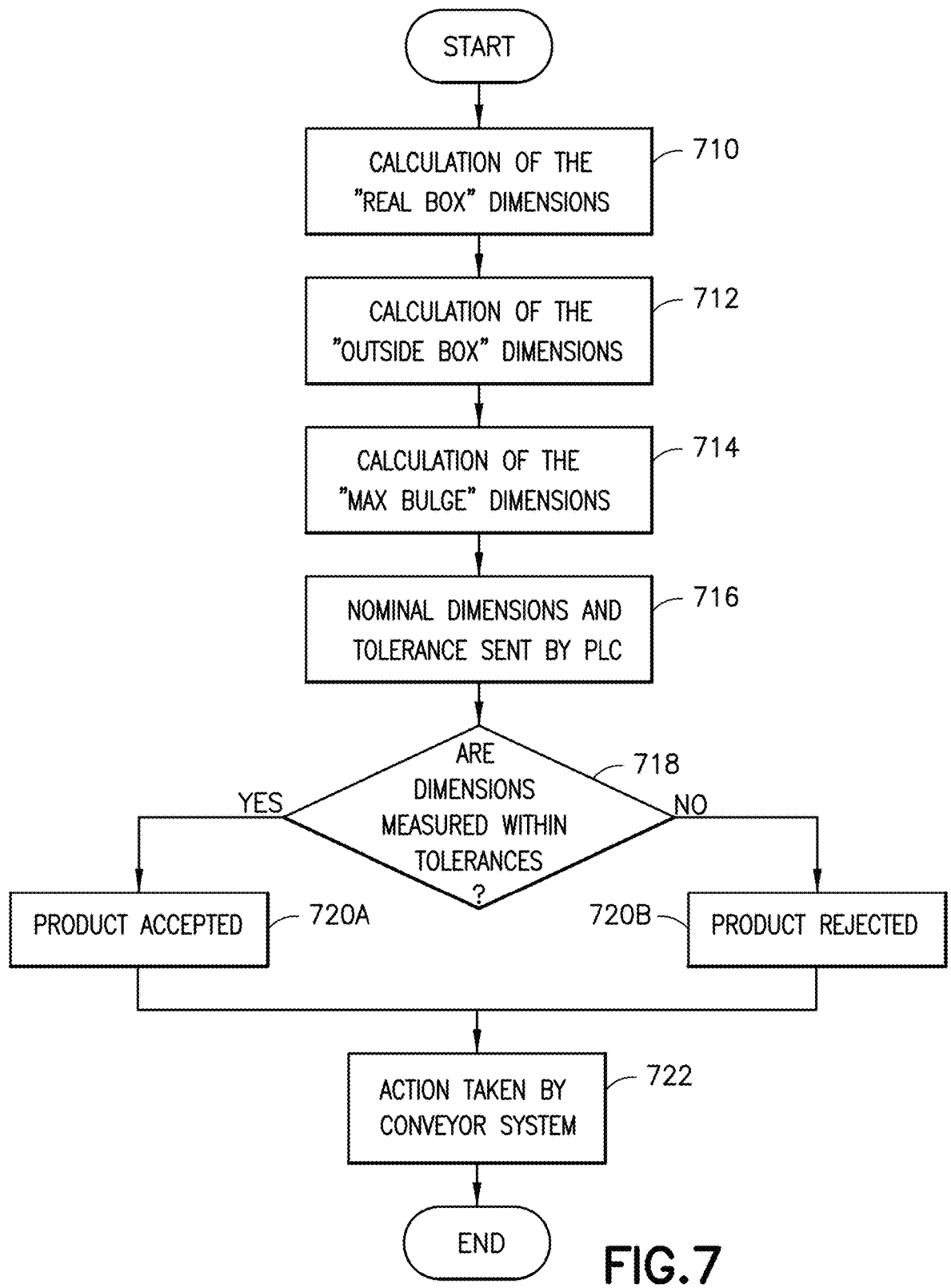
FIG. 7 is schematic chart illustrating a product measurement process flow diagram in accordance with aspects of the disclosed embodiment.
Figure 8:
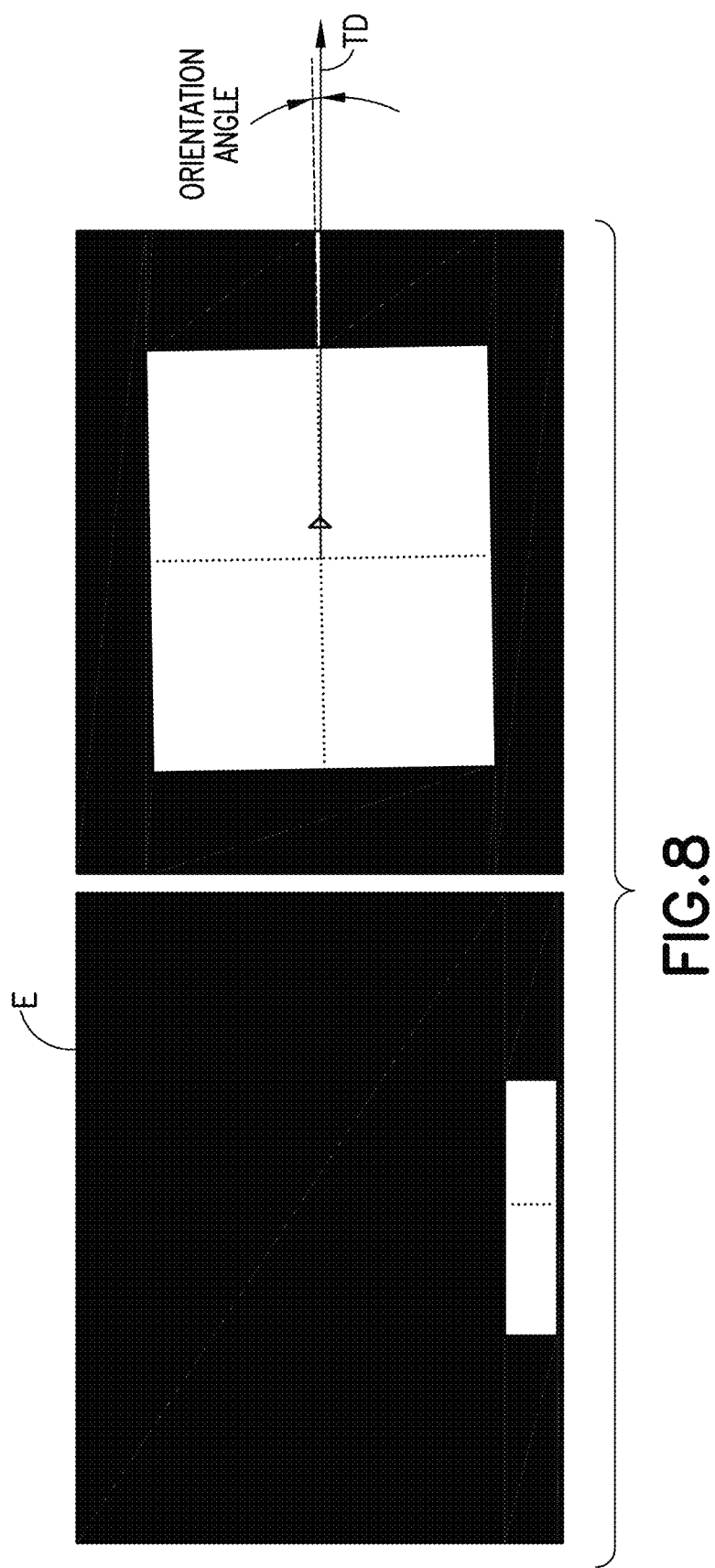
FIG. 8 is a schematic diagram illustrating in side and top views product measurement results obtained by the processes of FIGS. 3 and 7 in accordance with aspects of the disclosed embodiment.

Once, and if desired, substantially coincident with controller 199 processor 199P construct of the composite image (s) of a complete imaged cased good as noted, the controller 199 calculates a variety of quantitative measurements by process steps illustrated in FIG. 7. With reference to FIG. 8, examples of quantitative measurements include: "real box", "max box", "max bulge", "orientation angle" and "distance from one side of the conveyor".

Figure 9A:
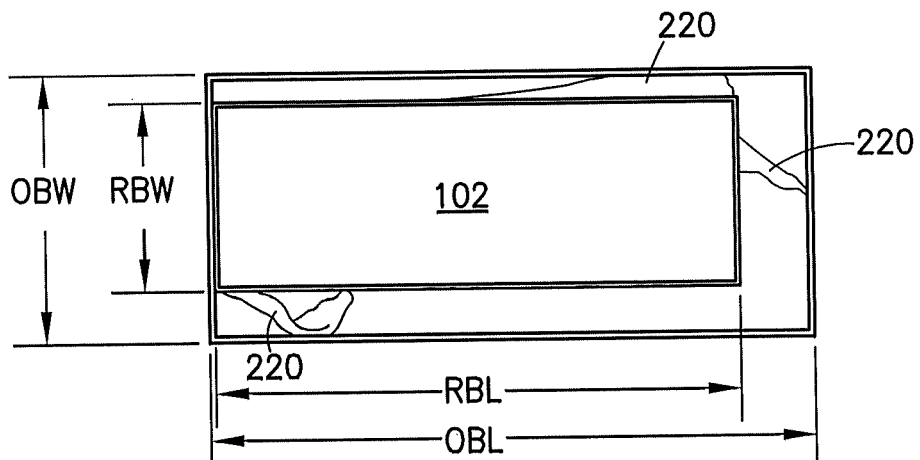
Figure 9B:
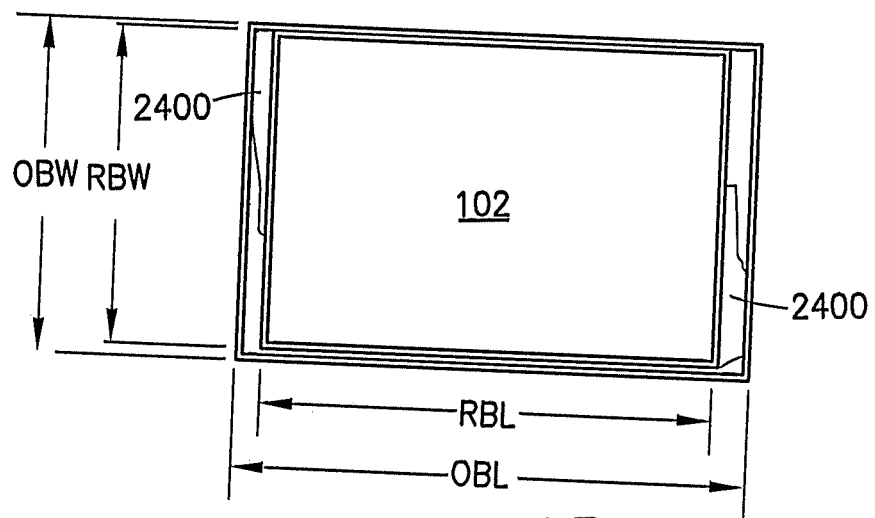
Figure 9C:
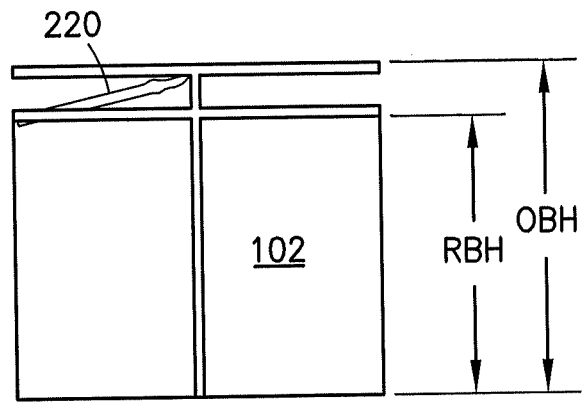

"Real box" measurements (FIG. 7, Block 710) include dimensions of the best fit shape which can be determined based on, or obtained from, the combined cased good image. For example, the shape employed in the fit is a box having a length, width and height. Alternatively, the shape employed can be a sphere having a center and a radius. Various other shapes can be employed in the fit, such as but not limited to a cylinder, ovaloid, cone, etc. FIGS. 9, 9A, 9B, and 9C illustrate examples of "real box" measurements (shown with the dotted lines in FIG. 9 on the processed images 900A, 900B respectively representing elevations and plan combined images) obtained from composite images acquired/combined/constructed during the inspection of the cased good 102, 200, 210 shown in FIGS. 1, 2A, and 2B. As it can be seen in this example, any protrusion (such as protrusion 220 in FIGS. 2A and 2B or a protrusion not yet identified as a case flap as shown in FIG. 9C) and/or bulge 2400 seen by the vision system 150 is not regarded as such when the "real box" dimensions are determined. Here the real box dimensions include a real box length RBL, a real box width RBW, and a real box height RBH. In the example, the label LAB on the cased goods 200 illustrated in FIG. 2A is representative of cased good 102 and may be partially detached and detected in the confined image and resolved as part of the best fit shape determination so as to be ignored in the footprint evaluation. Nonetheless, opaque or translucent materials wraps for example, embodied in the composite material, are included in real box measurements to the extent conformal to the best fit shape.

"Outside box" measurements (FIG. 7, Block 712) include dimensions of the smallest shape that contains the entire product which can be determined based on, or obtained from, the combined product image (as may include protrusions 220 seen by the vision system including distressed product portion, labels and wrapping). For example, the shape employed in the fit is a box having a length, width and height indicative of the largest rectangular footprint of the cased goods 102 on the conveyor 110, 120. Alternatively, the shape employed can be a sphere having a center and a radius. Various other shapes can be employed in the fit, such as but not limited to a cylinder, ovaloid, cone, etc. FIGS. 9A, 9B, 9C, and 10 illustrate examples of "outside box" measurements obtained from the images (1000A, 1000B respectively representing (elevation/side and plan/top combined images) acquired/combined/constructed during the inspection of the cased goods 102 (see also, e.g., cased goods 200, 210) shown on FIGS. 1, 2A, and 2B (shown with the dotted lines on the processed image). As it can be seen in this example, any protrusion 220 and/or bulge 2400 imaged by the vision system 150 including such gray image projecting parts indicative of translucent or opaque wrapping, is considered and included when the "outside box" dimensions are determined. Here the outside box dimensions include an outside box length OBL, and outside box width OBW, and an outside box height OBH. In the example, the partially detached label LAB (FIG. 2A) on the cased goods 102 (see, e.g., cased goods 200 in FIG. 2A) dominates in determining the footprint of the cased goods 102.

Figure 11A:
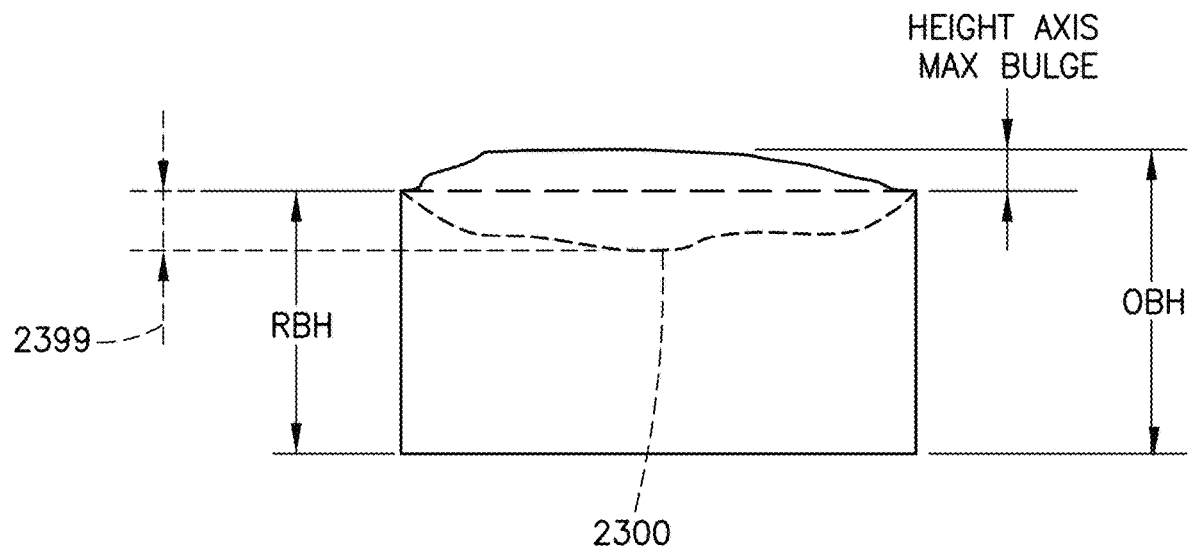
FIGS. 11A, 11B, and 11C are other schematic illustrative examples of bulges on one or more sides of a product in accordance with aspects of the disclosed embodiment.
Figure 11B:
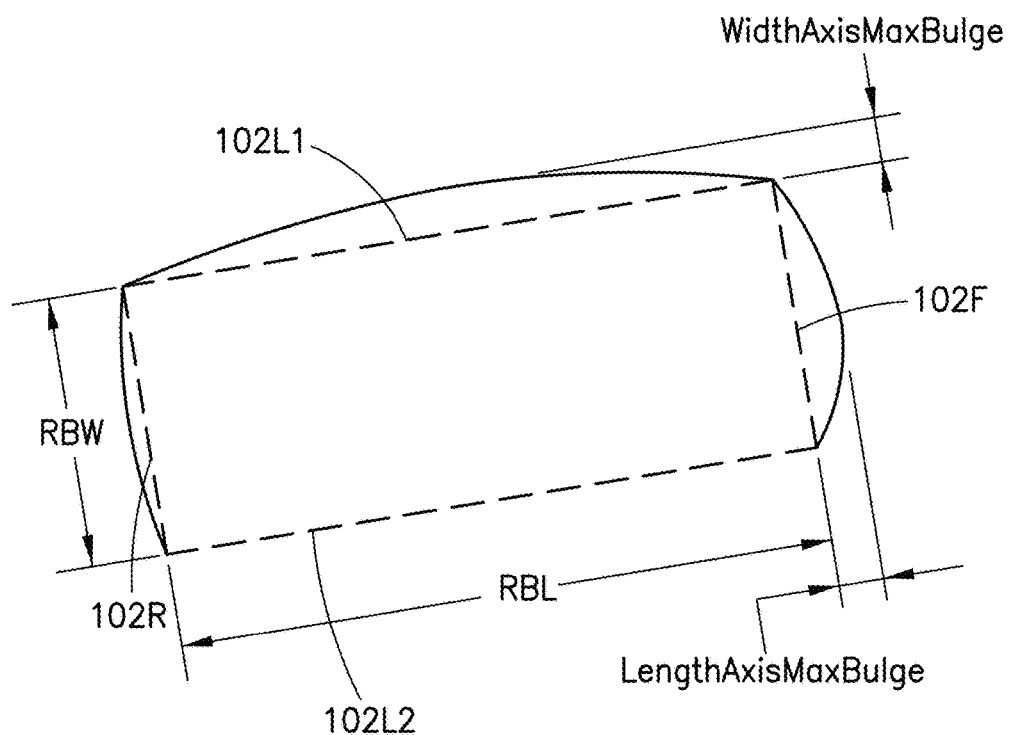
Figure 11C:
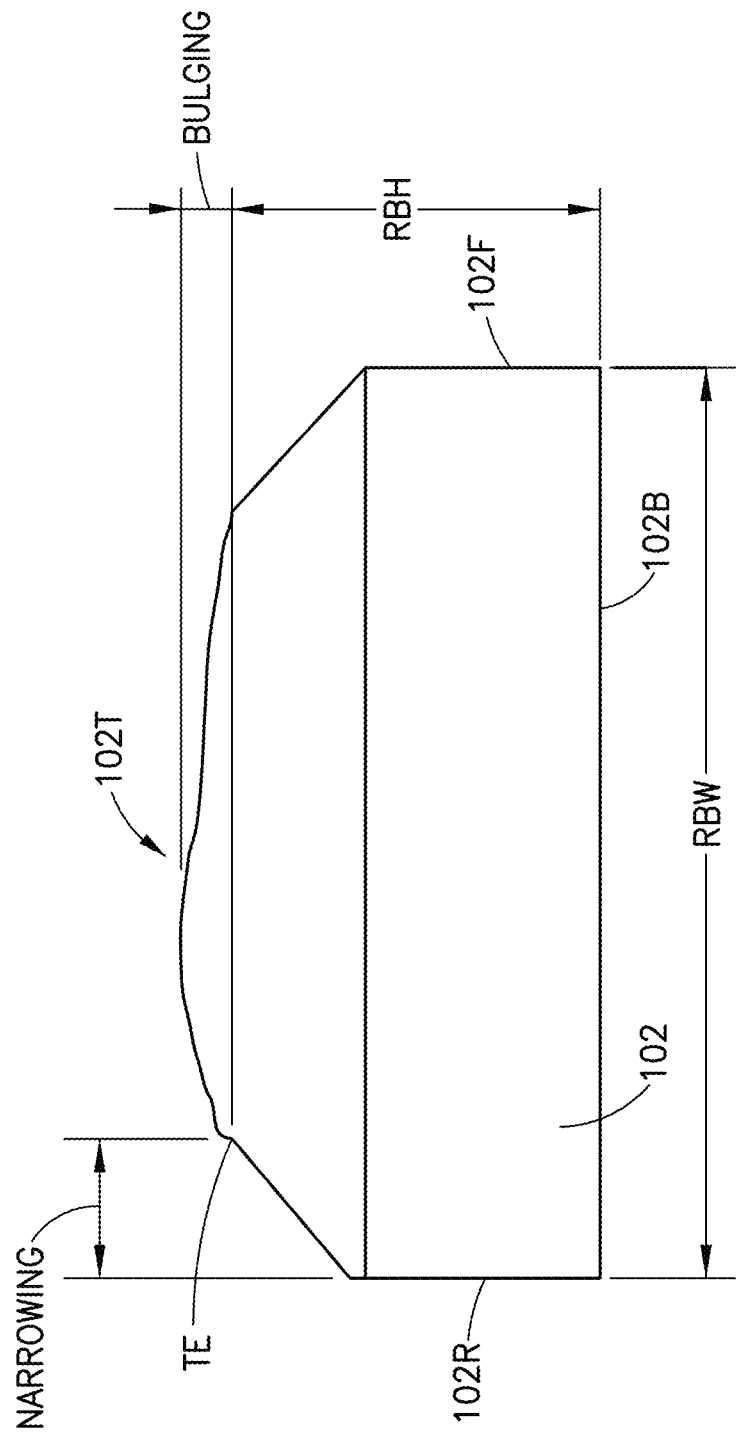
Figure 12:
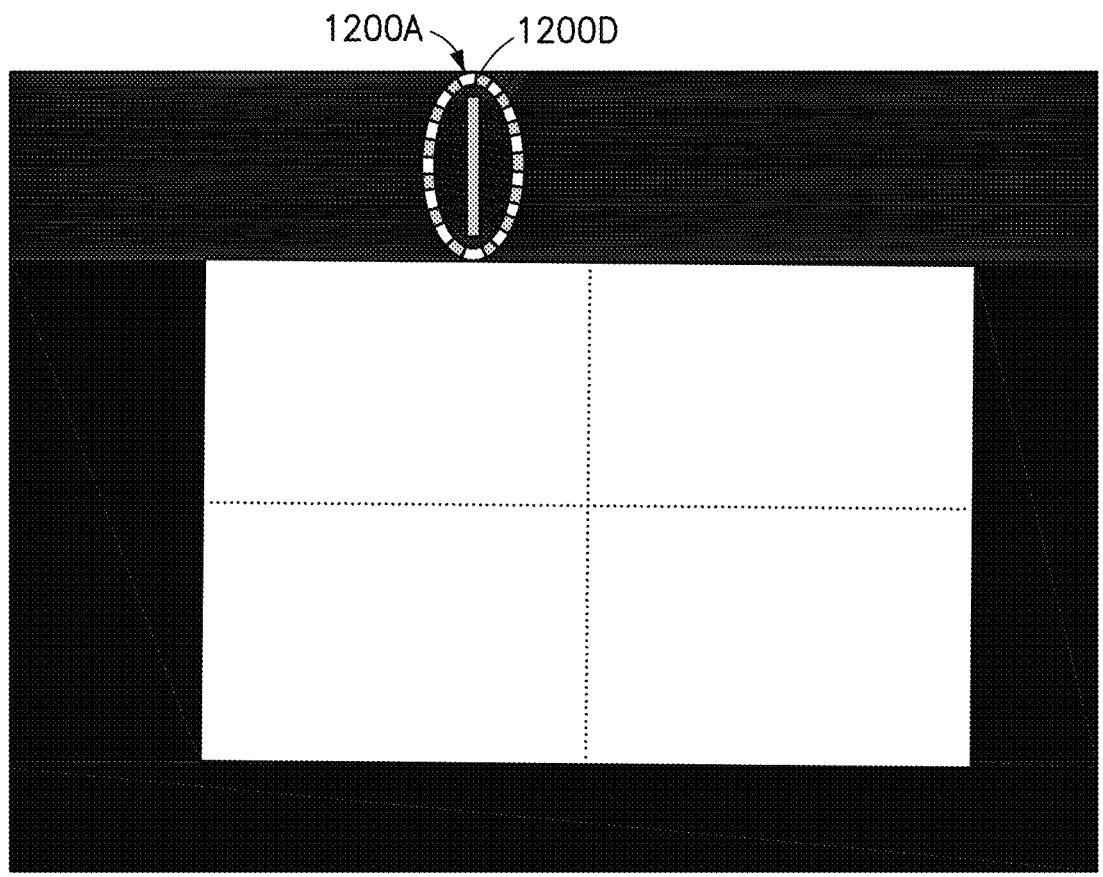
FIG. 12 is a diagram illustrating detection of the presence of debris on a camera system window in accordance with aspects of the disclosed embodiment.

The "max bulge" measurement (FIG. 7, Block 714) is the longest dimension obtained the cased goods 102 being inspected. FIG. 11 illustrates a "max bulge" measurement obtained from the images 1100A, 1100B (with similar conventions to FIGS. 9, 10) acquired/combined/constructed during the inspection of the cased goods 102 (see also, e.g., cased goods 200, 210) illustrated in FIGS. 1, 2A, and 2B. With the orientation of the product determined, the "max bulge" is the biggest caliper measure in width, in length, and in height. As will be described herein, bulging case goods 102 may affect the handling, storage, and palletization characteristics of the case goods 102 within a logistics facility 190. For example, bulges on one or more sides of the case good 102 may cause unstable stacking of case goods, such as when palletized. Bulges on one or more sides of the case good 102 may also cause improper reorientation of the case goods 102, such as on a case turner of the storage and retrieval system, where the case turner is configured spin or rotate the case good 102 for reorienting the case good 102. Bulges on one or more sides of the case good 102 may cause mismeasurement of the case good 102 by an autonomous transport vehicle 190ATV of the logistics facility 190, which may further cause missed picks, improper transfer of the case goods 102 to the autonomous transport vehicle 190ATV, and case goods placement errors. As will be described further below, the max bulge may also be measured apart from the biggest caliper measure in width, in length, and in height so as to determine a dimension of the bulge relative to an adjacent edge of the cased good 102 (see FIGS. 11A-11C) so as to determine whether unsuitable handling, storage, and palletization characteristics exist for any given case good 102. In one or more aspects, with respect to the width axis max bulge and the length axis max bulge (see FIG. 11B) only the largest bulge (e.g., on one lateral side 102L1, 102L2 of the case good) in length axis may be tracked and only the largest bulge (e.g., on one longitudinal side 102F, 102R of the case good 102) in the width direction may be tracked. Here the maximum bulge in the length direction is assumed for both lateral sides and the maximum bulge in the width direction is assumed for both longitudinal sides 102F, 102R.

The product "orientation angle" is the angle of the product's main axis relative to the travel direction TD of cased goods 102 on the conveyors 110, 120. FIG. 8 best illustrates a non-zero product "orientation angle" determined when a box is employed for the best fits (see also FIG. 24 which illustrates a zero product orientation angle for cased good 102A and a non-zero product orientation angle for cased good 102B). For exemplary purposes, the "orientation angle" measurement can be a major axis when an ovaloid shape is employed in the fits.

With reference to FIG. 8, a "distance from one side of the conveyor" is determined as the minimum distance obtained between the cased goods 102 and either of the predetermined conveyor sides (as expressed based on the width of the light sheet, see FIG. 6).

It should be understood that the aspects of the disclosed embodiment are not limited to performing the steps illustrated in FIGS. 3 and 7 in the sequence illustrated. In one or more aspects, determination of measurements, as well as condition testing, are performed in parallel, for example ascertained as the conveyors 110, 120 advance. The sequence of steps illustrated in FIGS. 3 and 7 can illustrate a hierarchy of a coded logic decision network.

Once a substantial number of the above mentioned measurements are determined, the image analysis computer program of the controller 199 compares the measurements (FIG. 7, Block 718) with nominal values and accepted tolerances provided in FIG. 7, Block 716 to the cased goods inspection system 100. For example, a Programmable Logic Controller (PLC) (not shown) can provide at least some of the nominal values and accepted tolerances for the given case inspected by the inspection system. According to preferences of the user/operator, the "real box", the "outside box" or the "max bulge" can be considered to accept or reject cased goods 102.

In accordance with one or more aspects of the disclosed embodiment, as can be seen from the raw image example illustrated in FIG. 4, the recorded light intensity does vary within the acquired image. To establish a normalized baseline value of intensity as a comparison basis or reference, the intensity value of non-black pixels of a selectable number, for example, about 10 sample images are considered. In one aspect, the intensity values of the about 33% median images, for example from the selected number of sample images, are considered to establish the normalized value of pixel intensity. By doing so, signal noise, light interference, and the like, are eliminated in order to reduce false cased goods detection or false measurements. The sample images providing the basis for determination of the normalized baseline value of intensity may be updated, or refreshed, on a rolling basis as previously noted resolving for ambient changes due to environmental variances, detritus on noted EM source and/or vision system components, etc.)

By using the above mentioned process, the vision system 150 can automatically compensate for debris or the like being present on a window panel of the camera system 181, 184. When such situation arises, the raw constructed/combined image shows a narrow line of constant pixel intensity 1200D as shown within stitched line 1200A, in FIG. 12. Upon detection of a narrow line of pixels, a warning can be sent to an operator/user of the cased goods inspection system 100, such as through the user interface 198, to alert of a need to clean the window. Here, because of the normalization of the light intensity process described above, such debris can be gradually relocated or removed by the processor 199P of the controller 199 from the combined composite image of the cased good 102 constructed by the image processing algorithm within a few iterations (encoder steps, stepper motor steps, seconds, etc.) and therefore minimizing the impact on the operation of the cased goods inspection system 100.

In one aspect, the profile detection system 180 sends its decision (accept or reject) (FIG. 7, Blocks 720A and 720B) as well as the various measurements taken to, for example, user interface 198 for subsequent use by a user/operator of the cased goods inspection system 100 (FIG. 7, Block 722). For example, at least conveyors 110, 120 can be operated in any suitable manner to retract or dump rejected cased goods and/or paddles can be actuated to deflect rejected cased goods to any suitable "rejected products" conveyor. In other aspects, large "orientation angles" can be reduced by actuating any suitable components of the cased goods inspection system 100, such as guide rails or other product reorienting mechanism. In still other aspects, the conveyors 110, 120 may be reversed so that a rejected cased good 102 may be rescanned. In other aspects, the profile detection system 180 sends its decision (accept or reject) as well as one or more of the various product measurements (e.g., product dimensions, orientation, etc.) taken to the flap detection system 170 to facilitate flap detection as described herein. In one or more aspects, the user interface 198 receives one or more of the above-noted information from the profile detection system 180 and information (as described herein) from the flap detection system 170.

Referring again to FIGS. 1 and 1A-1C and FIGS. 13A-13F, the flap detection system 170 and the profile detection system 180 configured to operate in parallel and substantially are simultaneously with each other where both are integrated into the cased goods inspection system 100. The flap detection system 170 is configured to detect one or more of open flaps, bulges, and concavities that may not otherwise be detected as a protuberance or case exterior protrusion 220 by the profile detection system 180. The flap detection system 170 detects flaps by approximating the flaps to a substantially coherent planar surface 1410 (see FIGS. 14A-14D) where the flaps have a length/size coherent with (e.g., corresponding to) a corresponding product/case 102 length/size as determined by, for example, the profile detection system 180. A partial or small flap, which is but a fraction of the length of the flap or side of the cased good the partial or small flap is attached to, may not be identified as an open flap, and may be detected by the profile detection system 180 under the "RealBox-OutsideBox" criterion described above. As will be described herein, the flap detection system 170 is configured to detect flaps, bulges, and/or concavities on any exterior side (e.g., top, bottom, front (e.g., leading longitudinal side), back (e.g., trailing longitudinal side), and lateral sides) of any given product/case 102, including a flap attached to the product/case under-side (e.g., the bottom side of the product seated on the conveyor 110, 120).

As noted, the flap detection system 170 imaging of the exterior sides (noted above) of the cased goods 102 is substantially simultaneous with the imaging of the exterior sides of the cased goods 102 with the profile detection system 180. For example, the imaging of the exterior sides with the flap detection system 170 substantially occurs simultaneously with the registering (by the processor 199P) of the cased goods dimensions from the case image data (see FIGS. 5-6) obtained with the profile detection system 180 where the processor 199P resolves the imaged cased good to a respective stock keeping unit or SKU (e.g., a case identity having known dimensions stored in or in a memory accessible by the processor 199P) and identifies any case exterior protrusions 220 as open flaps. Here, both the flap detection system 170 and the profile detection system 180 substantially simultaneously image the cased good 102 passing through the cased goods inspection system 100, where the time it takes for the cased goods to pass through the cased goods inspection system 100 is on an order of magnitude of about 0.1 seconds to about 0.01 seconds. For example, in one or more aspects, where the flap detection system 170 is without laser illumination, the illumination of the cased goods by the profile detection system 180 may be harmonized with imaging by the flap detection system 170 so that a slight offset between the illumination of the cased good 102 by the profile detection system 180 and the imaging of the cased good 102 by the flap detection system 170 to avoid illumination interface when the cased good 102 is imaged by the flap detection system 170; however, it is noted that for the time frame (e.g., the order of magnitude of about 0.1 seconds to about 0.01 seconds) of the cased good 102 passing through the cased goods inspection system 100 the imaging of the cased good 102 by both the flap detection system 170 and the profile detection system 180 is substantially simultaneous. In one or more aspects, where the flap detection system 170 includes illumination, such as from the lasers 171L-173L, the illumination of the flap detection system 170 may be pulsed continuously (or periodically— e.g., turned on and off at predetermined intervals) substantially simultaneously with illumination of the cased good 102 by the profile detection system 180 so that the imaging of the cased good 102 by both the flap detection system 170 and the profile detection system 180 is substantially simultaneous. It is noted that, in one or more aspects, one or more of the lasers 171L-173L has a fixed or predetermined orientation so that the scanning/imaging of the cased good 102 by the flap detection system 170 is effected by cased good movement along the conveyor (s) 110, 120; while in other aspects, one or more of the lasers 171L-173L is movable relative to the conveyor (s) 110, 120 so that the scanning/imaging of the cased good 102 by the flap detection system 170 is effected by movement of the one or more laser 171L-173L and independent of (or decoupled from) cased good movement along the conveyor (s) 110, 120.

As described herein, the profile inspection system 180 resolves the case inspection characteristics of the cased goods 102 noted above, where the open flap detection, concavity detection, and at least a portion of the bulge detection is performed by the flap detection system 170. Similarly, the flap detection system 170 resolves open flap detection, concavity detection, and at least a portion of the bulge detection, where case inspection characteristics are resolved by the profile inspection system 180. As will be described below, the controller 199/processor 199P is configured that upon confirming, i.e., from the image data obtained from the profile inspection system 180, a respective case good 102 has an expected case shape, the controller 199/processor 199P determines from other image data, i.e., from the flap detection system 170, conformance of the respective case good 102 with a predetermined case form fit characteristic for handling, storage and palletizing of the cased good 102 within the logistics facility 190. As will be described in greater detail herein, the predetermined case form fit characteristic informs fit up acceptance of the respective case good 102 within a predetermined fit up space or location (e.g., storage space or other holding locations of a storage array 190SA, a payload bay of an autonomous transport vehicle 190ATV, a pallet load build location in a pallet build formed in the logistics facility 190, etc.) of the logistics facility 190. As described herein, in one or more aspects, the predetermined case form fit characteristic is an inward bulge or concavity, relative to a planar case side, of at least one side 102T, 102L, 102F, 102R of the case shape of the respective cased goods.

In one or more aspects, cased goods profile inspection and open flap detection (inclusive of concavity detection, and bulge detection) may be effected independent of one another but substantially simultaneously. For example, the profile inspection system 180 is unencumbered by an open flap condition, a concavity, and/or a bulge of the cased goods 102 and resolves the case inspection characteristics (for cased goods that satisfy the profile inspection system 180 inspection criteria) independent of open flap, concavity, and/or bulge obstruction/obscuration of the case exterior sides to the flap detection system 170 sensors 171-173.

Though the flap detection system 170 may be initialized from the profile inspection system 180 resolving a case exterior protrusion 220 (FIGS. 2A and 2B) for cased goods 102 that are acceptable to/pass the profile inspection criteria (i.e., cases that do not satisfy the cased goods profile inspection criteria are rejected in any suitable manner such as by transition to reject conveyors, removal by trained personnel, etc., as described herein), the determination of an open flap, bulge, and a concavity is made by the flap detection system 170. While the bulge of a cased good 102 side may be determined by both the flap detection system 170 and the profile detection system 180, the flap detection system 170 may provide greater detail of the bulge with respect to case handling (e.g., by automated transport vehicles 190ATV, palletizers 190P, etc.) and case placement (e.g., on pallets, in a storage array 190SA, etc.) within a logistics facility 190 (FIG. 1) of which the cased goods inspection system 100 is a part of. Suitable examples of storage and retrieval systems in which the aspects of the disclosed embodiment may be deployed include, but are not limited to, those storage and retrieval system described in U.S. Pat. No. 10,800,606 issued on Oct. 13, 2020 (titled "Material-Handling System Using Autonomous Transfer and Transport Vehicles"), U.S. Pat. No. 10,556,743 issued on Feb. 11, 2020 (titled "Storage and Retrieval System"), U.S. Pat. No. 10,633,184 issued on Apr. 28, 2020 (titled "Replenishment and Order Fulfillment System"), U.S. Pat. No. 9,475,649 issued on Oct. 25, 2016 (titled "Pickface Builder for Storage and Retrieval Systems"), U.S. Pat. No. 10,106,322 issued on Oct. 23, 2018 (titled "Bot Payload Alignment and Sensing"), U.S. Pat. No. 10,703,585 issued on Jul. 7, 2020 (titled Pallet Building System"), and U.S. Pat. No. 10,781,060 issued on Sep. 22, 2020 (titled "Storage and Retrieval System Transport Vehicle"), the disclosures of which are incorporated herein by reference in their entireties.

As an example, with respect to detection of an open flap condition, for cased goods 102 that are acceptable to the profile inspection system 180, and with the case exterior protrusion 220 determined (i.e., determined from the profile inspection system 180), the controller 199 initializes imaging of the cased good 102 with the sensors 171-173 of the flap detection system 170. Where the flap detection system 170 determines the case exterior protrusion 220 to be an open flap, the controller 199 registers the open flap condition with an identification (e.g., a cased good identification number as illustrated in Tables 1 and 2 described herein) of the cased good 102 in any suitable memory/database (noting that the cased good 102 remains accepted by the profile inspection system 180) for handling of the cased good 102 by any suitable cased good handling equipment (e.g., palletizers 190P, robot arms, autonomous transport vehicles 190ATV, etc.). Where the flap detection system 170 determines the case exterior protrusion 220 is not an open flap, the controller 199 may not process the case image data 1400 (see FIGS. 14A-14H for exemplary image data) from the sensors 171-173 of the flap detection system 170. In one or more aspects, where the profile inspection system 180 does not detect a case exterior protrusion 220, the controller 199 may initialize the flap detection system 170 for imaging of the cased good 102 by the sensors 171-173 substantially simultaneously with the inspection of the cased good 102 by the profile inspection system 180, where the flap detection system 170 images the sides of the cased good 102 to detect exterior protrusions apparent on each (or one or more) visible sides of the cased good to verify the findings of the profile inspection system with respect to the presence or absence of case exterior protrusions 220 (noting that the cased good remains accepted by the profile inspection system 180).

As described herein, the flap detection system 170 is configured to, with at least one sensor 171-173, image all (five) visible/unseated sides of a cased good 102 (i.e., the five sides that are not seated on the conveyor 110, 120 and that are visible to the sensors 171-173). The at least one sensor 171-173 is arranged to image each exposed case side 102T, 102L, 102R, 102F of each of the cased goods 102 advanced with the at least one conveyor 110, 120 past the cased goods inspection system 100 so as to image the case exterior protrusion 220 apparent on each imaged exposed case side 102T, 102L, 102F, 102R. In one or more aspects, the case image data 1400 (see FIGS. 14A-14H for exemplary image data) captured by the sensors 171-173 of each of the cased goods 102 embodies each exposed case side 102T, 102L, 102R, 102F of a respective case exterior 102E (FIG. 1). In one or more aspects, the case image data 1400 embodies the case exterior protrusion 220 with the case exterior protrusion 220 apparent on at least one exposed case side 102T, 102L, 102R, 102F and the at least one exposed case side 102T, 102L, 102R, 102F disposed in each exposed case side orientation of the cased goods 102 (e.g., the case image data 1400 identifies the side on which the open flap is detected and/or an orientation of the open flap). In one or more aspects, the imaged exposed case side 102T, 102L, 102R, 102F is disposed so that the open case flap 1300 (see FIGS. 13A-13F), resolved from the case exterior protrusion 220 apparent on the imaged exposed case side 102T, 102L, 102R, 102F extends, from the exposed case side 102T, 102L, 102R, 102F, adjacent a conveyor seat surface CSS on which the cased good 102 is seated (See FIG. 13E).

Figure 13A:
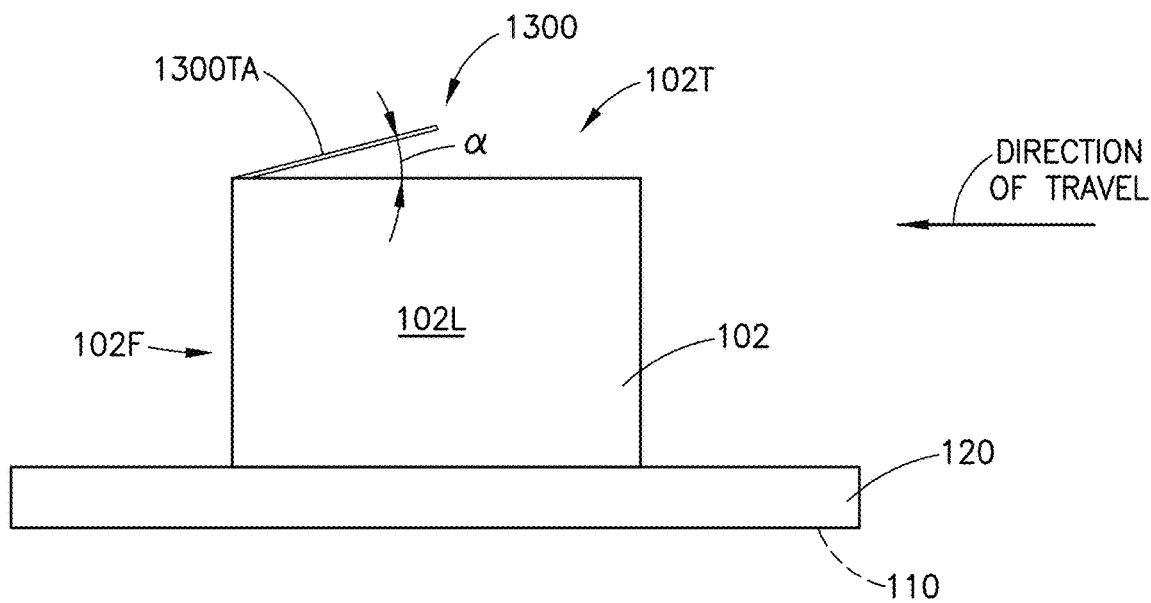
FIGS. 13A-13F are exemplary schematic illustrations showing cased goods having open flaps in accordance with aspects of the disclosed embodiment.
Figure 13B:
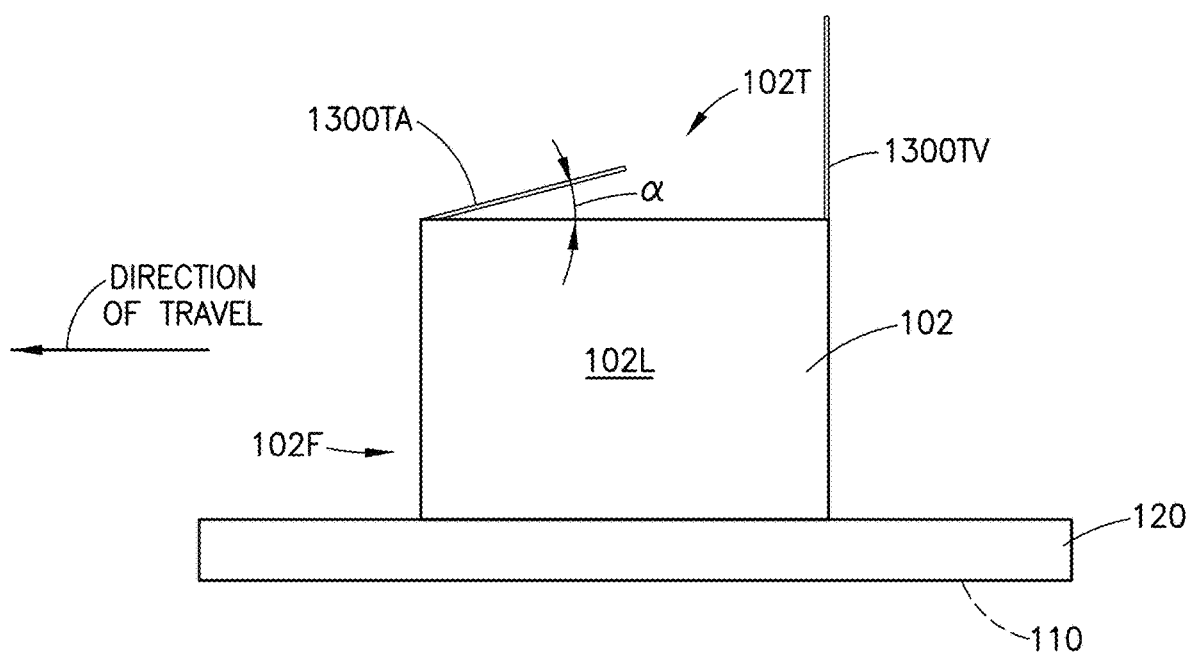
Figure 13C:
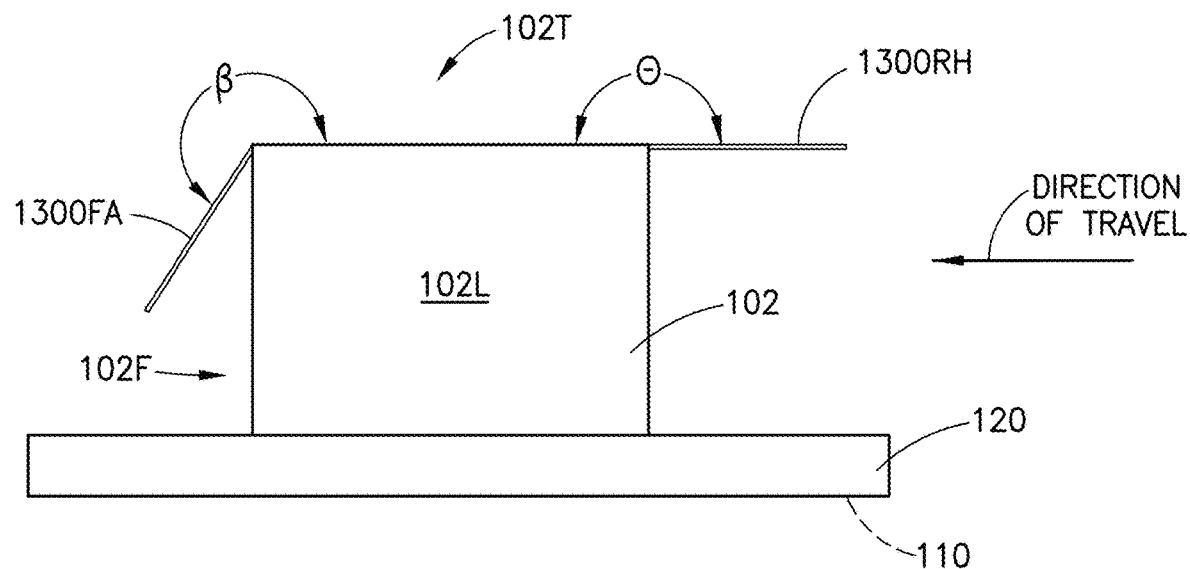
Figure 13D:
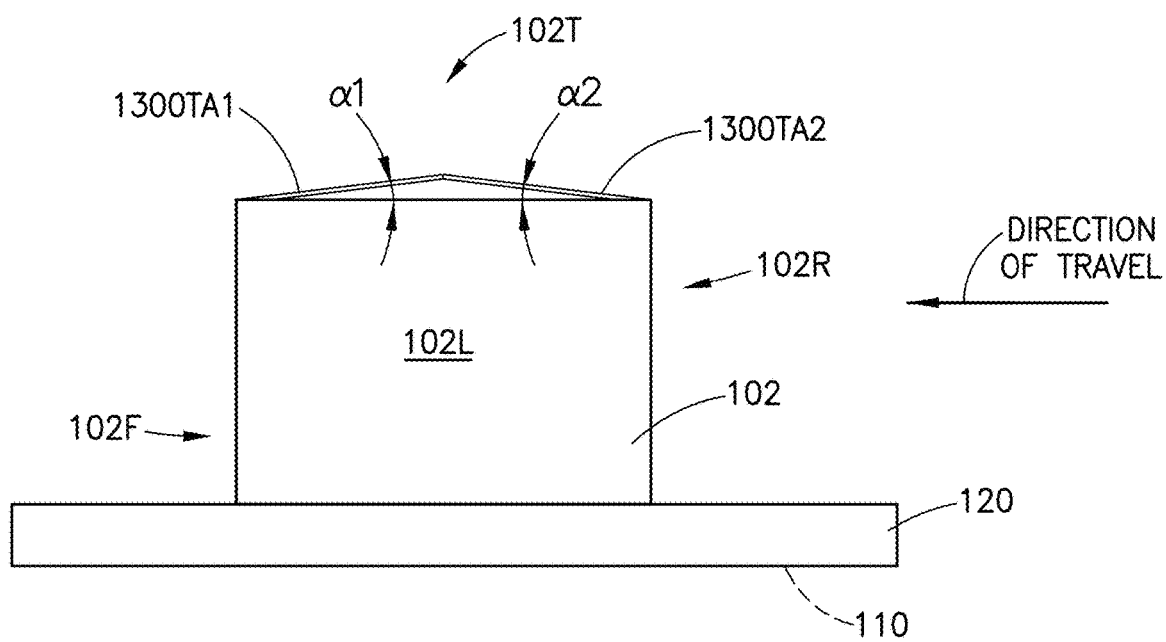
Figure 13E:
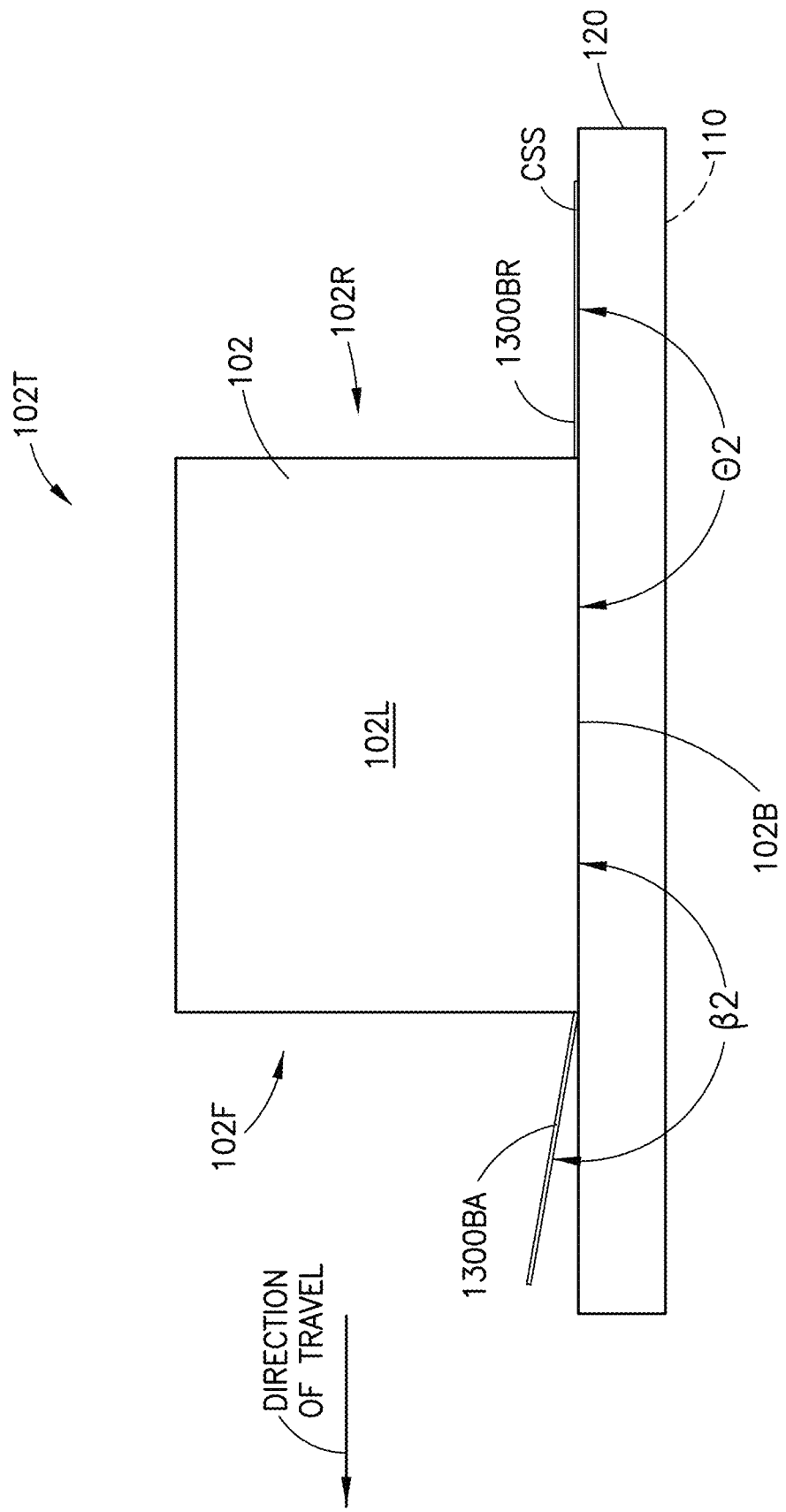
Figure 13F:
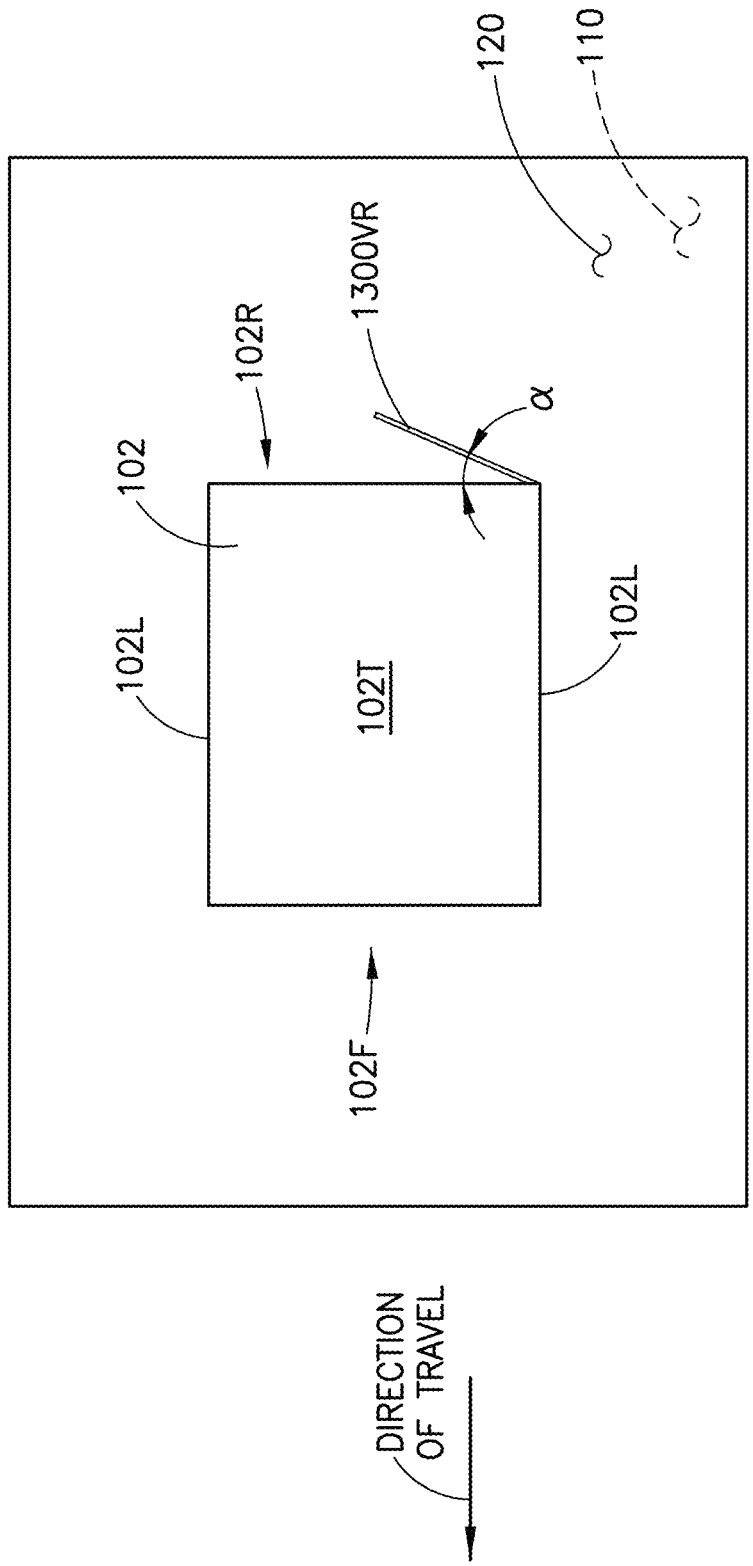

FIGS. 13A-13F illustrate exemplary open flap configurations that the flap detection system 170 is configured to detect. FIG. 13A illustrates a lateral side view of the cased good 102 where a leading edge flap 1300TA attached to (e.g., hinged at) an edge of the top 102T is partially open at an angle α. Here the angle α is illustrated as an acute angle but may be any angle ranging from about 1° to about 270°. FIG. 13B is a lateral side view of the cased good 102 where a flap 1300TA on or otherwise hinged to the leading edge of the top 102T is open at the angle α, while a flap 1300TV on or otherwise hinged to a trailing edge of the top 102T is open relative to the top 102T by about 90°. FIG. 13C is a lateral side view of the cased good 102 where a flap 1300FA at or otherwise hinged to the leading edge of the top 102T is angled at an angle β, while the flap 1300RH at or otherwise hinged to the trailing edge of the top 102T is angled at an angle θ or at an angle of about 180°. Here the angle β is illustrated as a reflex angle and the angle θ is illustrated as being about 180° however, in other aspects the angles β, θ may each range from about 1° to about 270°. FIG. 13D is a lateral side view of the cased good 102 where the leading and trailing edge flaps 1300TA1, 1300TA2 are both angled relative to the top by a respective angle α1, α2, where the respective angles may range from 1° to about 270°. FIG. 13E is a lateral side view of the cased good 102 where a flap 1300BA hinged at the leading edge of the bottom 102B of the cased good 102 is open relative to the bottom 102B by angle ß2, while the flap 1300BR hinged at the trailing edge of the bottom 102B of the cased good 102 is open relative to the bottom by an angle θ2 of about 180°. Here the angle ß2 is illustrated as a reflex angle and the angle θ2 is illustrated as being about 180°; however, in other aspects the angles β, θ may each range from about 1° to about 270°. FIG. 13F is a plan view of the top 102T of the cased good 102 where a flap 1300VR on a lateral side edge of the rear or trailing side 102R of the cased good 102 is open relative to the rear 102R by an angle α3. Here the angle α3 is illustrated as an acute angle but may be any angle ranging from about 1° to about 270°. As noted above, FIGS. 130A-130F are non-limiting illustrative examples of flap orientations for which the flap detection system 170 is configured to detect. As may be realized, the products 102 illustrated in FIGS. 13A-13D may have any orientation on the conveyor 120, 110 such that a hinged side of the flap extends in a generally lateral direction relative to the conveyor 120, 110 or extend in a generally longitudinal (i.e., along the direction of travel of the conveyor) direction relative to the conveyor 120, 110 orientation, or have any other orientation therebetween.

Still referring to FIG. 1 and also to FIGS. 13A-13F and 14A-14H, and as described above, the flap detection system 170 includes at least one sensor/imaging device 171-173 that is arranged to capture product/case image data 1400 (see FIGS. 14A-14H for exemplary image data) of each of the cased goods or products 102 advanced by the at least one sensor/imaging device 171-173 by the conveyor 110, 120. The at least one sensor/imaging device 171-173 captures the image data 1400 with any suitable resolution to effect open flap determination as described herein. For exemplary purposes only, the image resolution provided by the at least one sensor/imaging device is about 3 mm (about 0.1 in) in the X direction (e.g., a direction substantially parallel to product flow along the conveyor 110, 120), about 1.5 mm (about 0.05 in) in the Y direction (e.g., a direction substantially perpendicular to product flow along the conveyor 110, 120 in a plane defined by the product support surface of the conveyor 110, 120), and about 1.5 mm (about 0.05 in) in the Z direction (e.g., a direction substantially perpendicular to the product support surface CSS of the conveyor 110, 120). In other aspects, the resolution in one or more of the X, Y, Z directions may be greater or less than that described above.

As noted above, the controller 199 (inclusive of its processor 199P) is coupled to the conveyor 110, 120 and is communicably coupled to the at least one sensor/imaging device 171-173 to receive the case image data 1400 from the at least one sensor/imaging device 171-173. Here, triggering of the at least one sensor/imaging device 171-173 is effected in a manner described above, such as by the profile detection system 180 or in a manner substantially similar to that described above with respect to the profile detection system 180. In one or more aspects, the flap detection system 170 makes one or more image acquisitions into image cache storage (such as of the controller 199 processor 199P), where the image acquisitions are triggered by a conveyor encoder or alternatively by a stepper motor drive circuit advancing at least one of the conveyors 110, 120. In other aspects, the image acquisitions may be effected in any suitable manner such as with motion sensors, etc.

As will be described herein the controller 199 is configured (e.g., through any suitable non-transitory computer program code) to characterize, from the case image data 1400, a case exterior protrusion 220 (see FIGS. 2A and 2B) of the cased good 102 as a flap 1300TA, 1300TA1, 1300TA2, 1300TV 1300FA, 1300RH, 1300BA, 1300BR, 1300VR (generally referred to as flap or case flap 1300) in an open condition (see, e.g., FIGS. 13A-13F) (e.g., an open case flap). The controller 199 (through processor 199P) is configured to resolve the case image data 1400 and determine the case exterior protrusion 220 is a coherent planar surface 1410. The processor 199P is programmed with a parameter array of physical characteristic parameters 199A (FIG. 1—also referred to herein as parameter array 199A) that describe case flap coherency attributes determinative of the coherent planar surface 1410 defining an open case flap condition. The processor 199P is configured to generate from the case image data 1400 (e.g., with any suitable computer program code that effects generation of), for each coherent planar surface 1410 determined, a physical characteristic array 199C and apply the parameter array 199A to the physical characteristic array 199C so as to resolve the coherent planar surface 1410 as being an open case flap, such as illustrated in FIGS. 13A-13F and 14A-14H. Here the physical characteristic array 199C describes the coherent planar surface as a case flap and determines, based on the parameter array of physical characteristic parameters 199A, that the case flap is in an open flap condition.

The processor 199P is configured to (in addition to or in lieu of resolving the open case flap condition) resolve the case image data 1400 and determine whether the at least one case top 102T or the at least one case side 102L, 102R, 102F has an inward variance (i.e., concavity). The processor 199P is programmed with the parameter array of physical characteristic parameters 199A that describe inward variance attributes determinative of the inward variance defining the concavity condition. The processor 199P is configured to generate from the case image data 1400, for each inward variance determined, the physical characteristic array 199C and apply the parameter array 199A to the physical characteristic array 199C so as to resolve the inward variance as being the concavity condition. While the parameter array 199A and the physical characteristic array 199C are described as including both open flap and concavity characteristics, in other aspects there may be separate parameter and physical characteristic arrays for each of the open flap and concavity characteristics.

The parameter array of physical characteristic parameters 199A (also referred to herein as parameter array 199A see FIG. 1) are programmed into the controller 199 and accessible by the processor 199P. The parameter array of physical characteristic parameters 199A describes one or more case flap coherency attributes or characteristics of a coherent plane that are determinative of and describe the coherency of a plane (e.g., the coherent planar surface 1410) with respect to, for example, cased goods dimensions (e.g., a length, width, and height of a respective cased good received by the controller 199 from the profile detection system 180). The coherent planar surface 1410 defines an open case flap condition and includes any suitable physical characteristics of a given cased good/product configuration and/or flap configuration. The coherent plane or coherent planar surface 1410 depends on the physical characteristics and is resolved through any suitable image processing of the controller 199 where the controller 199 determines (e.g., from one or more of the profile detection system 180 and the flap detection system 170) if a case exterior protrusion 220 (FIGS. 2A and 2B) exists and then determines if the case exterior protrusion is a coherent plane based on the physical characteristics of a coherent plane. For example, the processing of the image data from the flap detection system 170 determines whether the coherent plane converges to define an edge with at least one of the case sides (e.g., top, lateral sides, and longitudinal sides). Where it is determined that an edge exists with at least one of the case sides and the physical characteristics or parameters of the physical characteristic array 199C are satisfied the controller 199 determines that an open flap exists and registers the open flap with the identity of the respective cased good 102 for further processing of the respective cased good 102.

In the examples provided herein the physical characteristics or parameters of the physical characteristic array 199C includes five parameters (as described below) but it should be understood that in other aspects there may be more or less than five parameters employed for the determination of an open flap condition. These parameters are applied to each of the visible sides (e.g., top 102T, longitudinal sides 102, 102R, and lateral sides 102L) of the cased goods 102 for determination of an open flap condition on each of the sides where the registering of the open flap condition may not only be with respect to an identity of a respective cased good but also with respect to a side of the respective cased good on which the open flap exists. Knowing on which side the open flap exists may facilitate further processing of the respective cased good by automated equipment or determinative of a rejection of the cased good.

Figure 15:
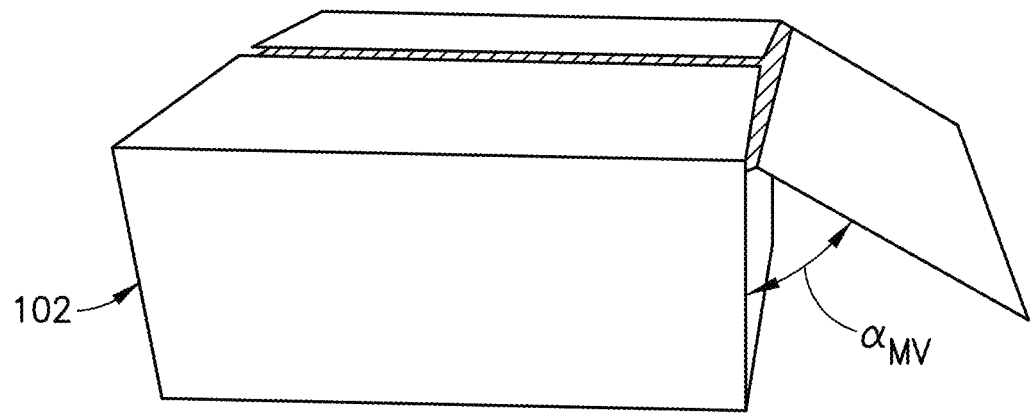
FIGS. 15-20 schematically illustrate exemplary parameters employed by the case inspection system of FIGS. 1 and 1A-1C for open flap determination in accordance with aspects of the disclosed embodiment.
Figure 16:
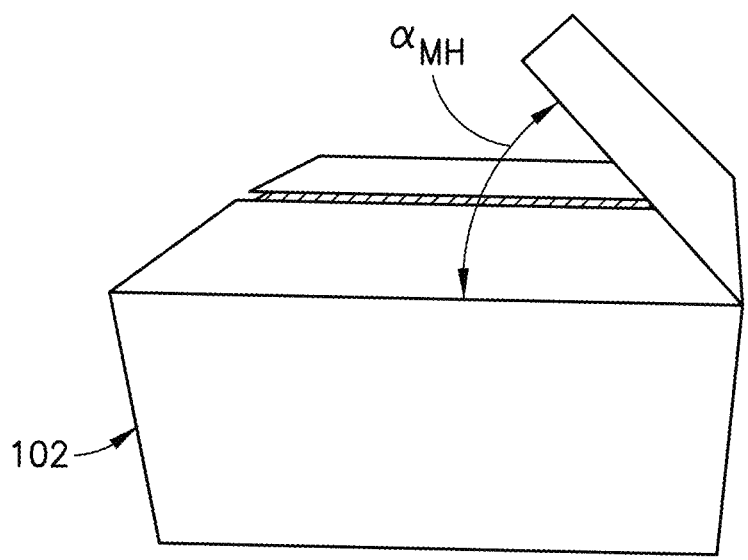
Figure 17:
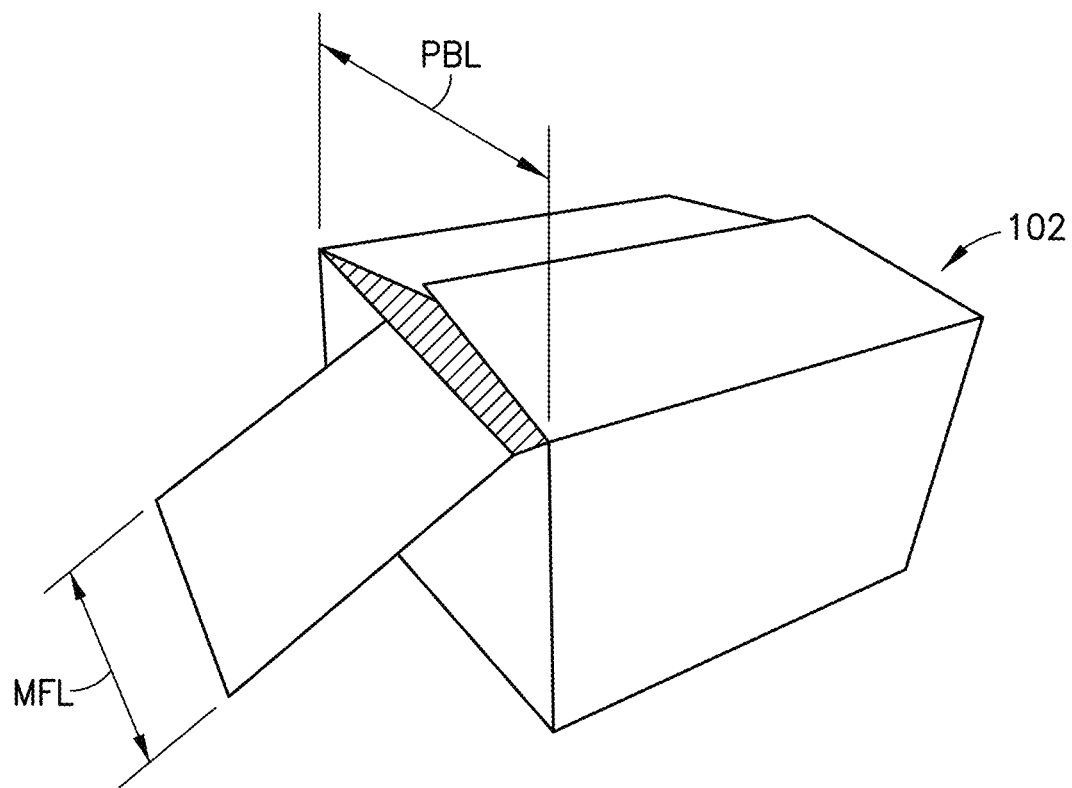
Figure 18:
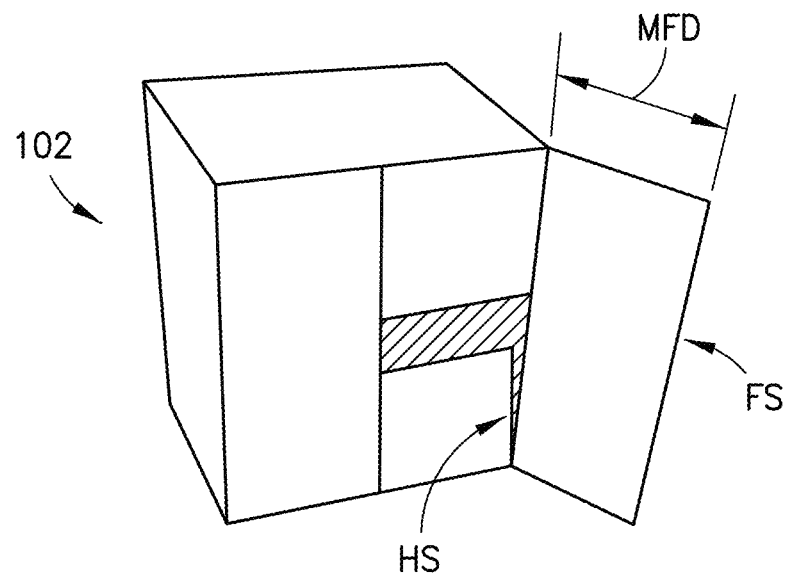
Figure 19:
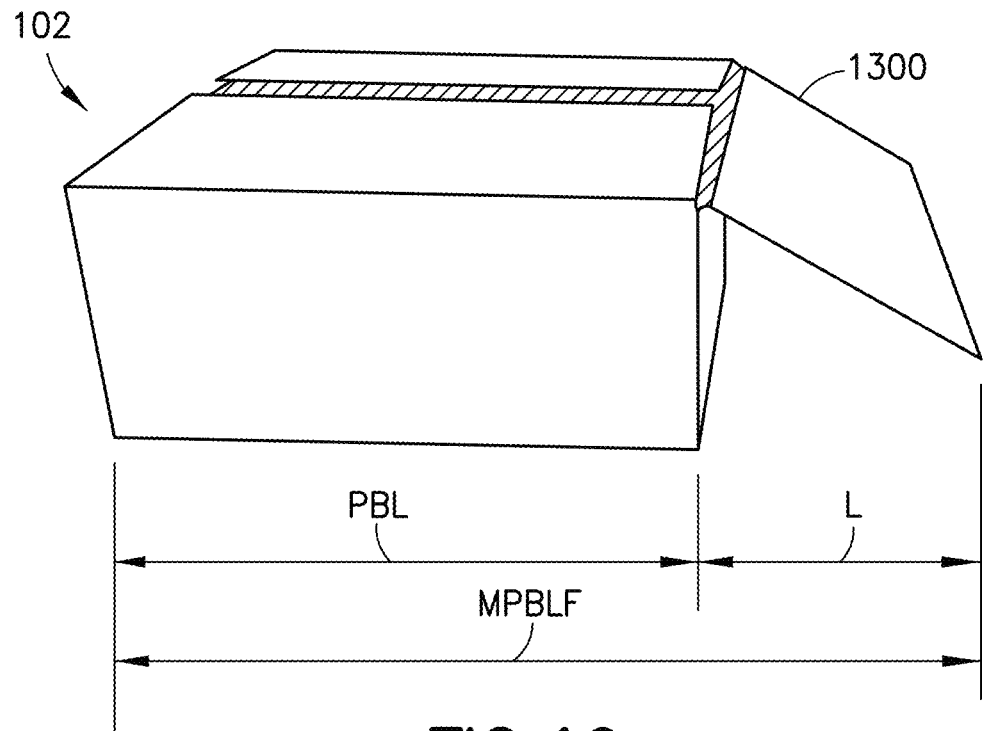
Figure 20:
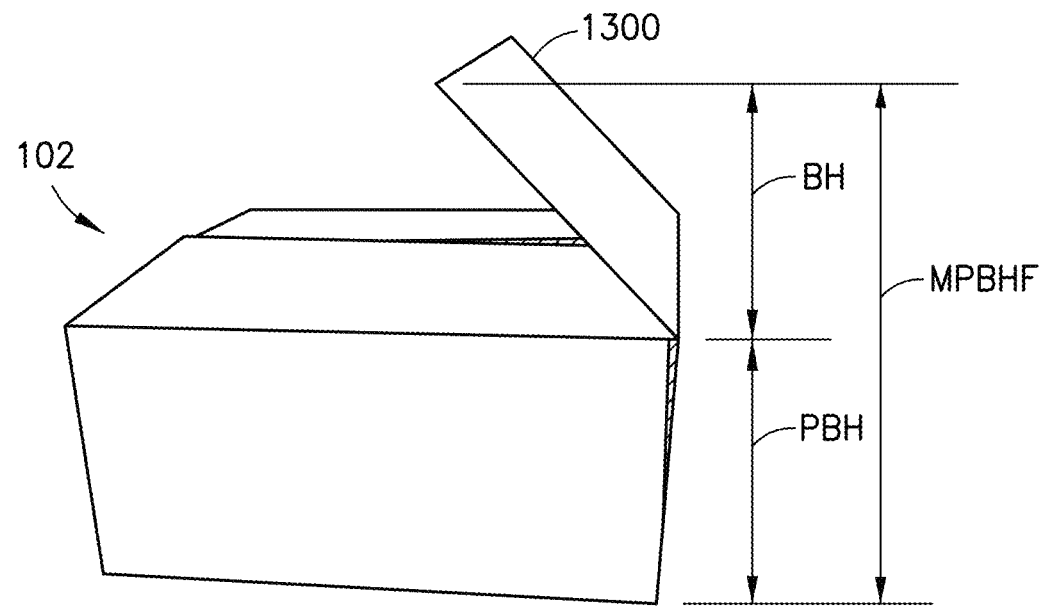

It is noted that the physical characteristics of the physical characteristic array 199C and the parameter array 199A are different characteristics of the cased goods 102 than those characteristics (as described above) of the cased goods 102 imaged by the profile detection system 180. For example, referring also to FIGS. 15-20, the parameter array 199A and the physical characteristic array 199C each include, but are not limited to, five threshold parameters (again more or less than five may be employed) which are:

a minimum opening angle for a flap (e.g., minimum angle $\alpha_{MH}$ from a horizontal edge of the cased good 102 and minimum angle $\alpha_{MV}$ from a vertical edge of the cased good 102—see FIGS. 15 and 16), a minimum flap depth MFD relative to the base of the flap (e.g., a distance from the hinged side HS or base of the flap to the opposing free side FS of the flap—see FIG. 18), in some aspects this parameter may be expressed as a ratio, a minimum flap length MFL to product box length PBL ratio (e.g., MFL/PBL) (see FIG. 17), a minimum product box length (or width) increase by flap L (e.g., L is an overall length of the product MPBLF with the open flap 1300 minus the product box length PBL—see FIG. 19), noting that the minimum product box length (or width) is a function of minimum angle qME from a horizontal edge of the cased good 102 and/or minimum angle qwv from a vertical edge of the cased good 102, and a minimum product box height increased by flap BH (e.g., BH is an overall height MPBHF of the product with the open flap 1300 minus the product box height PBH—see FIG. 20), noting that the minimum product box height is a function of minimum angle $\alpha_{MH}$ from a horizontal edge of the cased good 102 and/or minimum angle Cmv from a vertical edge of the cased good 102.

The detection system 170 is configured to reject a cased good 102 when one or more of these parameters/thresholds are exceeded. In one or more aspects, the flap detection system 170 is configured to reject a cased good 102 when each or all of the minimum opening angle for a flap $\alpha_{MH}$, αMV, the minimum flap depth MED, the minimum flap length MFL to product box length PBL ratio, and the minimum product box length (or width) increase by flap MPBLF (or the minimum product box height increased by flap MPBHF—depending on whether the flaps are located on a vertical side or horizontal side of the product) are exceeded. In still other aspect, the flap detection system 170 is configured to reject a cased good 102 when each or all of the minimum opening angle for a flap $\alpha_{MH}$, $\alpha_{MV}$, the minimum flap depth MFD, the minimum flap length MFL to product box length PBL ratio, the minimum product box length (or width) increase by flap MPBLF (MPBLF being conditional on the minimum opening angles $\alpha_{MH}$, $\alpha_{MV}$), and the minimum product box height increased by flap MPBHF (MPBHF being conditional on the minimum opening angles αMH, $\alpha_{MV}$) are exceeded. Rejected cased goods 102 may be routed off of the conveyor and/or an operator may be notified of the rejection through the user interface 198 in a manner substantially similar to that described above with respect to the profile detection system 180.

For exemplary purposes only, the minimum opening angle for a flap $\alpha_{MH}$, $\alpha_{MV}$ is about 15°, the minimum flap depth MED is about 20 mm (about 0.7 in), the minimum flap length MFL to product box length PBL ratio is about 50%, the minimum product box length (or width) increase by flap MPBLF is about 20 mm (about 0.7 in), and a minimum product box height increased by flap MPBHF is about 20 mm (about 0.7 in). In other aspects, the minimum values for the minimum opening angle for a flap $\alpha_{MH}$, αMV, the minimum flap depth MFD, the minimum flap length MFL to product box length PBL ratio, the minimum product box length (or width) increase by flap MPBLF, and the minimum product box height increased by flap MPBHF may be greater or less than that described above.

Figure 21:
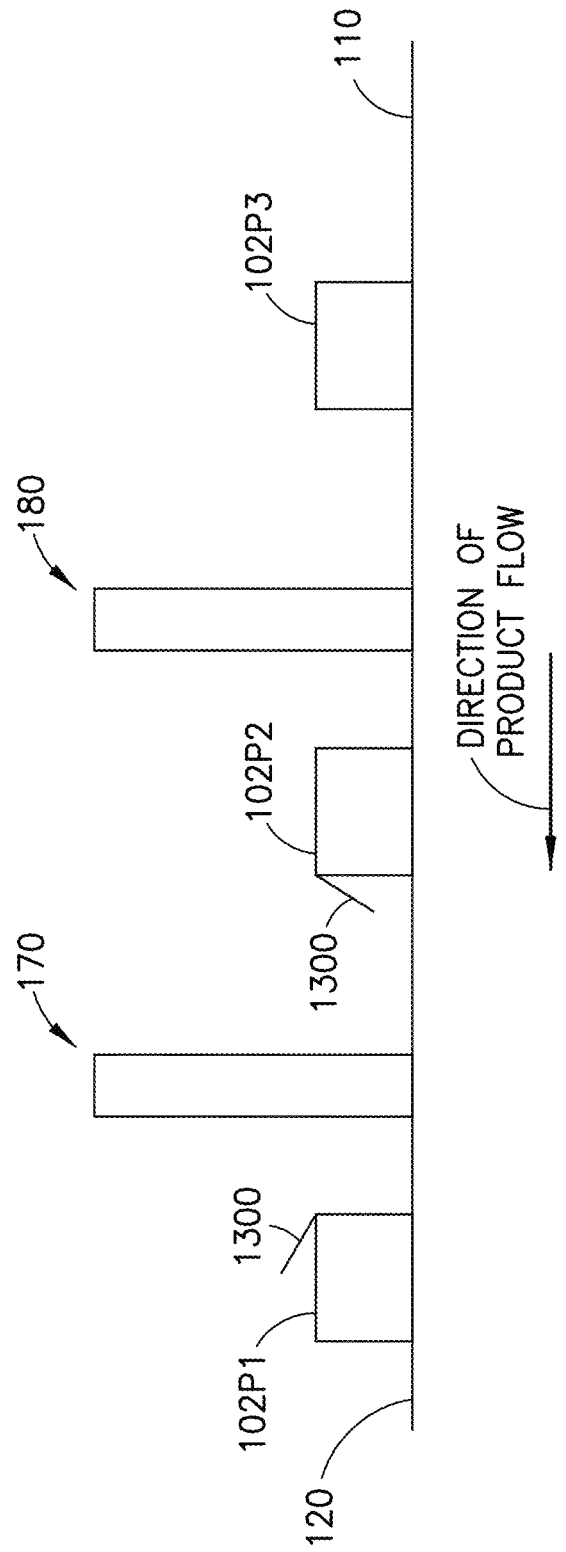
FIG. 21 is a schematic illustration of an operation of the case inspection system of FIGS. 1 and 1A-1C in accordance with aspects of the disclosed embodiment.

As described herein, the flap detection system 170 and the profile detection system 180 operate in parallel where at least some information (case image data) is shared between the systems. For example, to determine if at least some of the parameters noted above are exceeded, the profile detection system 180 sends information on the physical characteristics of any given case (e.g., length, width, height, orientation on the conveyor 110, 120, and in some aspects whether a case exterior protrusion 220 exists) to the flap detection system 170 so that the flap detection system 170 determines whether the parameters/thresholds are exceeded. For example, referring to FIGS. 1 and 21, in operation a flow of products 102P1, 102P2, 102P3 moves along conveyors 110, 120 through the profile detection system 180 and the flap detection system 170. As each cased good 102P1, 102P2, 102P3 passes through the profile detection system 180, the profile detection system 180 detects product characteristics (e.g., length, width, height, protuberances, orientation on the conveyor, etc. as described herein) for each of these cased goods 102P1, 102P2, 102P3 and sends at least some of the detected information to the flap detection system 170. For example, the flap detection system 170 may employ one or more of the length, width, height, and orientation of each respective cased good 102P1, 102P2, 102P3 in combination with the image data 1400 captured by the flap detection system 170 for determining the presence of an open flap. The flap detection system 170 may also employ any detection of a protuberance by the profile detection system 180 to identify areas of interest for a respective cased good 102P1, 102P2, 102P3 at which an open flap may exist.

Referring also to FIGS. 14A-14H, the physical characteristics obtained from the profile detection system 180 by the flap detection system 170, are in one or more aspects, compared to the image data captured by the flap detection system 170 to, for example, confirm or verify the position of each product in the product flow (e.g., the products pass through the flap detection system 170 in the same order as the products passed through the profile detection system 180) and determine whether the products that have passed through the profile detection system 180 are suitable for storage, handling and palletization in the logistics facility 190 (FIG. 1). The physical characteristics obtained by the profile detection system 180 may also be employed by the flap detection system 170 to verify at least some of the physical characteristics of the products 102P1, 102P2, 102P3 as determined by the flap detection system 170 from the image data 1400.

Figure 14A:
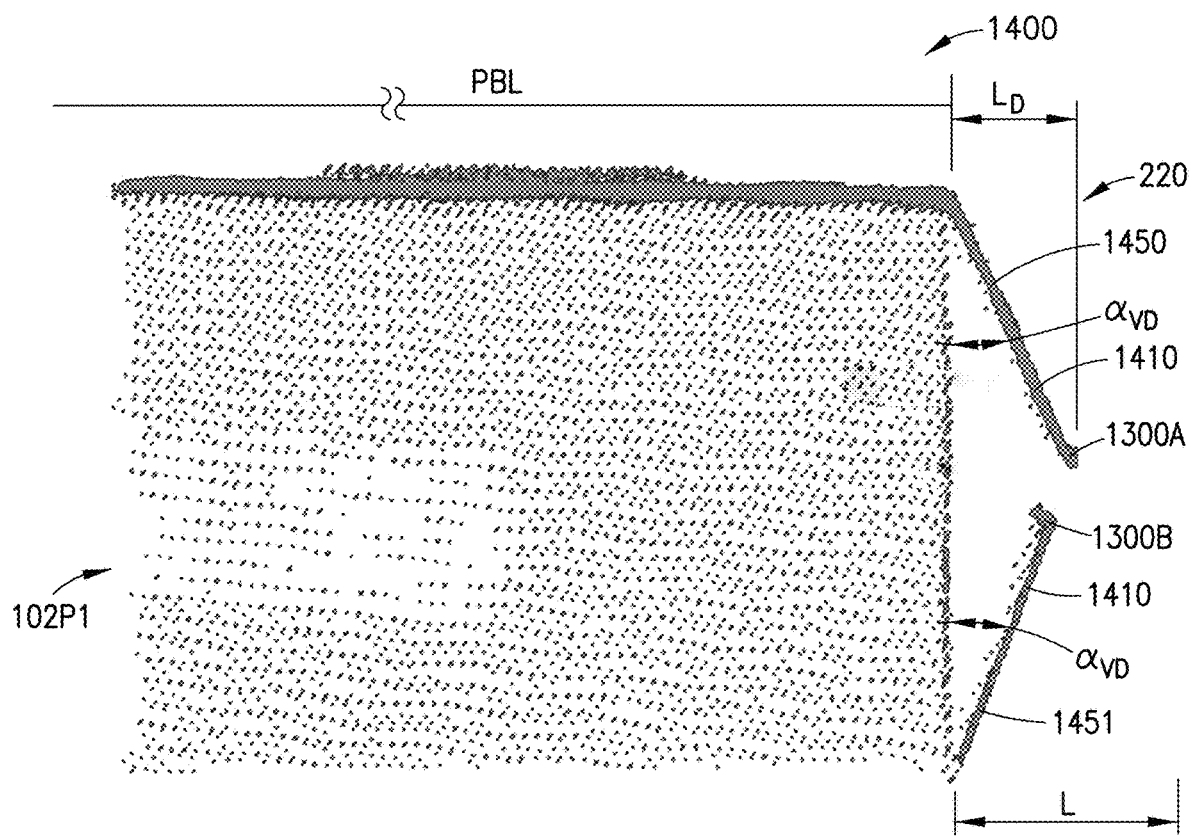
FIGS. 14A-14D are exemplary schematic illustrations showing case image data obtained with case inspection system of FIGS. 1 and 1A-1C in accordance with aspects of the disclosed embodiment.

Referring to FIG. 14A, an example of image data 1400 captured by the flap detection system 170 is illustrated. For explanatory purposes, the image data 1400 illustrated in FIG. 14A is a plan or top view of cased good 102P1. Here the image data is point cloud data but may be any suitable image data that effects image analysis for detecting cased good/product features. In this example, the flap detection system 170 (through any suitable image processing algorithms/programs) determines that the protuberances or case exterior protrusions 1450, 1451, which may have been identified as case exterior protrusions by the profile detection system 180 but not identified as open flaps, are coherent planar surfaces 1410 and identifies these case exterior protrusions 1450, 1451 as open flaps 1300A, 1300B. The flap detection system 170 builds a physical character array 199C (see FIG. 1, Table 1, and Table 2 below) for the cased good 102P1 based on the image data 1400 where the physical character array 199C includes, for example, flap angles $\alpha_{VD}$ (from a vertical side of the product) and a flap length $L_D$ (from the vertical side). The controller 199 compares the data in the physical characteristic array 199C with the corresponding data in the parameter array 199A to determine if any of the thresholds/parameters in the parameter array 199A are exceeded. For example, in FIG. 14A, the flap angles $\alpha_{VD}$ may be greater than the minimum angle $\alpha_{MV}$, while the length $L_D$ of the flaps 1300A, 1300B is less than the length L. Here, based on at least these two parameters when compared to corresponding values of the parameter array 199A (and the notion that a cased good is rejected if more than one of the minimum opening angle for a flap $\alpha_{MH}$, $\alpha_{MV}$, the minimum flap depth MFD, the minimum flap length MFL to product box length PBL ratio, the minimum product box length (or width) increase by flap L, and the minimum product box height increased by flap BH are exceeded), the cased good 102P1 is acceptable and is not rejected (e.g., depending on whether the other parameters are exceeded and/or the number of and which parameters are being considered in the reject determination).

Figure 14B:
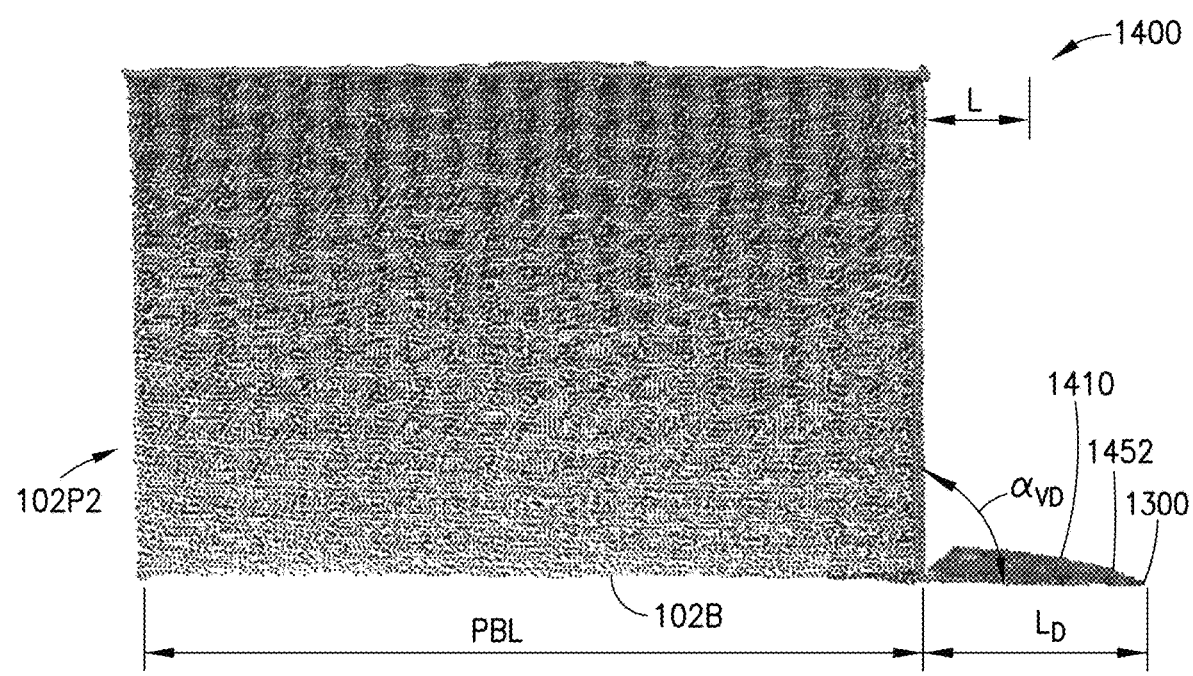

FIG. 14B, is another exemplary illustration of image data 1400 captured by the flap detection system 170. For explanatory purposes, the image data 1400 illustrated in FIG. 14B is a lateral side view of cased good 102P2. Here the image data is point cloud data but may be any suitable image data that effects image analysis for detecting product features. In this example, the flap detection system 170 (through any suitable image processing algorithms/programs) determines that the protuberance or case exterior protrusion 1452, which may have been identified as a case exterior protrusion 220 by the profile detection system 180 but not identified as open flap, is a coherent planar surface 1410 and identifies the case exterior protrusion 1452 as an open flap 1300 (e.g., an open flap hinged to the bottom side 102B of the cased good 102P2). The flap detection system 170 builds the physical character array 199C (FIG. 1) for the cased good 102P2 based on the image data 1400 where the physical character array 199C includes, at least a flap length $L_D$ and a flap angle $\alpha_{VD}$. For example, in FIG. 14B, the flap angle $\alpha_{VD}$ may be greater than the minimum angle $\alpha_{MV}$, while the length $L_D$ of the flaps 1300 is greater than the length L. Here, based on at least these two parameters when compared to corresponding values of the parameter array 199A (and the notion that a cased good is rejected if more than one of the minimum opening angle for a flap $\alpha_{MH}$, $\alpha_{MV}$, the minimum flap depth MFD, the minimum flap length MFL to product box length PBL ratio, the minimum product box length (or width) increase by flap L, and the minimum product box height increased by flap BH are exceeded), the cased good 102P2 may be rejected (e.g., depending on whether the other parameters are exceeded and/or the number of and which parameters are being considered in the reject determination).

Figure 14C:
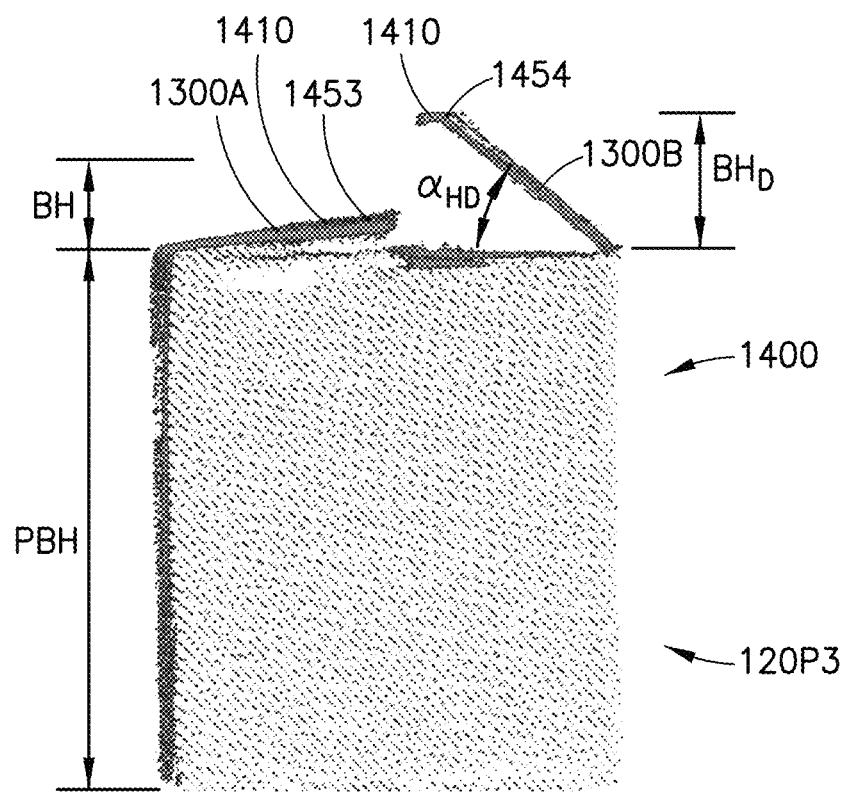
Figure 14D:
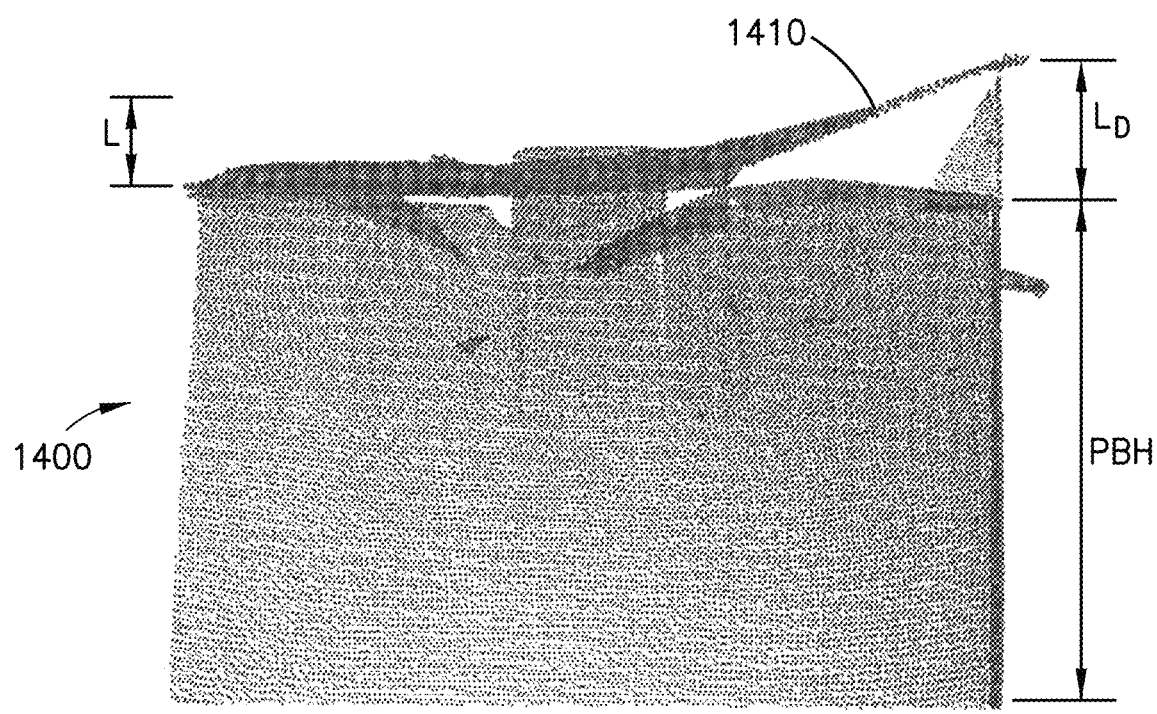

FIG. 14C, is another exemplary illustration of image data 1400 captured by the flap detection system 170. For explanatory purposes, the image data 1400 illustrated in FIG. 14B is a front (or rear/back) side view of cased good 102P3. Here the image data is point cloud data but may be any suitable image data that effects image analysis for detecting cased good/product features. In this example, the flap detection system 170 (through any suitable image processing algorithms/programs) determines that the protuberances or case exterior protrusions 1453, 1454, which may have been identified as case exterior protrusions by the profile detection system 180 but not identified as open flap, are coherent planar surfaces 1410 and identifies the case exterior protrusions 1453, 1454 as open flaps 1300A, 1300B (e.g., an open flap hinged to the top side 102T of the cased good 102P3). The flap detection system 170 builds the physical character array 199C (FIG. 1) for the cased good 102P3 based on the image data 1400 where the physical character array 199C includes, at least a flap height $BH_D$ and a flap angle $\alpha_{HD}$. For example, in FIG. 14C, the flap angle $\alpha_{HD}$ of flap 1300A may be less than the minimum angle $\alpha_{MH}$, the flap angle $\alpha_{HD}$ of flap 1300B may be greater than the minimum angle $\alpha_{MH}$, the height of the flap 1300A is less than the height BH, and the height $BH_D$ of the flap 1300B is greater than the height BH. Here, based on at least the parameters of flap 1300B when compared to corresponding values of the parameter array 199A (and the notion that a cased good is rejected if more than one of the minimum opening angle for a flap $\alpha_{MH}$, $\alpha_{MV}$, the minimum flap depth MFD, the minimum flap length MFL to product box length PBL ratio, the minimum product box length (or width) increase by flap L, and the minimum product box height increased by flap BH are exceeded), the cased good 102P2 may be rejected (e.g., depending on whether the other parameters are exceeded and/or the number of and which parameters are being considered in the reject determination).

Figure 23A:
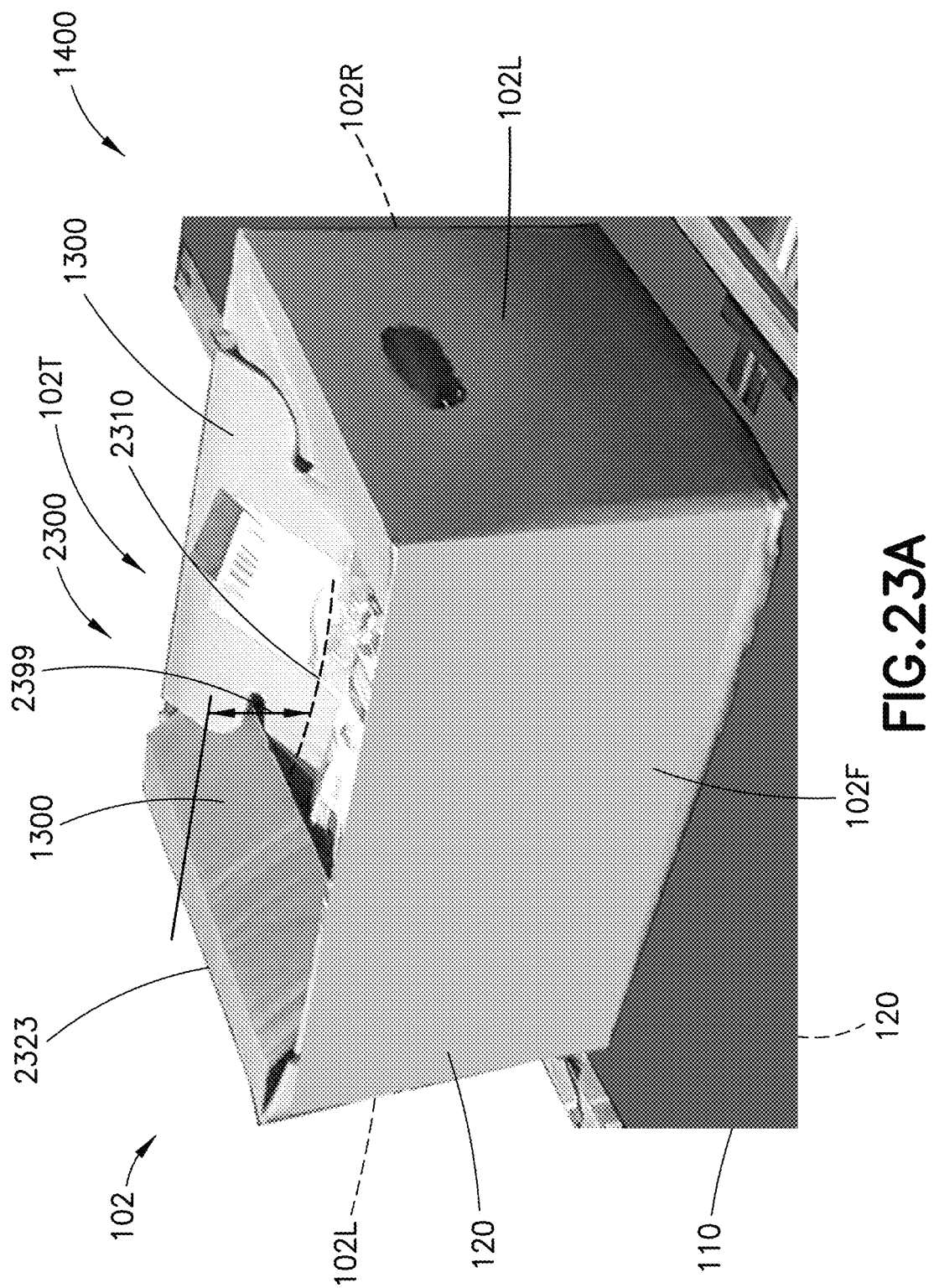
FIG. 23A is schematic perspective illustration of image data obtained with case inspection system of FIGS. 1 and 1A-1C showing a cased good having a concave surface in accordance with aspects of the disclosed embodiment.
Figure 23B:
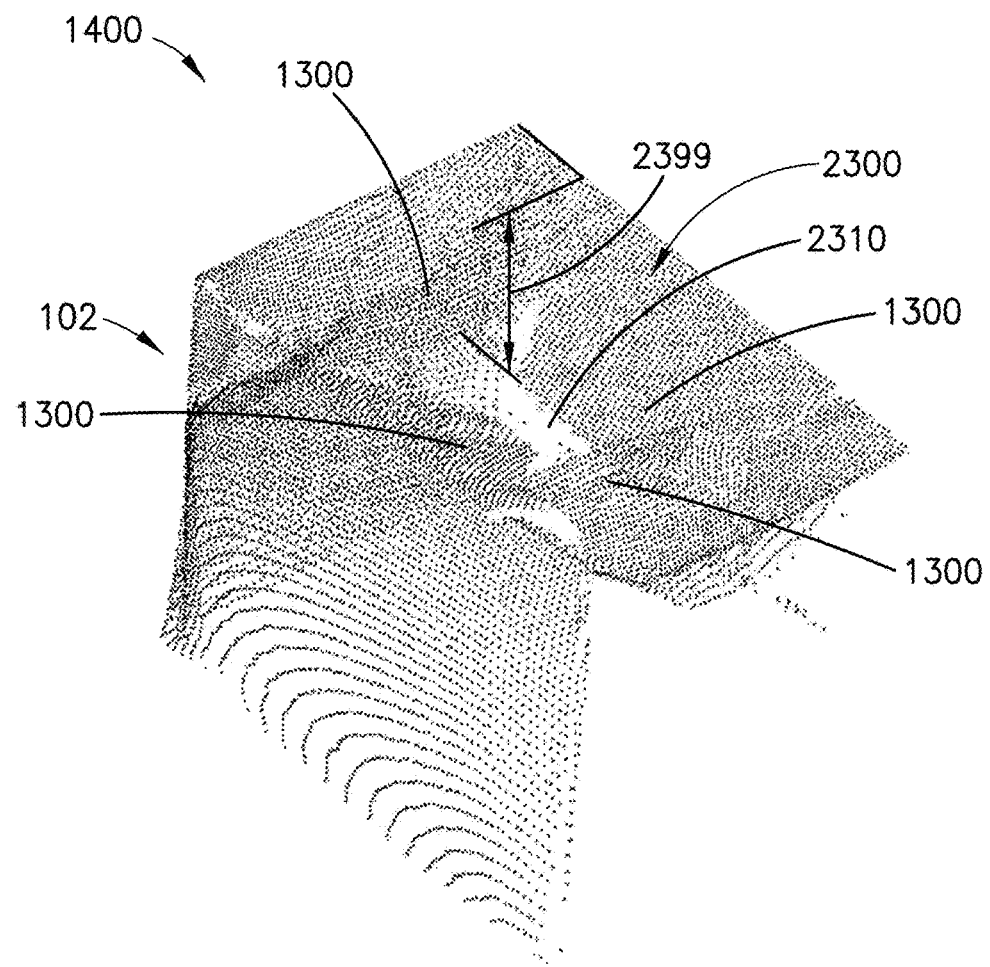
FIG. 23B is an exemplary schematic illustration showing case image data (corresponding with the concave surface of FIG. 23A) obtained with case inspection system of FIGS. 1 and 1A-1C in accordance with aspects of the disclosed embodiment.
Figure 23C:
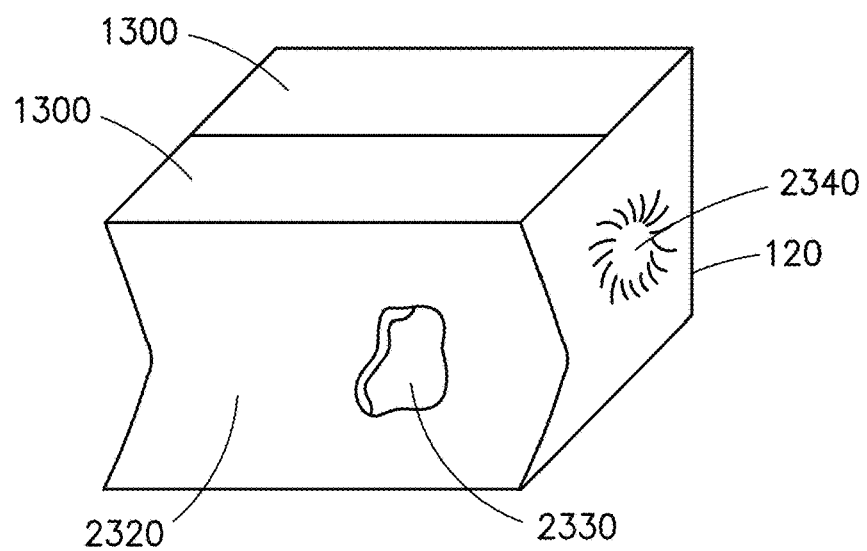
FIG. 23C is schematic perspective illustration of a cased good having a combination of cased goods characteristics (that may affect cased goods handling, storage, and transport) in accordance with aspects of the disclosed embodiment.

FIGS. 23A-23C, are other exemplary illustrations of image data 1400 captured by the flap detection system 170. For explanatory purposes, the image data 1400 illustrated in FIG. 23A is a front (or rear/back) perspective view of cased good 102 with a case side concavity 2300 present on, for example, a top of the cased good 102 (noting the case side concavity may be present on any visible side of the cased good 102 for detection by the flap detection system 170). Here the image data 1400 is a photographic image data of the cased good 102 but may be any other suitable image data that effects image analysis for detecting cased good/product features. FIG. 23B illustrates image data 1400 of the cased good 102 of FIG. 23A as point could data.

In this example, the flap detection system 170 (through any suitable image processing algorithm) determines the presence of a case side concavity 2300 by analyzing one or more sides of the cased good 102 and if a case side concavity 2300 exists, the flap detection system 170 determines a depth of the concavity 2300. As an example, the flap detection system 170 determines (e.g., from a three-dimensional analysis of the cased good 102) the presence of a case side concavity 2300 by determining a failure of one of more case sides to describe a coherent planar surface (i.e., an absence of a coherent planar surface on one or more sides) within a predetermined planar surface threshold criteria (e.g., in a manner substantially opposite to that described above with respect to the case exterior protrusions 220). For example, the absence of a coherent planar surface (or presence of a non-coherent surface) on a side of the cased good 102 may be determined by detecting one or more apertures 2310 that may be formed by, for example, the case flaps 1300. Where the case side concavity 2300 is on a side of the cased good 102 without flaps (or with the flaps but the flaps have not separated to form an aperture 2310 therebetween), absence of a coherent planar surface may be determined by the flap detection system 170 (e.g., from a three-dimensional analysis of the cased good 102) by determining a presence of one or more of a recess 2340, crease 2320, and aperture (puncture) 2330 on a side of the cased good 102. The case side concavity 2300 may be formed in any suitable region of a side of the cased good 102. For example, the case side concavity may be substantially in the middle of a side (see, e.g., recess 2340, aperture 2330, and case side concavity 2300), at the edges of a side (see, e.g., crease 2320 and case side concavity 2300), and/or extend across a side so as to transition from an edge to a middle (or beyond) of the side (see, e.g., crease 2320 and case side concavity 2300).

For exemplary purposes only, a case side concavity is determined if a length-wise dimension (e.g., with respect to the cased goods length, width, and/or height), width-wise dimension (e.g., with respect to the cased goods length, width, and/or height), or diameter of the aperture 2310 (e.g., formed by the flaps 1300) is larger than about 2 inches (in other aspects the criteria for determining the case side concavity may be more than about 2 inches or less than about 2 inches). Similar suitable criteria are applied for the determination of a case side concavity 2300 based on the recess 2340, crease 2320, and aperture (puncture) 2330.

Where a case side concavity 2300 is present, the flap detection system 170 determines a depth 2399 of the non-coherent surface (e.g., concavity, recess, crease, etc.), where the depth 2399 is measured from, for example an edge 2323 of the cased good formed by a side of the cased good on which the non-coherent surface exists and an adjacent side of the cased good (here the depth 2399 is measured from an edge formed by the top 102T of the cased goods and one or more of the vertical sides (e.g., lateral sides 102L and/or longitudinal side 102F, 102R)—see also FIG. 11A). In other aspects, the depth 2399 may be measured from any other suitable reference point of the cased good, such as the bottom or opposite side with respect to the side on which the non-coherent surface is present.

Here, if the depth 2399 of the non-coherent surface is greater than a predetermined threshold (such as for example, about 1 inch (about 25 mm) the cased good 102 is classified as unsuitable (i.e., rejected for not conforming with a respective predetermined case form fit characteristic) for case handling, storage, and palletizing within the logistics facility 190 and is removed from automated handling within the logistics facility 190 in the manner described above. In addition to or in lieu of the depth criteria, unsuitability of the cased goods for case handling, storage, and palletizing within the logistics facility 190 may be determined by a side on which the non-coherent surface is present and/or a location (e.g., region of the side) of the non-coherent surface on the side of the cased good (and/or other suitable criteria that affects case stability when stacked or automated transport/handling of cased good). As an example, vertical sides of the cased good 102 may have a more stringent unsuitability criteria (e.g., a decreased allowance/tolerance for concavity) than horizontal sides of the cased good 102 as the vertical sides act as higher load bearing members than the horizontal sides when the cased goods are stacked for palletization. With respect to a location (e.g., region of the side) of the non-coherent surface (e.g., concavities, recesses, creases, apertures, etc.) on the side of the cased good, the non-coherent surfaces located at edges of the cased good 102 may be held to a more stringent unsuitability criteria (e.g., a decreased allowance/tolerance for concavity) than non-coherent surface in a middle/center of a side. For example, the non-coherent surfaces located at edges of the cased good 102 may provide less stability when stacking cased goods for palletization or may create "catch" or "snag" inducing features on the cased good 102 that would otherwise interfere with case handling and.

Figure 24A:
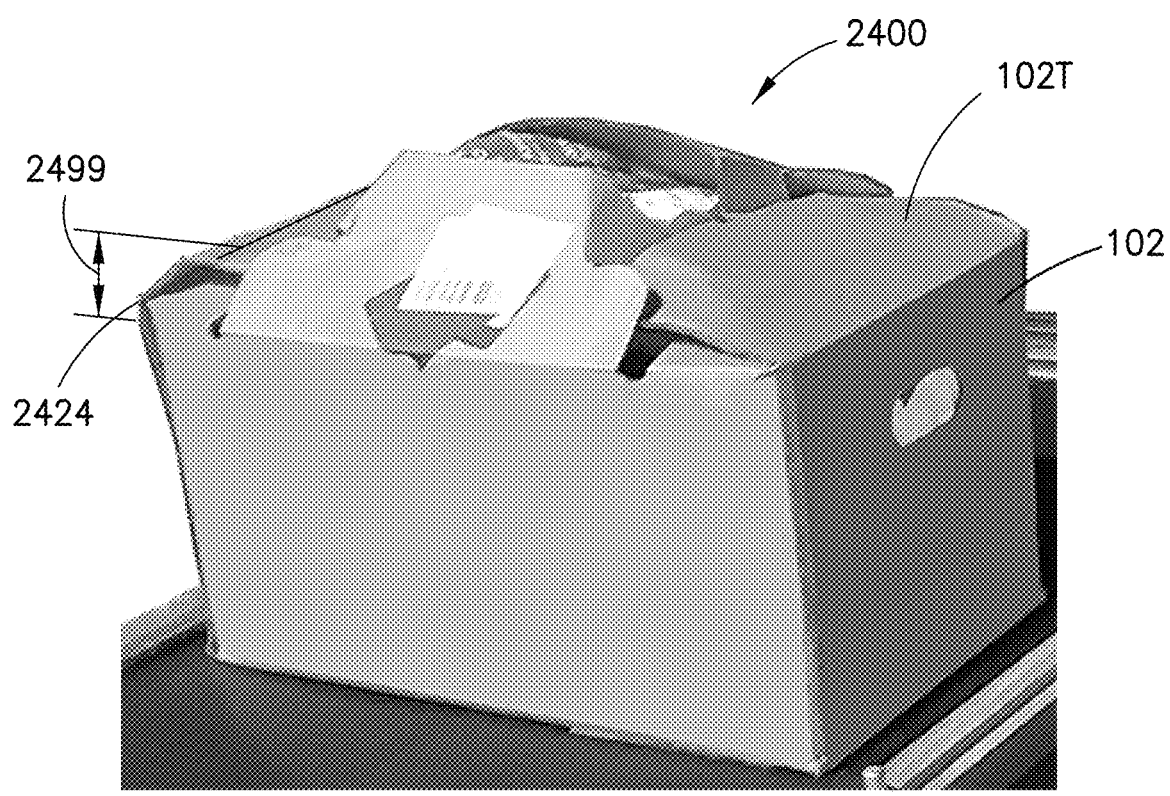
FIG. 24A is a perspective illustration of cased good image data obtained with case inspection system of FIGS. 1 and 1A-1C showing a bulge on a top surface of a cased good in accordance with aspects of the disclosed embodiment.
Figure 24B:
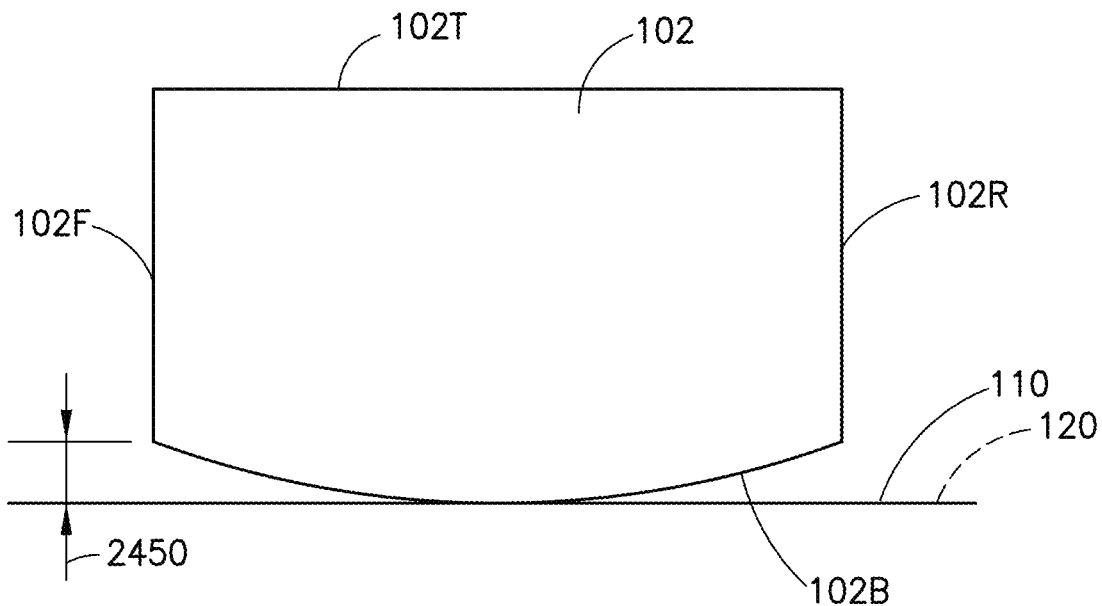
FIG. 24B is an exemplary schematic side illustration of a cased good image data with a bulge on a bottom surface of the cased good in accordance with aspects of the disclosed embodiment.

FIG. 24A, is another exemplary illustration of image data 1400 captured by the flap detection system 170. For explanatory purposes, the image data 1400 illustrated in FIG. 24 is a front (or rear/back) perspective view of cased good 102 with a case bulge 2400 present on, for example, a top of the cased good 102 (noting the bulge 2400 may be present on any visible side of the cased good 102 for detection by the flap detection system 170). Here the image data 1400 is a photographic image data of the cased good 102 but may be any other suitable image data that effects image analysis for detecting cased good/product features. In a manner similar to that described above, three-dimensional analysis of the cased good 102 by the flap detection system 170 determines that the top side 102T, for example, of the cased good 102 is a non-coherent surface; while the top side 102T is used as an example, the non-coherent surface may be present and determined to be on any one or more of the top, lateral and longitudinal sides 102T, 102L, 102R, 102F of the cased good 102). In one or more aspects, a bulge may be detected on a bottom surface 102B of the case good 102 such as from determination (e.g., by the flap detection system 170 and/or the profile detection system 180) of a space 2450 formed by the bulge between the bottom surface 102B of the cased good 102 and the conveyor 110, 120 (see FIG. 24B).

Based on the three-dimensional analysis of the cased good 102 the flap detection system 170 determines a height 2499 of the bulge 2400 formed by the non-coherent surface. The height 2499 is measured from, for example an edge 2424 of the cased good formed by a side of the cased good on which the non-coherent surface exists and an adjacent side of the cased good (here the height 2499 is measured from an edge formed by the top 102T of the cased goods and one or more of the vertical sides (e.g., lateral sides 102L and/or longitudinal side 102F, 102R) (see also FIGS. 11A-11C). In other aspects, the height 2499 may be measured from any other suitable reference point or datum of the cased good, such as the bottom or opposite side with respect to the side on which the non-coherent surface is present. In other aspects, in lieu of or in addition to the determination of the bulge 2400 by the flap detection system 170, the bulge 2400 may be determined by the profile detection system 180 and the image data from the profile detection system 180 may be used by the flap detection system 170, in a manner similar to that described above, for the determination of the bulge dimensions (e.g., three-dimensional profile of the bulge) and conformance of the respective cased good 102 with predetermined fit characteristic to the form substantially ensure proper handling, storage, and palletization of the respective cased good 102 within the logistics facility 190.

Here, if the height 2499 of the non-coherent surface is greater than a predetermined threshold (e.g., such as a bulge of about 1 inch (about 25 mm); or in other aspects more or less than about 1 inch (about 25 mm)) the cased good 102 is classified as unsuitable (i.e., rejected for not conforming with a respective predetermined case form fit characteristic) for case handling, storage, and palletizing within the logistics facility 190 and is removed from automated handling within the logistics facility 190 in the manner described herein. In addition to or in lieu of the height criteria, unsuitability of the cased goods for case handling, storage, and palletizing within the logistics facility 190 may be determined by a side on which the non-coherent surface is present and/or a location (e.g., region of the side) of the non-coherent surface on the side of the cased good (and/or other suitable criteria that affects case stability when stacked or automated transport/handling of cased good). As an example, vertical sides of the cased good 102 may have a different more stringent criteria than horizontal sides of the cased good 102 as the vertical sides act as higher load bearing members than the horizontal sides when the cased goods are stacked for palletization. With respect to a location of the bulge (s), the non-coherent (bulging) surfaces at one corner, diagonal corners, or the middle/center of the cased good 102 side may provide less stability when stacking cased goods for palletization or may create "catch" or "snag" inducing features on the cased good that would otherwise interfere with case handling) and may be held to a more stringent unsuitability criteria than bulging surfaces along substantially an entire edge.

In addition to or in lieu of a determination of one or more of the case good characteristics described above, (e.g., concavity, open flap, real box, max box, max bulge (as determined by one or more of the case inspection system 180 and flap detection system 170), outside box, a length of a protuberance/open flap, orientation angle, distance from one side of the conveyor, etc.), the case inspection system 180 and/or the flap detection system 170 (using information from the case inspection system 180) is/are configured to determine one or more of multiple case detection (FIG. 29), vertical item validation inside a cased good (FIG. 26), maximum narrowing at a top and/or bottom of a cased good (FIGS. 11C, 25, and 27), and a support surface of a tapered case good (FIGS. 25 and 26) for effecting a determination of conformance of a respective cased good with a predetermined case form fit characteristic.

Figure 29:
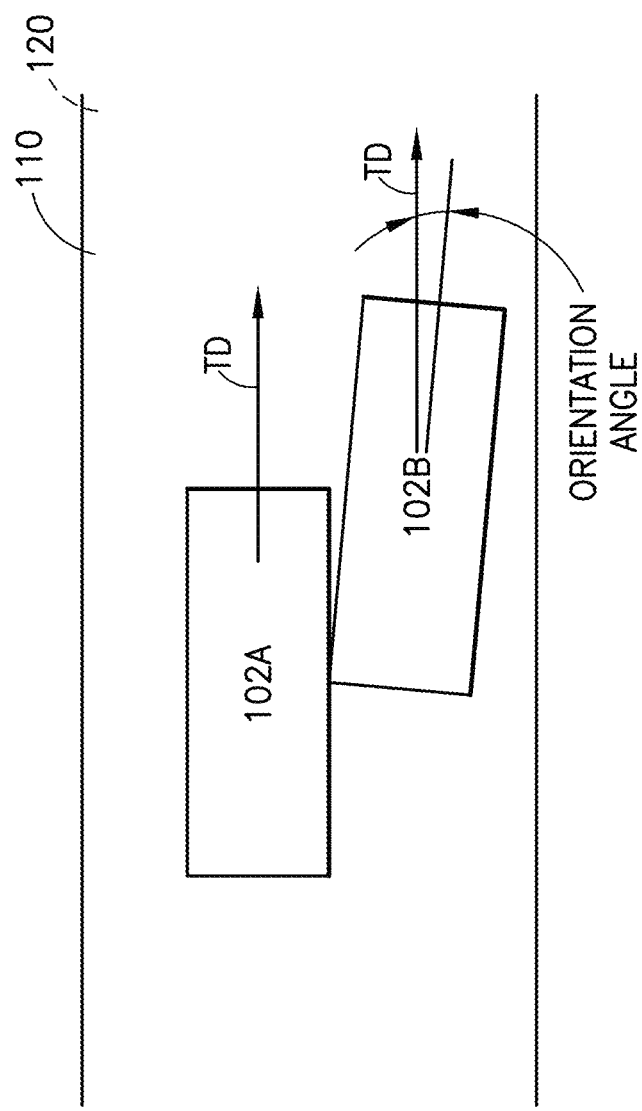
FIG. 29 is a schematic top view illustration of multiple cased goods travelling substantially side by side along a conveyor in accordance with aspects of the disclosed embodiment.

Referring to FIG. 29, an exemplary plan/top image of multiple cased goods 102A, 102B travelling along the conveyor 110, 120 is provided. The image illustrated in FIG. 29 can be provided by one or more of the case inspection system 180 and the flap detection system 170. The controller 199 is configured to, with the image data obtained from the case inspection system 180 and/or the flap detection system 170, distinguish between each of the multiple case goods 102A, 102B and determine (in the manner described herein) the case goods characteristics described herein for each of the cased goods 102A, 102B.

Figure 25:
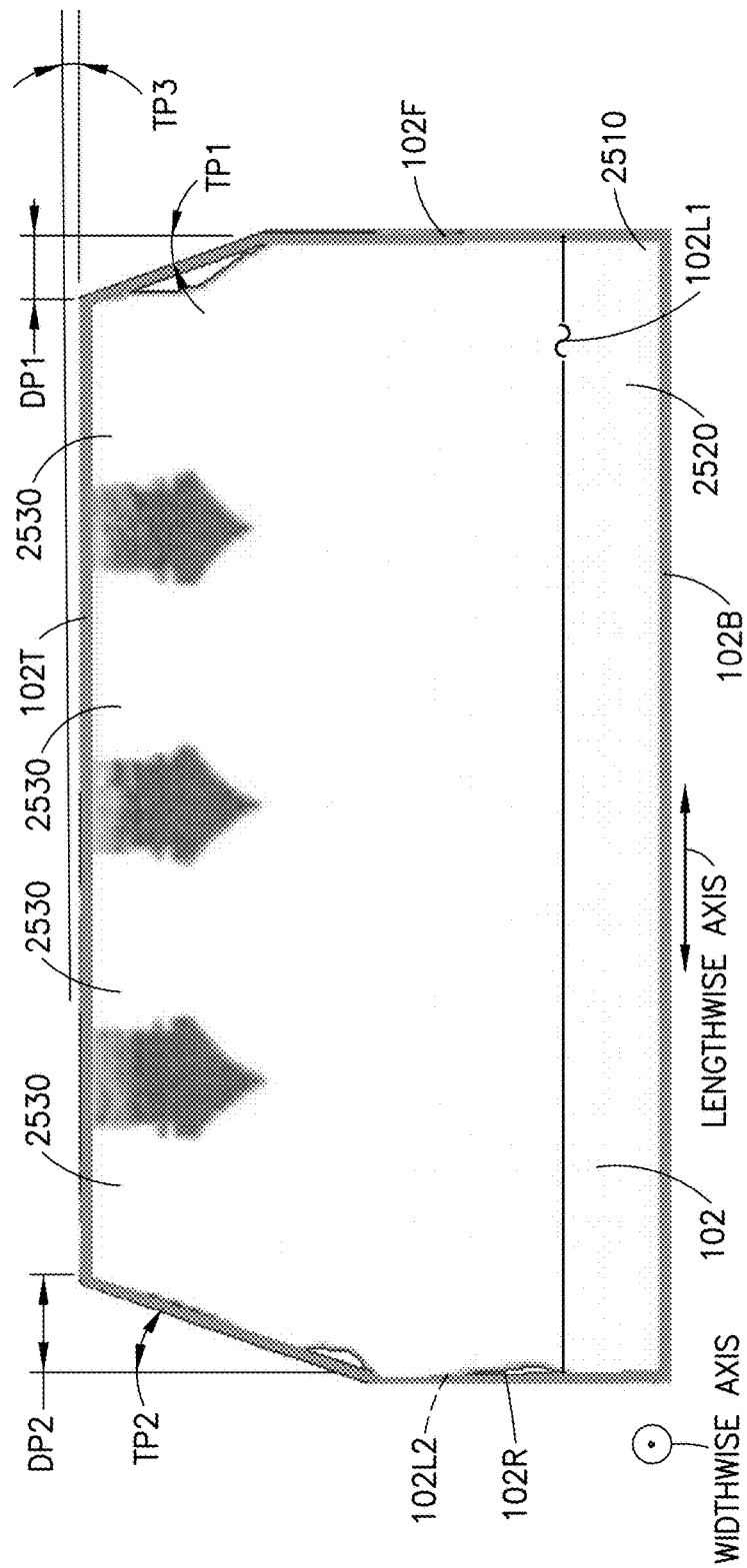
FIGS. 25 and 25A are schematic illustrations of cased goods data, obtained with the case inspection system of FIGS. 1 and 1A-1C, showing side views of a cased good having one or more tapers or narrowing on one or more sides of the cased good in accordance with aspects of the disclosed embodiment.

Referring to FIG. 25, an exemplary image, such as acquired by the flap detection system 170 and/or the case inspection system 180 is provided and illustrates a top taper TP3 of a cased good 102. It is noted that the exemplary image shown in FIG. 25 is a side view (lengthwise axis) of the cased good 102 with a substantially zero orientation angle. In other aspects where the orientation angle is substantially 90 degrees a similar side view (widthwise axis) image is acquired. Where the orientation angle of the cased good 102 on the conveyor 110, 120 does not provide for an elevation (e.g., substantial straight-on side) view, but rather an isometric view of the cased good 120, three-dimensional image data from the flap detection system 170 (which in some aspects is used in combination with the data from the case inspection system 180) may be employed by the controller 199 to determine the top taper TP3 of the cased good along one or more of the lengthwise and widthwise axes. The top taper TP3 is measured from, for example a plane defined by the bottom side 102B (i.e., seating surface) of the cased good 102 that seats against the surface of the conveyor 110, 120 (or that would otherwise seat against a support surface of a storage/holding location or another cased good in a stack of cased goods). Where the top taper TP3 exceeds a predetermined threshold value (e.g., that is based on a stability of other cased goods stacked on top of the cased good 102, such as for example, about 1 inch (about 25 mm)—in other aspects the predetermined threshold value may be more or less than about 1 inch (about 25 mm)) the cased good is rejected in the manner described herein.

The controller 199 is configured to present the top taper TP3 information to a user/operator in any suitable manner, such as through the user interface 198. For example, the controller indicates an amount of taper (along one or more of the lengthwise and widthwise axes), the axis (e.g., lengthwise or widthwise) along which the taper is determined, and the orientation angle of the cased goods. Where a determination of the top taper TP3 is unavailable the controller 199 provides an indication (e.g., through the user interface 198) to the user of top taper unavailability. The top taper may be employed at least when determining, with the controller 199, a pallet build plan.

Still referring to FIG. 25, an exemplary image (obtained from one or more of the case inspection system 180 and flap detection system 170) illustrating a top narrowing of a cased good 102 in the form of a tray 2520 that contains round bottles. The exemplary image is a substantially two-dimensional image of the cased good 102; however in other aspects a three-dimensional image may be provided. Here, the top narrowing indicates a reduction in value (i.e., surface area) of the top 102T relative to the bottom 102B of the cased good 102. Here a leading longitudinal side 102F of the cased good 102 includes a taper having an angle TP1 as measured from, for example, a plane defined by the un-tapered portion of the longitudinal side 102F. A trailing longitudinal side 102R of the cased good 102 includes a taper having an angle TP2 as measured from, for example, a plane defined by the un-tapered portion of the longitudinal side 102R. These tapers TP1, TP2 translate to narrowing values DP1, DP2 that inform a reduced surface area of the top 102T relative to the bottom 102B of the cased good.

Figure 25A:
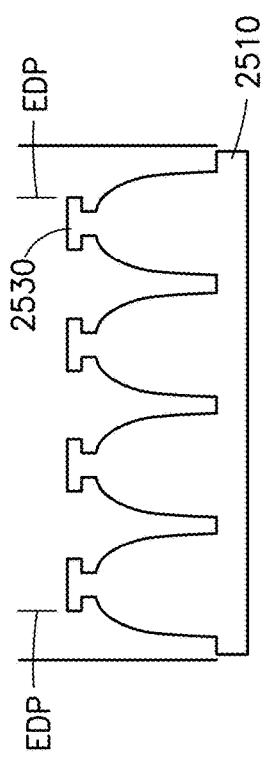

The narrowing values DP1, DP2 may affect an ability of the cased good to be palletized, such that a reduced surface area (i.e., support surface) of the top 102T resulting from the tapers TP1, TP2 may not stably support other case goods 102 stacked thereon. Where the cased good 102 is substantially symmetrical, such as is the case for a cased good containing round bottles as in FIG. 25, the larger of the narrowing values DP1, DP2 is assumed for both the lengthwise and widthwise axes of the cased good; while in other aspects the tapers TP1, TP2 and the resulting narrowing values DP1, DP2 may be determined (such as from the three-dimensional image data from the flap detection system 170 or a combination of the image data from both the flap detection system 170 and the case inspection system 180) for each side 102F, 102R, 102L1, 102L2 of the cased good 102. In other aspects, such as where the cased good 102 includes asymmetric contents (e.g., such as salad dressing bottles having one flat side and one side including a bottle neck taper) the narrowing values DP1, DP2 are provided for only one of the lengthwise and widthwise axes, but the larger of the narrowing values DP1, DP2 is assumed for both the lengthwise and widthwise axes. In the case of bottles, the maximum narrowing value may be substantially the same as the expected distance EDP between an edge 2510 defined by a tray/packaging 2520 holding the bottles and an outer periphery of a bottle cap 2530 (see FIG. 25A); while in other aspects, the maximum narrowing value may be more or less than the expected distance EDP.

Figure 27:
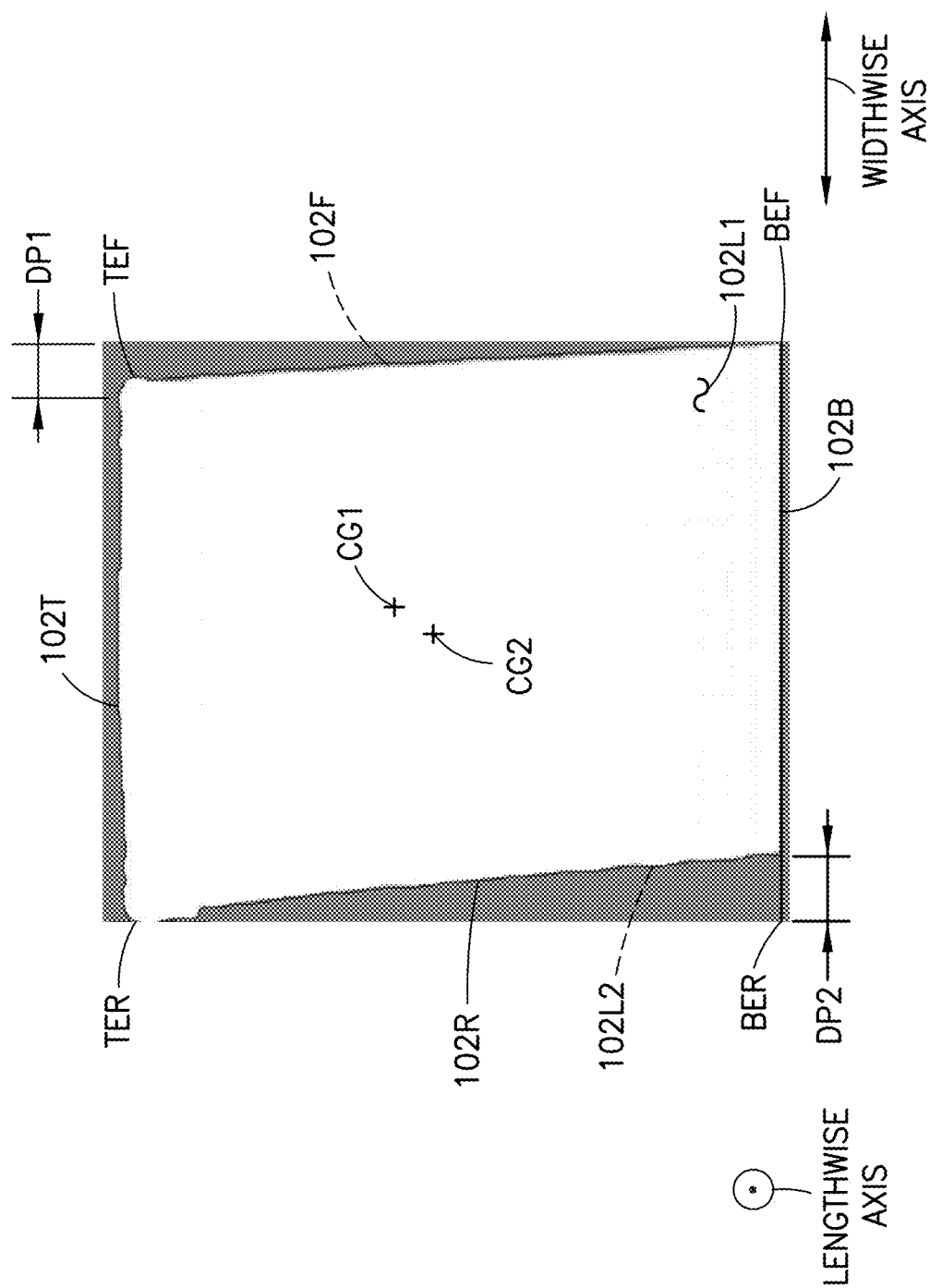
FIG. 27 is a schematic illustration of cased goods data, obtained with the case inspection system of FIGS. 1 and 1A-1C, showing a side view of a cased good having one or more tapers on one or more sides of the cased good in accordance with aspects of the disclosed embodiment.

Referring to FIG. 27, an exemplary image (obtained from one or more of the case inspection system 180 and flap detection system 170) illustrating a top narrowing of a cased good 102 in the form of a box. The exemplary image is a substantially two-dimensional image of the cased good 102; however in other aspects a three-dimensional image may be provided. In the example illustrated the narrowing values DP1, DP1 inform of a tilt/deformed box; however, in other aspects the narrowing values DP1, DP2 may indicate a reduction in value (i.e., surface area) of the top 102T relative to the bottom 102B of the cased good 102 such as where a top 102T of the cased good is creased (see FIG. 23) or is otherwise deformed. Here, a top edge TEF of the cased good 102 on the leading lateral side 102L1 is offset by a narrowing value of DP1 relative to a bottom edge BEF of the cased good 102 on the leading lateral side 102L1. The top edge TER of the cased good 102 on the trailing lateral side 10212 is offset in the same direction as the top edge TEF by a narrowing value of DP2 relative to a bottom edge BER of the cased goods on the trailing lateral side 10212. The narrowing of the top edges TEF, TER in the same direction informs of a tilting of the cased good 102 which may affect stability of the cased good 102, such as when palletized as the tilting may effect a repositioning of the center of gravity of the cased good from CG1 to CG2. In one or more aspects, the larger of the narrowing values DP1, DP2 informing of the tilting of the cased good 102 is assumed for both the widthwise and the lengthwise axes. In the case of a cased good 102 in the form of a box, the maximum narrowing value may be about 1 inch (about 25 mm); while in other aspects, the maximum narrowing value may be more or less than about 1 inch (about 25 mm).

In the examples above, if the narrowing values DP1, DP2 exceed a predetermined maximum narrowing value the cased good 102 is rejected in the manner described herein. In a manner similar to that noted above, the maximum narrowing value may be based on a stability of the cased good when palletized. In one or more aspects, the determined narrowing values DP1, DP1 for the top 102T and/or bottom 102B of the cased good 102 is/are presented to an operator by the controller 199 through the user interface 198 in any suitable manner. The narrowing values (e.g., informing one or more of tilt and support surface) may be employed at least when generating a pallet build plan with the controller 199. The narrowing values (e.g., informing of tilt) may be used to at least to reject cases that would otherwise be mishandled (not able to be picked, not able to be stably supported, etc.) by automation within the logistics facility 190.

Referring also to FIG. 11C, some of the cased good characteristics described herein may not be mutually exclusive. For example, as can be seen in FIG. 11C the narrowing and bulging of a cased good 102 may not be mutually exclusive (e.g., narrowing and bulging may be mutually inclusive). In instances where more than one mutually inclusive cased good characteristics is determined, the controller 199 is configured to identify the mutually inclusive characteristics in accordance with the above description. For example, while narrowing is present for the cased good 102 in FIG. 11C, a top edge TEF substantially delineates a terminus of the narrowing. The controller 199 is configured to distinguish between a substantially planar surface (or substantially constant pitch) of the narrowing portion of the trailing longitudinal side 102R and the variable pitch that informs of the bulge in the top 1021 of the cased good 102. Here, the controller 199 is configured to determine the bulging from a top edge TE identified by the change in pitch of the trailing longitudinal side 102R. In other aspects, the controller 199 is configured to distinguish between the different cased good characteristics described herein in any suitable manner.

Figure 26:
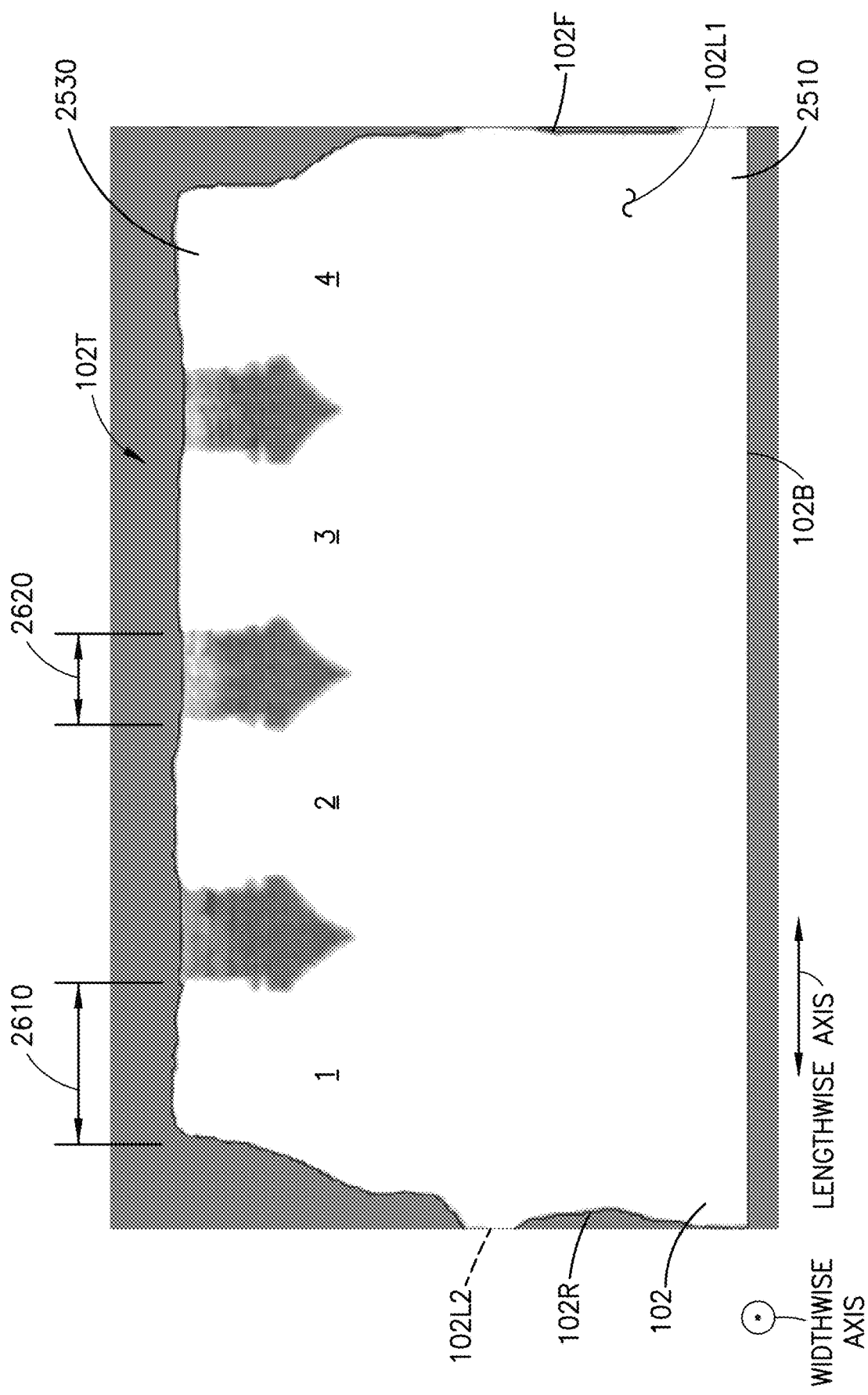
FIG. 26 is a schematic illustration of cased goods data, obtained with the case inspection system of FIGS. 1 and 1A-1C, showing a side view of a cased good having more than one product therein in accordance with aspects of the disclosed embodiment.

Referring to FIG. 26, an exemplary image (obtained from one or more of the case inspection system 180 and flap detection system 170) illustrating vertical item validation inside a cased good is provided. The exemplary image is a substantially two-dimensional image of the cased good 102; however, in other aspects a three-dimensional image may be provided. The vertical item validation provides for one or more of an indication of the number of distinct vertical items that could be observed for an inspected axis (e.g., lengthwise axis and/or widthwise axis), an indication of an average width 2610 of the top (such as bottle cap 2530) of one vertical item as observed for the inspected axis, and an indication of an average width 2620 of gaps between the tops (such as bottle caps 2530) of adjacent vertical items as observed for the inspected axis. The above-noted information obtained from the vertical item validation may be employed by the controller 199 at least when generating a pallet build plan. In the example illustrated the cased good 102 is a case of round bottles similar to that illustrated in FIG. 25.

Here the controller 199 is configured to determine, from the image data obtained from one or more of the case inspection system 180 and flap detection system 170, the number of vertical items within the cased good 102 (in the example shown there are four vertical items arranged along the lengthwise axis; but in other aspects three-dimensional image data from the flap detection system 180 may be employed with or in lieu of two-dimensional image data from case inspection system 180 the to determine the number of vertical item along one or more of the lengthwise and widthwise axes). It is noted that the number of vertical items may be presented by the controller 199 to the operator through the user interface 198 in any suitable manner (noting that the number of vertical items for a cased good in the form of a box is indicated as one vertical item).

The controller 199 is configured to determine, from the image data obtained from one or more of the case inspection system 180 and flap detection system 170, the average width 2610 of the top (such as bottle cap 2530) of one vertical item as observed for the inspected axis (in the example shown the inspected axis is the lengthwise axis; but in other aspects three-dimensional image data from the flap detection system 180 may be employed with or in lieu of two-dimensional image data from case inspection system 180 the to determine the average width 2610 of the top of one vertical item along one or more of the lengthwise and widthwise axes). It is noted that the average width 2610 of the top of one of the vertical items may be presented by the controller 199 to the operator through the user interface 198 in any suitable manner (noting that the average width 2610 of the top of one of the vertical items for a cased good in the form of a box is substantially equal to the entire top surface of the box).

The controller 199 is configured to determine, from the image data obtained from one or more of the case inspection system 180 and flap detection system 170, the average width 2620 of gaps between the tops (such as bottle caps 2530) of adjacent vertical items as observed for the inspected axis (in the example shown the inspected axis is the lengthwise axis; but in other aspects three-dimensional image data from the flap detection system 180 may be employed with or in lieu of two-dimensional image data from case inspection system 180 the to determine the average width 2620 of gaps between the tops of adjacent vertical items). It is noted that the average width 2620 of gaps between the tops of adjacent vertical items may be presented by the controller 199 to the operator through the user interface 198 in any suitable manner (noting that the average width 2620 of gaps between the tops of adjacent vertical items for a cased good in the form of a box is substantially equal to zero).

As noted above, the flap detection system 170 (using data from the case inspection system 180) and the profile detection system 180 determine whether the cased goods 102 that have passed through the profile detection system 180 are suitable for storage, handling, and palletization in the logistics facility 190. For example, as described above, at least one conveyor 110, 120 advances the cased goods 102 into the logistics facility 190. The case inspection station 180, is disposed in communication with the at least one conveyor 110, 120 so that cased goods 102 advance past the case inspection system 180. The case inspection system 180 has at least one case inspection camera (e.g., sensor/imaging device 181, 184) configured so as to capture an image of a shadow of each of the cased goods 102 advanced past the case inspection system 180. At least another camera 171-173 (e.g., of the flap detection system 170) is connected to the case inspection station 180, separate and distinct from the at least one sensor/imaging device 181, 184. The at least another camera 171-173 is arranged to capture other case image data of each of the cased goods 102, advanced past the case inspection system 180, than case image data captured by the at least one sensor/imaging device 181, 184.

Here, the processor 199P of the controller 199 is operably coupled to the at least one conveyor 110, 120. The processor 199P is also communicably coupled to the at least one sensor/imaging device 181, 184, to receive the case image data from the at least one sensor/imaging device 181, 184. The processor 199P is further communicably coupled to the at least another camera 171-173, to receive the other case image data of each of the cased goods 102 from the at least another camera 171-173. Here, the processor 199P (and hence the controller 199) is configured to determine from the image of the shadow of each of the cased goods 102, imaged by the at least one sensor/imaging device 181, 184, a predetermined characteristic (such as those described above)

of each of the cased goods 102 dispositive of case form confirming a respective cased good has a case shape. The predetermined characteristic of each of the cased goods 102 dispositive of case form includes one or more of a case length, case width, case height, inclusive angle between case sides, a box dimension (see FIGS. 13A-20, 25, 25A, 27, 28A and 28B), and any other suitable physical property of the cased goods, such as those described herein, that are dispositive of case form.

The processor 199P/controller 199 is configured that upon confirming the respective cased good 102 has the case shape, to determine from the other image data (e.g., from the flap detection system 170) conformance of the respective cased good 102 with a predetermined case form fit characteristic (such as those described above). As described herein, the predetermined case form fit characteristic informs fit up acceptance of the respective cased good 102 within a predetermined fit up space or location (e.g., a storage space or other holding locations of a storage array 190SA, a payload bay of an autonomous transport vehicle 190ATV, a pallet load build location in a pallet build formed in the logistics facility 190, etc.) of the logistics facility 190.

Figure 28A:
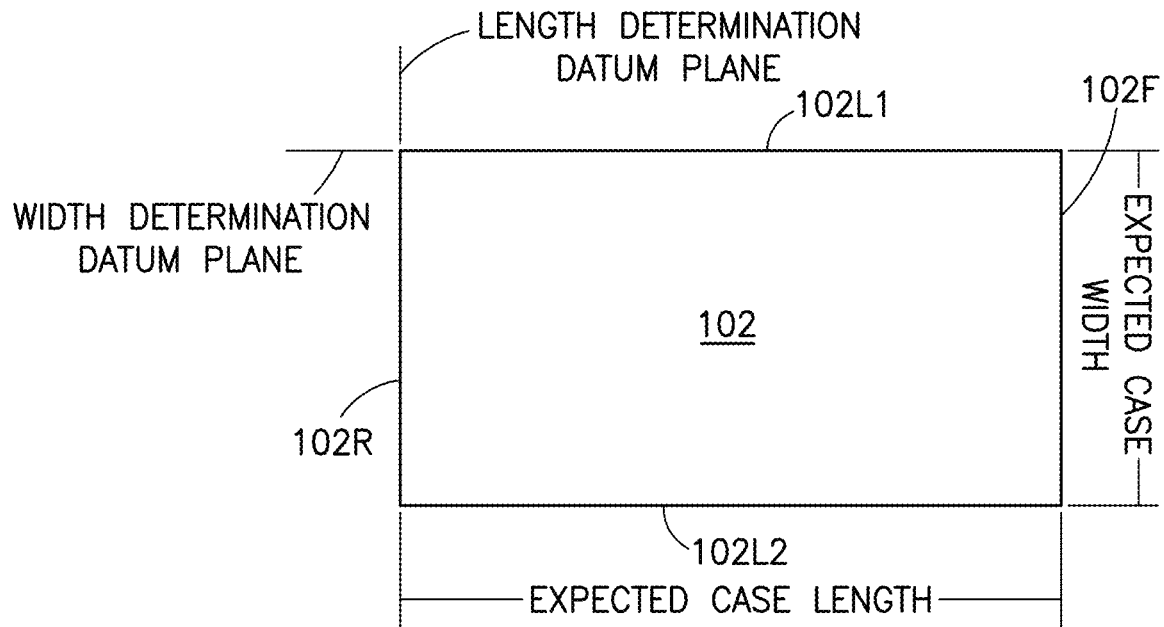
FIG. 28A and FIG. 28B are schematic top and side illustrations of expected cased good dimensions in accordance with aspects of the disclosed embodiment.
Figure 28B:
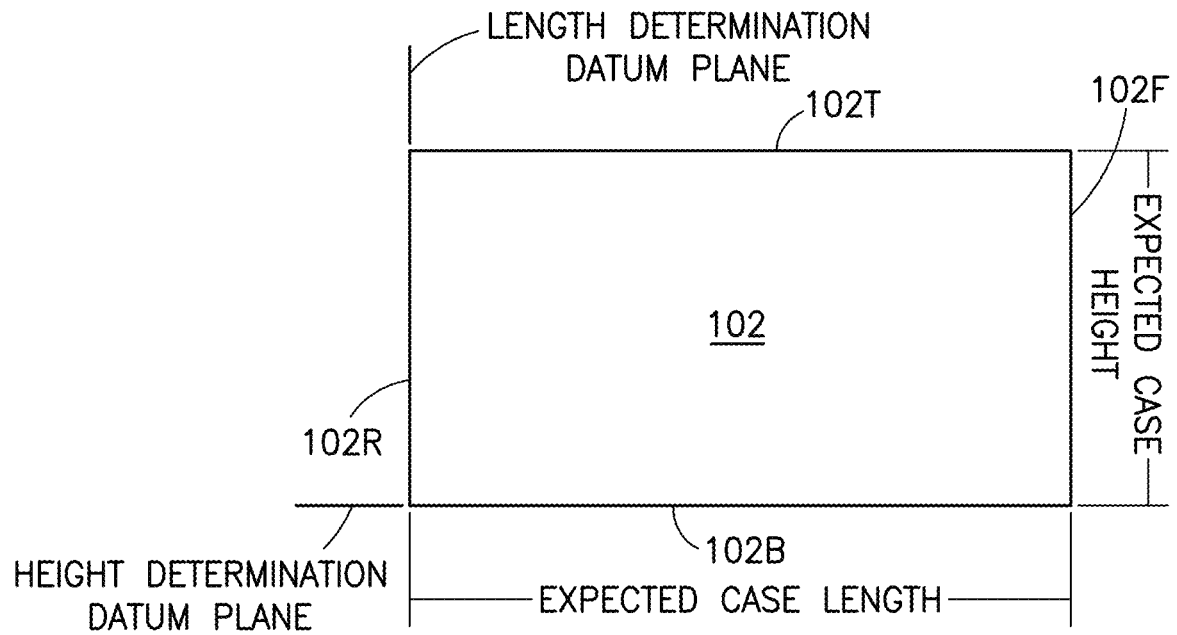

For example, referring to FIGS. 28A and 28B, any given cased good stored/handled by the logistics facility has corresponding expected dimensions in at least case length, case width, and case height (noting the amount of narrowing and/or taper, the number of individual items held, the gap between the individual items, and the width of the tops of the individual items also have expected dimensions). These expected dimensions define a predetermined case shape and form fit for a corresponding cased good 102 to be inserted into the logistics facility 190—noting that each same stock keeping unit (SKU) admitted/inserted to the logistics facility 190 has expected case dimensions defining the form fit of that SKU. The expected dimensions are measured from a predetermined reference datum of the cased good 102 so that uniformity of case goods dimensions exists between case goods of the same type (i.e., the same SKU). For example, as illustrated in FIG. 28A the case length dimension is measured from a length determination datum plane and a case width dimension is measured from a width determination datum plane. The length determination datum plane and the width determination datum plane lie in, for example, a vertical plane defined by one of the lateral sides (e.g., side 102L1) and a vertical plane defined by one of the longitudinal sides (e.g., side 102R). As can be seen in FIG. 28B the case height dimension is measured from a height determination datum plane that is defined by a bottom side 102B (or seating surface) of the cased good 102. These datum planes effect cased good location determination, such as by (but not limited to) the controller 199, palletizer 190P, and autonomous transport vehicle 190ATV for positioning cased goods 102 on, but not limited to, storage shelves in the storage array 190SA, on pallets in a pallet load, on the autonomous transport vehicles 190ATV, for gripping by a robot of the palletizer 190P, and on pickface builders (e.g., any suitable case handling equipment of the logistics facility configured to form a pickface, including but not limited to autonomous transport vehicles 190ATV and pick face builders such as those described in U.S. Pat. No. 9,475,649 issued on Oct. 25, 2016 (titled "Pickface Builder for Storage and Retrieval Systems") previously incorporated herein by reference in its entirety) for formation of pickfaces, where the pickfaces include more than one cased goods that are transported/handled in the logistics facility 190 as a single unit, etc.

The expected case length, the expected case width, and the expected case height include tolerances that allow the actual dimensions of the cased goods to be a predetermined amount above and a predetermined amount below the expected values. The tolerances may be based on sizes of storage spaces in the storage array 190SA, a size of a payload bay of the autonomous transport vehicle 190ATV, a stability of a cased good in a pallet case build, storage space height limitations or any other suitable structural limitations imputed to the case goods by the structure and operation of the logistics facility 190. These expected dimensions for a given case good type (e.g., SKU) inclusive of the tolerances thereof define the predetermined case form fit characteristics of the cased goods 102. The determined case good characteristics determined by the case inspection system 180 and/or the flap detection system 170 inform the actual case form fit characteristics of a given cased good being inspected by the inspection system 100 and the controller 199 determines conformance of the actual case form fit characteristics of a given cased good with the predetermined case form fit characteristics as defined by the expected dimensions.

As described herein, where one or more of the determined dimensions for a cased good 102 exceed an expected dimension (inclusive of any tolerances) of that cased good 102, the cased good is rejected and not admitted to the storage, handling and palletizing processes of the logistics facility 190. The tolerances applied to the expected dimensions (e.g., that establish a go or no-go type criteria for admission of a cased good type into the logistics facility 190) are determined so that the fit up of the cased goods 102 to the storage spaces or other holding locations of the storage array 190SA, the payload bay of the autonomous transport vehicle 190ATV, the pallet load build location in a pallet build formed in the logistics facility 190, and any other suitable location of the logistic facility 190 is, in one aspect, substantially ensured for cased goods 102 that fall within about two standard deviations of a Gaussian distribution of cased goods 102 handled by the logistics facility 190 for a given number of cased goods inspected by the case goods inspection system 100; while in other aspects, the fit up of the cased goods 102 is substantially ensured for cased goods 102 that fall within about three standard deviations of the Gaussian distribution of cased goods handled/inspected by the logistics facility 190. Here substantially ensuring the form fit or fit up of the cased goods to within about two standard deviations (or in some aspects, three standard deviations) for any given number of cased goods 102 inspected by the cased goods inspection system 100 provides for each cased good 102 within the logistics facility substantially always being registerable in a pickface builder, positionable on a shelf (or other storage suitable cased goods holding locations), registerable for picking and placement of the cased goods by an end of arm tool of a palletizing robot of the palletizer 190P, and/or substantially always being stackable in a pallet load formed by the palletizer 190P.

In operation, the flap detection system provides a binary result as to the existence of an open flap (i.e., open flap: yes/no) while the length, width, and height of the cased goods is measured by the profile detection system 180. As an example, where dimensions of a cased good 102 are registered in the controller 199 as being 8 units in width, 10 units in length, and 6 units in height and the cased goods inspection system 100 returns a result from inspecting the cased good 102 that the cased good 102 has a width of 8 units, a length of 13 units and a height of 6 units, the result of open flap detection is true. It is noted that the acceptable tolerances of the cased good dimensions (e.g., with and without the presence of an open flap) may depend on the cased good handling capability of downstream (i.e., after the cased goods inspection system 100) automated cased good handling equipment. For example, Table 1 below illustrates the pass/fail rate of cased goods through the cased goods inspection system 100 with a cased goods dimension tolerance set to 1 unit (for example about 1 inch or about 25 mm—linear dimensions in the Table 1 are in millimeters and angular dimensions are in degrees) and 1 in the pass/fail column indicates a rejected cased good 102 and 0 in the pass fail column indicates an accepted cased good 102.

TABLE 1

| | | Tolerances | | | | | |
|---|---|---|---|---|---|---|---|
| | | 25 | 0.5 | 25 | 25 | | |
| Case ID | Opening Angle | Flap Depth | Flap length to case length ratio | Length increase | Height increase | Pass/fail | Open Flap |
| 447 | 37 | 44 | 0.85 | 26 | 0 | 1 | Y |
| 828 | 24 | 77 | 0.9 | 32 | 0 | 1 | Y |
| 1022 | 23 | 73 | 0.84 | 29 | 0 | 1 | Y |
| 724 | 248 | 141 | 0.92 | 0 | 52 | 1 | Y |
| 88 | 133 | 63 | 0.86 | 46 | 0 | 1 | Y |
| 273 | 90 | 147 | 0.64 | 147 | 0 | 1 | Y |
| 175 | 114 | 96 | 0.89 | 0 | 38 | 1 | Y |
| 473 | 157 | 100 | 0.92 | 39 | 0 | 1 | Y |
| 590 | 65 | 39 | 0.87 | 36 | 0 | 1 | Y |
| 591 | 234 | 65 | 0.91 | 0 | 39 | 1 | Y |
| 3 | 66 | 55 | 0.54 | 51 | 0 | 1 | Y |
| 9 | 208 | 80 | 0.68 | 0 | 70 | 1 | Y |
| 12 | 212 | 70 | 0.92 | 0 | 59 | 1 | Y |
| 6 | 90 | 147 | 0.69 | 147 | 0 | 1 | Y |
| 4 | 202 | 49 | 0.52 | 0 | 46 | 1 | Y |
| 6 | 28 | 56 | 0.69 | 27 | 0 | 1 | Y |
| 8 | 109 | 233 | 0.74 | 0 | 77 | 1 | Y |
| 12 | 252 | 96 | 0.86 | 0 | 30 | 1 | Y |
| 13 | 60 | 62 | 0.82 | 53 | 0 | 1 | Y |
| 23 | 244 | 113 | 0.91 | 0 | 49 | 1 | Y |
| 31 | 177 | 98 | 0.76 | 0 | 98 | 1 | Y |

As can be seen in Table 1 above, the cased goods 102 are rejected when, for example, a 1 inch or 25.4 mm tolerance is employed. However, as noted above, the acceptable tolerances of the cased good dimensions (e.g., with and without the presence of an open flap) may depend on the cased good handling capability of downstream (i.e., after the cased goods inspection system 100) automated cased good handling equipment. As such, where the downstream automated case handling equipment is capable of handling cases with a tolerance of about 2 inches or 50 mm the acceptance rate of the same cased goods is increased as shown in Table 2 below:

TABLE 2

| | | Tolerances | | | | | |
|---|---|---|---|---|---|---|---|
| | | 50 | 0.6 | 50 | 50 | | |
| Case ID | Opening Angle | Flap Depth | Flap length to case length ratio | Length increase | Height increase | Pass/fail | Open Flap |
| 447 | 37 | 44 | 0.85 | 26 | 0 | 0 | N |
| 828 | 24 | 77 | 0.9 | 32 | 0 | 0 | N |
| 1022 | 23 | 73 | 0.84 | 29 | 0 | 0 | N |
| 724 | 248 | 141 | 0.92 | 0 | 52 | 1 | Y |
| 88 | 133 | 63 | 0.86 | 46 | 0 | 0 | N |
| 273 | 90 | 147 | 0.64 | 147 | 0 | 1 | Y |
| 175 | 114 | 96 | 0.89 | 0 | 38 | 0 | N |
| 473 | 157 | 100 | 0.92 | 39 | 0 | 0 | N |
| 590 | 65 | 39 | 0.87 | 36 | 0 | 0 | N |
| 591 | 234 | 65 | 0.91 | 0 | 39 | 0 | N |
| 3 | 66 | 55 | 0.54 | 51 | 0 | 0 | N |
| 9 | 208 | 80 | 0.68 | 0 | 70 | 1 | Y |
| 12 | 212 | 70 | 0.92 | 0 | 59 | 1 | Y |
| 6 | 90 | 147 | 0.69 | 147 | 0 | 1 | Y |
| 4 | 202 | 49 | 0.52 | 0 | 46 | 0 | N |
| 6 | 28 | 56 | 0.69 | 27 | 0 | 0 | N |
| 8 | 109 | 233 | 0.74 | 0 | 77 | 1 | Y |
| 12 | 252 | 96 | 0.86 | 0 | 30 | 0 | N |
| 13 | 60 | 62 | 0.82 | 53 | 0 | 1 | Y |
| 23 | 244 | 113 | 0.91 | 0 | 49 | 0 | N |
| 31 | 177 | 98 | 0.76 | 0 | 98 | 1 | Y |

It is noted with respect to Table 2 that the indication of an open flap has changed from that in Table 1 for the same cased goods because of the condition that a minimum number of parameters must be met for an open flap to be detected. In the examples of Table 1 and Table 2 all of the parameters (noting that the flap depth parameter is accounted for in the flap length to case length parameter) are to be met before an open flap is detected. In the case of Table 2 the increased tolerance decreased the number of detected open flaps and increases the number of accepted cased goods.

The process may also determine through comparison of the expected cased good dimensions and the actual (i.e., measured) cased good dimensions and the existence of an open flap that the open flap extends in one or more of the length-wise direction, the width-wise direction, and height-wise direction of the cased good 102. This and any other suitable information may be presented to an operator through the user interface 198 as described herein. The flap detection system 170 supports open flap detection on any of the five visible sides of the cased goods 102 that are not seated on the conveyor 110, 120. In one or more aspects, the flap detection system 170 employs the case image data to estimate the core dimensions (e.g. length, width, and height without any case exterior protrusions or open flaps) of the cased goods even in the presence of an open flap and/or case exterior protrusion. Here, the flap detection system 170 includes any suitable number of sensors 171-173 (such as more than two or employ the use of mirrors to view the cased goods from more than two angles) so that imaging of the cased goods sides is not obstructed or otherwise occluded by an open flap. Estimation of the core dimensions of the cased goods 102 by the flap detection system 170 may verify the acceptance or rejection of any given cased good by the profile detection system 180. For example, where a cased good is rejected by the profile detection system 180 for being out of tolerance (e.g., one or more of the length, width, and/or height exceeds a corresponding predetermined (e.g., expected) length, width, and/or height) due to an open flap (i.e., the core dimensions of the cased good are within tolerance but the presence of the open flap causes an out of tolerance condition to be detected by the profile detection system 180), the flap detection system 170 verifies that the out of tolerance condition is due to the open flap and whether the open flap can be processed by downstream (i.e., after the cased goods inspection system 100) automated equipment. Where the cased good with the open flap cannot be processed by the downstream automated equipment the cased good may be rejected.

Figure 22:
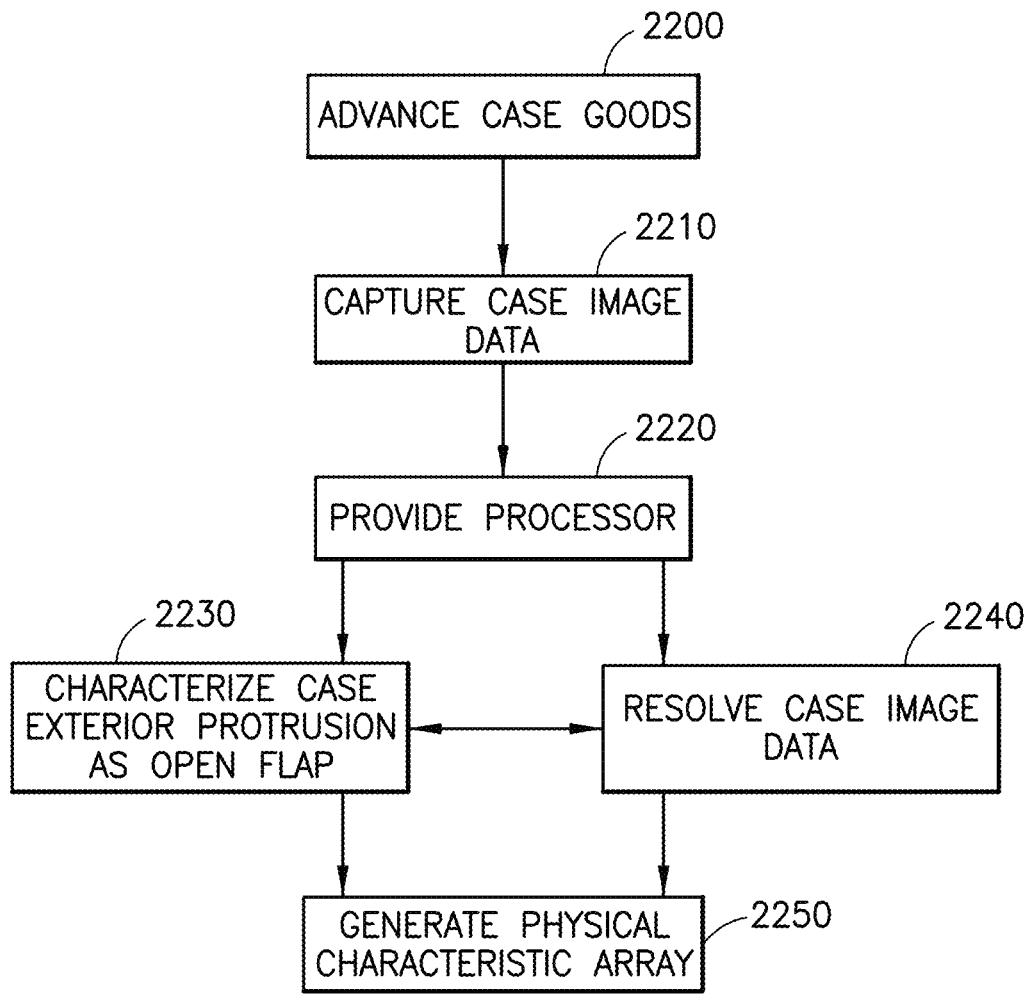
FIG. 22 is an exemplary flow diagram of a method (s) in accordance with aspects of the disclosed embodiment.

Referring to FIGS. 1, 1A-1C and 22, a method for the inspection of cased goods 102 will be described in accordance with one or more aspects of the disclosed embodiment. In accordance with the method, the cased goods 102 are advanced with at least one conveyor 110, 120 past the cased goods inspection system 100 (FIG. 22, Block 2200). The at least one sensor 171-173 captures case image data 1400 (FIGS. 14A-14D and FIG. 22, Block 2210) of each of the cased goods 102 advanced with the at least one conveyor 110, 120 past the cased goods inspection system 100. The processor 199P is provided (FIG. 22, Block 2220) where in one or more aspects the processor 199P characterizes, from the case image data, a case exterior protrusion 220 (FIGS. 2A and 2B), of the cased good 102 as a case flap in open condition (FIG. 22, Block 2230), wherein the processor 199P is configured to resolve the case image data 1400 and determine the case exterior protrusion 220 is a coherent planar surface 1410 (FIGS. 14A-14D), and is programmed with a parameter array of physical characteristic parameters 199A that describe case flap coherency attributes determinative of the coherent planar surface 1410 defining an open case flap condition. In one or more aspects, the processor 199P resolves the case image data 1400 and determines the case exterior protrusion 220 is the coherent planar surface 1410 (FIG. 22, Block 2240). The processor 199P generates from the case image data 1400, for each coherent planar surface 1410 determined, a physical characteristic array 199C (FIG. 22, Block 2250) and applies the parameter array 199A to the physical characteristic array 199C so as to resolve the coherent planar surface 1410 as being an open case flap.

Figure 30:
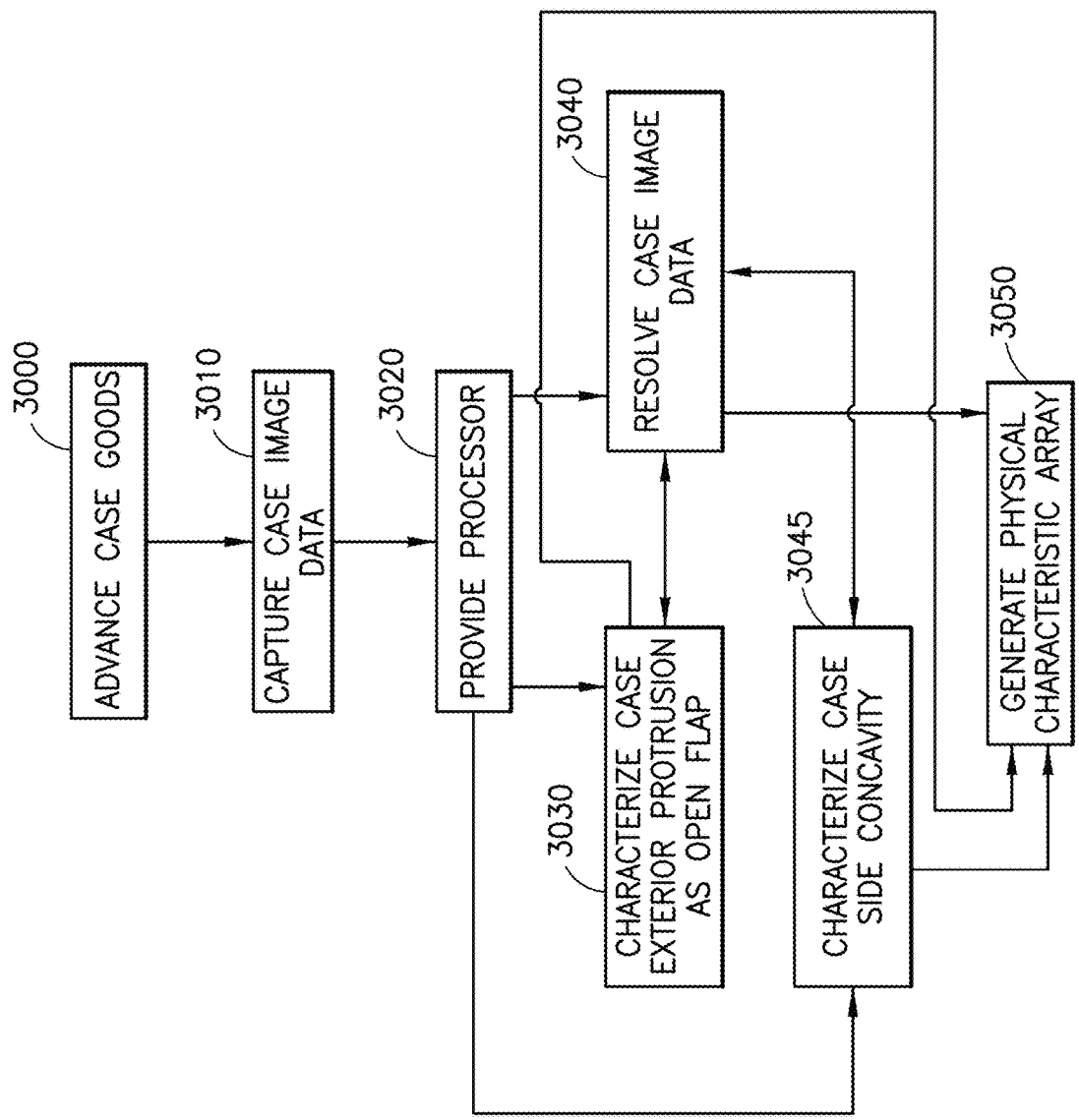
FIG. 30 is an exemplary flow diagram of a method (s) in accordance with aspects of the disclosed embodiment.

Referring now to FIGS. 1, 1A-1C, 2B, 23A, and 29, a method in an inspection apparatus for inspection of cased goods will be described. In the method the at least one conveyor 110, 120 advances the cased goods 102 past the inspection apparatus 100 (FIG. 30, Block 3000). The least one camera 171-173 captures case image data of each of the cased goods 102 advanced with the at least one conveyor 110, 120 past the inspection apparatus 100 (FIG. 30, Block 3010). The processor 199P is provided (FIG. 30, Block 3020) and receives the case image data 1400 from the at least one camera 171-173. As described herein, the processor 199P is operably coupled to the at least one conveyor 110, 120 and is communicably coupled to the at least one camera 171-173, and the processor 199P is configured to characterize, from the case image data 1400 generated from a common image of the cased goods 102 captured by the at least one camera 171-173 and resolved by the processor 199P (FIG. 30, Block 3040), at least one of a case side concavity and a case exterior protrusion of the cased goods as a case flap in open condition (FIG. 30, Blocks 3030 and 3045).

The processor 199P resolves the case image data (see FIG. 30, Block 3040) and determines the case exterior protrusion 220 is a coherent planar surface, the processor being programmed with a parameter array of physical characteristic parameters 199A that describe case flap coherency attributes determinative of the coherent planar surface defining an open case flap condition. The processor generates from the case image data 1400, for each coherent planar surface determined, a physical characteristic array 199C (FIG. 30, Block 3050) and applies the parameter array 199A to the physical characteristic array 199C so as to resolve the coherent planar surface as being an open case flap.

In the method the at least one camera 171-173 is arranged to capture the case image data 1400 of each of the cased goods advanced with the at least one conveyor 110, 120 past the inspection apparatus 100, so that the case image data 1400 embodies the at least one of the case side concavity 2300 and the case exterior protrusion 220 with the at least one of the case side concavity 2300 and the case exterior protrusion 220 apparent on at least one exposed case side 102T, 102L, 102F, 120R and the at least one exposed case side 102T, 102L, 102F, 120R is disposed in each exposed case side orientation of the cased goods. In the method, another imaging system (e.g., the profile detection system 180) is provided. The profile detection system 180 is separate and distinct from the at least one camera 171-173, imaging the cased goods 102, separate and distinct from the at least one camera 171-172 imaging of the cased goods 102, for inspection of the cased goods 102 other than detection of the at least one of the case side concavity and the case open flap as described herein.

In accordance with one or more aspects of the disclosed embodiment, an inspection apparatus for inspection of cased goods is provided. The inspection apparatus comprising:

at least one conveyor configured to advance the cased goods past the inspection apparatus;

at least one camera arranged to capture case image data of each of the cased goods advanced with the at least one conveyor past the inspection apparatus;

a processor operably coupled to the at least one conveyor, and communicably coupled to the at least one camera to receive the case image data from the at least one camera, wherein the processor is configured to characterize, from the case image data, a case exterior protrusion of the cased good as a case flap in open condition, wherein the processor is configured to resolve the case image data and determine the case exterior protrusion is a coherent planar surface, and is programmed with a parameter array of physical characteristic parameters that describe case flap coherency attributes determinative of the coherent planar surface defining an open case flap condition, and wherein the processor is configured to generate from the case image data, for each coherent planar surface determined, a physical characteristic array and apply the parameter array to the physical characteristic array so as to resolve the coherent planar surface as being an open case flap.

In accordance with one or more aspects of the disclosed embodiment, the at least one camera is arranged to image each exposed case side of each of the cased goods advanced with the at least one conveyor past the inspection apparatus so as to image the case exterior protrusion apparent on each imaged exposed case side.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture the case image data for each exposed case side of each of the cased goods advanced with the at least one conveyor past the inspection apparatus, so that the case image data captured of each of the cased goods embodies each exposed case side of a respective case exterior.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture case image data of each of the cased goods advanced with the at least one conveyor past the inspection apparatus, so that the case image data embodies the case exterior protrusion with the case exterior protrusion apparent on at least one exposed case side and the at least one exposed case side disposed in each exposed case side orientation of the cased goods.

In accordance with one or more aspects of the disclosed embodiment, the at least one exposed case side imaged by the at least one camera is disposed so that the open case flap, resolved from the case exterior protrusion apparent on the imaged at least one exposed case side extends, from the at least one exposed case side, adjacent a conveyor seat surface on which the cased good is seated.

In accordance with one or more aspects of the disclosed embodiment, the inspection apparatus further comprises another imaging system separate and distinct from the at least one camera, wherein the other imaging system images a different characteristic of the cased goods, advanced with the at least one conveyor past the inspection apparatus, different from physical characteristic of the physical characteristic array.

In accordance with one or more aspects of the disclosed embodiment, the at least one camera captures case image data substantially simultaneously with the other imaging system imaging the different characteristic of the cased goods.

In accordance with one or more aspects of the disclosed embodiment, the inspection apparatus further comprises another imaging system separate and distinct from the at least one camera, and the other imaging system images the cased goods, separate and distinct from the at least one camera imaging of the cased goods, for inspection of the cased goods other than detection of the open case flap.

In accordance with one or more aspects of the disclosed embodiment, the other imaging system images the cased goods for processor validation of identity of each of the cased goods and conformity of each of the cased goods with case size parameters for the validated cased good.

In accordance with one or more aspects of the disclosed embodiment, the processor is configured so that cased goods inspection based on cased good images from the other imaging system is resolved separate and distinct from resolving the open case flap from the case image data of the at least one camera.

In accordance with one or more aspects of the disclosed embodiment, the processor is configured so as to determine a presence of the case exterior protrusion from imaging of the other imaging system separate and distinct from the case image data captured with the at least one camera, and resolve the case exterior protrusion as being an open case flap from the case image data of the at least one camera separate and distinct from images of the other imaging system.

In accordance with one or more aspects of the disclosed embodiment, the processor is configured so as to determine a presence of the case exterior protrusion from the case image data captured by the at least one camera, independent of the images of the cased good captured by the other imaging system.

In accordance with one or more aspects of the disclosed embodiment, an inspection apparatus for inspection of cased goods is provided. The inspection apparatus comprising:

at least one conveyor configured to advance the cased goods past the inspection apparatus;

at least one camera arranged to capture case image data of each of the cased goods advanced with the at least one conveyor past the inspection apparatus;

a processor operably coupled to the at least one conveyor, and communicably coupled to the at least one camera to receive the case image data from the at least one camera, wherein the processor is configured to characterize, from the case image data, a case exterior protrusion of the cased good that is an open case flap, wherein the processor is configured to:

resolve the case image data and determine the case exterior protrusion is a coherent planar surface, and generate from the case image data, for each coherent planar surface determined, a physical characteristic array of physical characteristics of the coherent planar surface so that the physical characteristic array describes the coherent planar surface as a case flap and determines, based on a parameter array of parameter physical characteristics, that the case flap is in an open flap condition.

In accordance with one or more aspects of the disclosed embodiment, the parameter array of parameter physical characteristics describe case flap coherency attributes determinative of the coherent planar surface defining the open case flap condition.

In accordance with one or more aspects of the disclosed embodiment, the at least one camera is arranged to image each exposed case side of each of the cased goods advanced with the at least one conveyor past the inspection apparatus so as to image the case exterior protrusion apparent on each imaged exposed case side.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture the case image data for each exposed case side of each of the cased goods advanced with the at least one conveyor past the inspection apparatus, so that the case image data captured of each of the cased goods embodies each exposed case side of a respective case exterior.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture case image data of each of the cased goods advanced with the at least one conveyor past the inspection apparatus, so that the case image data embodies the case exterior protrusion with the case exterior protrusion apparent on at least one exposed case side and the at least one exposed case side disposed in each exposed case side orientation of the cased goods.

In accordance with one or more aspects of the disclosed embodiment, the at least one exposed case side imaged by the at least one camera is disposed so that the open case flap, resolved from the case exterior protrusion apparent on the imaged at least one exposed case side extends, from the at least one exposed case side, adjacent a conveyor seat surface on which the cased good is seated.

In accordance with one or more aspects of the disclosed embodiment, the inspection apparatus further comprises another imaging system separate and distinct from the at least one camera, wherein the other imaging system images a different characteristic of the cased goods, advanced with the at least one conveyor past the inspection apparatus, different from physical characteristic of the physical characteristic array.

In accordance with one or more aspects of the disclosed embodiment, the at least one camera captures case image data substantially simultaneously with the other imaging system imaging the different characteristic of the cased goods.

In accordance with one or more aspects of the disclosed embodiment, the inspection apparatus further comprises another imaging system separate and distinct from the at least one camera, and the other imaging system images the cased goods, separate and distinct from the at least one camera imaging of the cased goods, for inspection of the cased goods other than detection of the open case flap.

In accordance with one or more aspects of the disclosed embodiment, the other imaging system images the cased goods for processor validation of identity of each of the cased goods and conformity of each of the cased goods with case size parameters for the validated cased good.

In accordance with one or more aspects of the disclosed embodiment, the processor is configured so that cased goods inspection based on cased good images from the other imaging system is resolved separate and distinct from resolving the open case flap from the case image data of the at least one camera.

In accordance with one or more aspects of the disclosed embodiment, the processor is configured so as to determine a presence of the case exterior protrusion from imaging of the other imaging system separate and distinct from the case image data captured with the at least one camera, and resolve the case exterior protrusion as being an open case flap from the case image data of the at least one camera separate and distinct from images of the other imaging system.

In accordance with one or more aspects of the disclosed embodiment, the processor is configured so as to determine a presence of the case exterior protrusion from the case image data captured by the at least one camera, independent of the images of the cased good captured by the other imaging system.

In accordance with one or more aspects of the disclosed embodiment, a method for inspection of cased goods is provided. The method comprising:
  advancing, with at least one conveyor, the cased goods past an inspection apparatus;
  capturing, with at least one camera, case image data of each of the cased goods advanced with the at least one conveyor past the inspection apparatus;
  providing a processor operably coupled to the at least one conveyor, and communicably coupled to the at least one camera to receive the case image data from the at least one camera, and with the processor:
  characterizing, from the case image data, a case exterior protrusion of the cased good as a case flap in open condition, wherein the processor is configured to resolve the case image data and determine the case exterior protrusion is a coherent planar surface, and is programmed with a parameter array of physical characteristic parameters that describe case flap coherency attributes determinative of the coherent planar surface defining an open case flap condition, and
  wherein the processor generates from the case image data, for each coherent planar surface determined, a physical characteristic array and applies the parameter array to the physical characteristic array so as to resolve the coherent planar surface as being an open case flap.

In accordance with one or more aspects of the disclosed embodiment, the at least one camera is arranged to image each exposed case side of each of the cased goods advanced with the at least one conveyor past the inspection apparatus so as to image the case exterior protrusion apparent on each imaged exposed case side.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture the case image data for each exposed case side of each of the cased goods advanced with the at least one conveyor past the inspection apparatus, so that the case image data captured of each of the cased goods embodies each exposed case side of a respective case exterior.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture case image data of each of the cased goods advanced with the at least one conveyor past the inspection apparatus, so that the case image data embodies the case exterior protrusion with the case exterior protrusion apparent on at least one exposed case side and the at least one exposed case side disposed in each exposed case side orientation of the cased goods.

In accordance with one or more aspects of the disclosed embodiment, the at least one exposed case side imaged by the at least one camera is disposed so that the open case flap, resolved from the case exterior protrusion apparent on the imaged at least one exposed case side extends, from the at least one exposed case side, adjacent a conveyor seat surface on which the cased good is seated.

In accordance with one or more aspects of the disclosed embodiment, the method further comprises:
 providing another imaging system separate and distinct from the at least one camera; and
 with the other imaging system, imaging a different characteristic of the cased goods, advanced with the at least one conveyor past the inspection apparatus, different from physical characteristic of the physical characteristic array.

In accordance with one or more aspects of the disclosed embodiment, the at least one camera captures case image data substantially simultaneously with the other imaging system imaging the different characteristic of the cased goods.

In accordance with one or more aspects of the disclosed embodiment, the method further comprises:
 providing another imaging system separate and distinct from the at least one camera; and
 with the other imaging system, imaging the cased goods, separate and distinct from the at least one camera imaging of the cased goods, for inspection of the cased goods other than detection of the open case flap.

In accordance with one or more aspects of the disclosed embodiment, the other imaging system images the cased goods for processor validation of identity of each of the cased goods and conformity of each of the cased goods with case size parameters for the validated cased good.

In accordance with one or more aspects of the disclosed embodiment, the processor is configured so that cased goods inspection based on cased good images from the other imaging system is resolved separate and distinct from resolving the open case flap from the case image data of the at least one camera.

In accordance with one or more aspects of the disclosed embodiment, the processor is configured so as to determine a presence of the case exterior protrusion from imaging of the other imaging system separate and distinct from the case image data captured with the at least one camera, and resolve the case exterior protrusion as being an open case flap from the case image data of the at least one camera separate and distinct from images of the other imaging system.

In accordance with one or more aspects of the disclosed embodiment, the processor is configured so as to determine a presence of the case exterior protrusion from the case image data captured by the at least one camera, independent of the images of the cased good captured by the other imaging system.

In accordance with one or more aspects of the disclosed embodiment, a method for inspection of cased goods is provided. The method comprising:
 advancing, with at least one conveyor, the cased goods past an inspection apparatus;
 capturing, with at least one camera, case image data of each of the cased goods advanced with the at least one conveyor past the inspection apparatus;
 providing a processor operably coupled to the at least one conveyor, and communicably coupled to the at least one camera to receive the case image data from the at least one camera, and with the processor:
 characterizing, from the case image data, a case exterior protrusion of the cased good that is an open case flap;
 resolving the case image data and determine the case exterior protrusion is a coherent planar surface; and
 generating from the case image data, for each coherent planar surface determined, a physical characteristic array of physical characteristics of the coherent planar surface so that the physical characteristic array describes the coherent planar surface as a case flap and determines, based on a parameter array of parameter physical characteristics, that the case flap is in an open flap condition.

In accordance with one or more aspects of the disclosed embodiment, the parameter array of parameter physical characteristics describe case flap coherency attributes determinative of the coherent planar surface defining the open case flap condition.

In accordance with one or more aspects of the disclosed embodiment, the at least one camera is arranged to image each exposed case side of each of the cased goods advanced with the at least one conveyor past the inspection apparatus so as to image the case exterior protrusion apparent on each imaged exposed case side.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture the case image data for each exposed case side of each of the cased goods advanced with the at least one conveyor past the inspection apparatus, so that the case image data captured of each of the cased goods embodies each exposed case side of a respective case exterior.

In accordance with one or more aspects of the disclosed embodiment, the imaged exposed case side is disposed so that the open case flap, resolved from the case exterior protrusion apparent on the imaged exposed case side extends, from the exposed case side, adjacent a conveyor seat surface on which the cased good is seated.

In accordance with one or more aspects of the disclosed embodiment, the at least one camera is arranged to capture case image data of each of the cased goods advanced with the at least one conveyor past the inspection apparatus, so that the case image data embodies the case exterior protrusion with the case exterior protrusion apparent on at least one exposed case side and the at least one exposed case side disposed in each exposed case side orientation of the cased goods.

In accordance with one or more aspects of the disclosed embodiment, the at least one exposed case side imaged by the at least one camera is disposed so that the open case flap, resolved from the case exterior protrusion apparent on the imaged at least one exposed case side extends, from the at least one exposed case side, adjacent a conveyor seat surface on which the cased good is seated.

In accordance with one or more aspects of the disclosed embodiment, the method further comprises:
  providing another imaging system separate and distinct from the at least one camera; and
  with the other imaging system, imaging a different characteristic of the cased goods, advanced with the at least one conveyor past the inspection apparatus, different from physical characteristic of the physical characteristic array.

In accordance with one or more aspects of the disclosed embodiment, the at least one camera captures case image data substantially simultaneously with the other imaging system imaging the different characteristic of the cased goods.

In accordance with one or more aspects of the disclosed embodiment, the method further comprises:
  providing another imaging system separate and distinct from the at least one camera; and
  with the other imaging system, imaging the cased goods, separate and distinct from the at least one camera imaging of the cased goods, for inspection of the cased goods other than detection of the open case flap.

In accordance with one or more aspects of the disclosed embodiment, the other imaging system images the cased goods for processor validation of identity of each of the cased goods and conformity of each of the cased goods with case size parameters for the validated cased good.

In accordance with one or more aspects of the disclosed embodiment, the processor is configured so that cased goods inspection based on cased good images from the other imaging system is resolved separate and distinct from resolving the open case flap from the case image data of the at least one camera.

In accordance with one or more aspects of the disclosed embodiment, the processor is configured so as to determine a presence of the case exterior protrusion from imaging of the other imaging system separate and distinct from the case image data captured with the at least one camera, and resolve the case exterior protrusion as being an open case flap from the case image data of the at least one camera separate and distinct from images of the other imaging system.

In accordance with one or more aspects of the disclosed embodiment, the processor is configured so as to determine a presence of the case exterior protrusion from the case image data captured by the at least one camera, independent of the images of the cased good captured by the other imaging system.

In accordance with one or more aspects of the disclosed embodiment, an inspection apparatus for inspection of cased goods is provided. The inspection apparatus comprising:
  at least one conveyor configured to advance the cased goods past the inspection apparatus;
  at least one camera arranged to capture case image data of each of the cased goods advanced with the at least one conveyor past the inspection apparatus;
  a processor operably coupled to the at least one conveyor, and communicably coupled to the at least one camera to receive the case image data from the at least one camera; and
  wherein the processor is configured to characterize, from the case image data generated from a common image of the cased goods captured by the at least one camera, at least one of a case side concavity and a case exterior protrusion of the cased goods as a case flap in open condition.

In accordance with one or more aspects of the disclosed embodiment, the processor is configured to resolve the case image data and determine the case exterior protrusion is a coherent planar surface, and is programmed with a parameter array of physical characteristic parameters that describe case flap coherency attributes determinative of the coherent planar surface defining an open case flap condition.

In accordance with one or more aspects of the disclosed embodiment, the processor is configured to generate from the case image data, for each coherent planar surface determined, a physical characteristic array and apply the parameter array to the physical characteristic array so as to resolve the coherent planar surface as being an open case flap.

In accordance with one or more aspects of the disclosed embodiment, the at least one camera is arranged to image each exposed case side of each cased goods advanced with the at least one conveyor past the apparatus so as to image, from the common image of each imaged case side, the at least one of the case side concavity and the case exterior protrusion apparent on each imaged case side.

In accordance with one or more aspects of the disclosed embodiment, the at least one camera is arranged to capture the case image data of each of the cased goods advanced with the at least one conveyor past the inspection apparatus, so that the case image data embodies the at least one of the case side concavity and the case exterior protrusion with the at least one of the case side concavity and the case exterior protrusion apparent on at least one exposed case side and the at least one exposed case side is disposed in each exposed case side orientation of the cased goods.

In accordance with one or more aspects of the disclosed embodiment, the at least one exposed case side imaged by the at least one camera is disposed so that the at least one of the case side concavity and the case flap in the open condition, resolved from the at least one of the case side concavity and the case exterior protrusion apparent on the imaged at least one exposed case side extends, from the at least one exposed case side, adjacent a conveyor seat surface on which the cased goods is seated.

In accordance with one or more aspects of the disclosed embodiment, the inspection apparatus further comprises another imaging system separate and distinct from the at least one camera, and the other imaging system images the cased goods, separate and distinct from the at least one camera imaging of the cased goods, for inspection of the cased goods other than detection of the at least one of the case side concavity and the case open flap.

In accordance with one or more aspects of the disclosed embodiment, the other imaging system images the cased goods for processor validation of identity of each of the cased goods and conformity of each of the cased goods with case size parameters for the validated cased goods.

In accordance with one or more aspects of the disclosed embodiment, the processor is configured so that the cased goods inspection based on cased goods images from the other imaging system is resolved separate and distinct from resolving the at least one of the case side concavity and the case open flap from the case image data of the at least one camera.

In accordance with one or more aspects of the disclosed embodiment, the processor is configured so as to determine a presence of the at least one of the case side concavity and the case exterior protrusion of the cased goods from imaging of the other imaging system separate and distinct from the case image data captured with the at least one camera, and resolve the at least one of the case side concavity and the case exterior protrusion as being a respective case concavity and case open flap from the case image data of the at least camera separate and distinct from images of the other imaging system.

In accordance with one or more aspects of the disclosed embodiment, the processor is configured so as to determine a presence of the at least one of the case side concavity and the case exterior protrusion of the cased goods from the case image data captured by the at least one camera, independent of the images of the cased goods captured by the other imaging system.

In accordance with one or more aspects of the disclosed embodiment, an inspection apparatus for inspection of cased goods is provided. The inspection apparatus comprising:
at least one conveyor configured to advance the cased goods past the inspection apparatus;
at least one camera arranged to capture case image data of each of the cased goods advanced with the at least one conveyor past the inspection apparatus;
a processor operably coupled to the at least one conveyor, and communicably coupled to the at least one camera to receive the case image data from the at least one camera, wherein:
the processor is configured to characterize, from the case image data of the cased goods captured by the at least one camera, of at least one case top or at least one case side with a concavity condition, wherein the processor is programmed to resolve, from the image data, an inward variance of the at least one case top or the at least one case side from predetermined planar coherence characteristics of the case top or case side; and
the processor is configured to determine, from the image data, for each resolved inward variance presence a physical characteristic describing the concavity condition of the at least one case top or the at least one case side.

In accordance with one or more aspects of the disclosed embodiment, the processor is configured to resolve the case image data and determine the at least one case top or the at least one case side has an inward variance, and is programmed with a parameter array of physical characteristic parameters that describe inward variance attributes determinative of the inward variance defining the concavity condition.

In accordance with one or more aspects of the disclosed embodiment, the processor is configured to generate from the case image data, for each inward variance determined, a physical characteristic array and apply the parameter array to the physical characteristic array so as to resolve the inward variance as being the concavity condition.

In accordance with one or more aspects of the disclosed embodiment, the at least one camera is arranged to image each exposed case side of each cased goods advanced with the at least one conveyor past the inspection apparatus so as to image, from the common image of each imaged case side, the concavity condition apparent on each imaged case side.

In accordance with one or more aspects of the disclosed embodiment, the at least one camera is arranged to capture the case image data of each of the cased goods advanced with the at least one conveyor past the inspection apparatus, so that the case image data embodies the concavity condition with the concavity condition apparent on at least one exposed case side and the at least one exposed case side is disposed in each exposed case side orientation of the cased goods.

In accordance with one or more aspects of the disclosed embodiment, the at least one exposed case side imaged by the at least one camera is disposed so that the concavity condition, resolved from the concavity condition apparent on the imaged at least one exposed case side extends, from the at least one exposed case side, adjacent a conveyor seat surface on which the cased goods is seated.

In accordance with one or more aspects of the disclosed embodiment, the inspection apparatus further comprises another imaging system separate and distinct from the at least one camera, and the other imaging system images the cased goods, separate and distinct from the at least one camera imaging of the cased goods, for inspection of the cased goods other than detection of the concavity condition.

In accordance with one or more aspects of the disclosed embodiment, the other imaging system images the cased goods for processor validation of identity of each of the cased goods and conformity of each of the cased goods with case size parameters for the validated cased goods.

In accordance with one or more aspects of the disclosed embodiment, the processor is configured so that the cased goods inspection based on cased goods images from the other imaging system is resolved separate and distinct from resolving the concavity condition from the case image data of the at least one camera.

In accordance with one or more aspects of the disclosed embodiment, the processor is configured so as to determine a presence of the concavity condition cased goods from imaging of the other imaging system separate and distinct from the case image data captured with the at least one camera, and resolve the concavity condition as being a case concavity from the case image data of the at least camera separate and distinct from images of the other imaging system.

In accordance with one or more aspects of the disclosed embodiment, the processor is configured so as to determine a presence of the concavity condition cased goods from the case image data captured by the at least one camera, independent of the images of the cased goods captured by the other imaging system.

In accordance with one or more aspects of the disclosed embodiment, an inbound conveyor system for induction of cased goods in a logistics facility is provided. The system comprising:
at least one conveyor configured to advance cased goods into the logistics facility;
a case inspection station, disposed in communication with the at least one conveyor so that cased goods advance past the case inspection station, the case inspection station having at least one case inspection camera configured so as to capture an image of a shadow of each of the cased goods advanced past the case inspection station;

at least another camera, connected to the case inspection station, separate and distinct from the at least one case inspection camera, and arranged to capture other case image data of each of the cased goods, advanced past the case inspection station, than case image data captured by the at least one case inspection camera; and a processor operably coupled to the at least one conveyor, communicably coupled to the at least one case inspection camera, to receive the case image data from the at least one case inspection camera, and communicably coupled to the at least another camera, to receive the other case image data of each of the cased goods from the at least another camera, wherein the processor is configured to determine from the image of the shadow of each of the cased goods, imaged by the at least one case inspection camera, a predetermined characteristic of each of the cased goods dispositive of case form confirming a respective cased good has a case shape, and wherein the processor is configured that upon confirming the respective cased good has the case shape, determining from the other image data conformance of the respective cased good with a predetermined case form fit characteristic.

In accordance with one or more aspects of the disclosed embodiment, the predetermined case form fit characteristic informs fit up acceptance of the respective cased good within a predetermined fit up space or location of a storage array of the logistics facility.

In accordance with one or more aspects of the disclosed embodiment, the predetermined fit up space or location is a pallet load build location in a pallet build formed in the logistics facility.

In accordance with one or more aspects of the disclosed embodiment, the predetermined case form fit characteristic is an inward bulge or concavity, relative to a planar case side, of at least one side of the case shape of the respective cased goods.

In accordance with one or more aspects of the disclosed embodiment, the predetermined characteristic of each of the cased goods dispositive of case form includes one or more of a case length, case width, case height, inclusive angle between case sides, a box dimension.

In accordance with one or more aspects of the disclosed embodiment, processor includes:

an image acquisition component configured to acquire more than one digitized image from the case inspection station for each of the cased goods advanced past the case inspection station; and an image combiner configured to selectively combine a number of acquired digitized images, different than the more than one digitized image, into a combined image based on sustained input beam spatial intensity reduction below a first threshold over a duration of the more than one of the acquired digitized images.

In accordance with one or more aspects of the disclosed embodiment, the processor is configured to ascertain presence of the cased good based on sustained input beam spatial intensity reduction below a second threshold discriminating presence of translucent shrink wrap disposed on product in the cased good.

In accordance with one or more aspects of the disclosed embodiment, the image combiner is configured to selectively combine acquired digitized images into a potential product combined image where a number of pixels digitized in an image having a reduced intensity below the first predetermined threshold define an image width greater than a second threshold.

In accordance with one or more aspects of the disclosed embodiment, the image combiner is configured to selectively combine acquired digitized images into forming the combined image where a number of pixels digitized across sequential images having reduced intensity below the first predetermined threshold and a second threshold represent a predetermined combined image length.

In accordance with one or more aspects of the disclosed embodiment, the at least one conveyor is configured to advance the cased goods at a rate of advance, the image acquisition component being configured to acquire the digitized images at an acquisition rate proportional to the rate of advance of the cased goods.

In accordance with one or more aspects of the disclosed embodiment, the image acquisition rate is synchronized by using an encoder or by a stepper motor drive circuit.

In accordance with one or more aspects of the disclosed embodiment, the image acquisition component comprises an image cache storage.

In accordance with one or more aspects of the disclosed embodiment, the at least one case inspection camera is configured to determine an ambient light intensity from a sample buffer of cached images.

In accordance with one or more aspects of the disclosed embodiment, the processor is configured to determine dimensions from the combined image of: a first shape best fitting in the combined image, a second shape circumscribing the combined image, and differences between the first and second shapes.

In accordance with one or more aspects of the disclosed embodiment, the processor is configured to determine from the combined image an orientation angle of the case of goods with respect to the at least one conveyor.

In accordance with one or more aspects of the disclosed embodiment, the processor is configured to determine from the combined image a distance of the case of goods from one side of the at least one conveyor.

In accordance with one or more aspects of the disclosed embodiment, the case inspection station is configured to identify presence of debris on an input window of the at least one case inspection camera based on common pixels of same intensity across a number of digitized images.

In accordance with one or more aspects of the disclosed embodiment, a method in an inspection apparatus for inspection of cased goods is provided. The method comprising:

advancing, with at least one conveyor, the cased goods past the inspection apparatus;

capturing, with at least one camera, case image data of each of the cased goods advanced with the at least one conveyor past the inspection apparatus; and providing a processor and receiving, with the processor, the case image data from the at least one camera, wherein the processor operably coupled to the at least one conveyor and is communicably coupled to the at least one camera, and the processor is configured to characterize, from the case image data generated from a common image of the cased goods captured by the at least one camera, at least one of a case side concavity and a case exterior protrusion of the cased goods as a case flap in open condition.

In accordance with one or more aspects of the disclosed embodiment, the processor resolves the case image data and determines the case exterior protrusion is a coherent planar surface, the processor being programmed with a parameter array of physical characteristic parameters that describe case flap coherency attributes determinative of the coherent planar surface defining an open case flap condition.

In accordance with one or more aspects of the disclosed embodiment, the processor generates from the case image data, for each coherent planar surface determined, a physical characteristic array and applies the parameter array to the physical characteristic array so as to resolve the coherent planar surface as being an open case flap.

In accordance with one or more aspects of the disclosed embodiment, the at least one camera is arranged to image each exposed case side of each cased goods advanced with the at least one conveyor past the apparatus so as to image, from the common image of each imaged case side, the at least one of the case side concavity and the case exterior protrusion apparent on each imaged case side.

In accordance with one or more aspects of the disclosed embodiment, the at least one camera is arranged to capture the case image data of each of the cased goods advanced with the at least one conveyor past the inspection apparatus, so that the case image data embodies the at least one of the case side concavity and the case exterior protrusion with the at least one of the case side concavity and the case exterior protrusion apparent on at least one exposed case side and the at least one exposed case side is disposed in each exposed case side orientation of the cased goods.

In accordance with one or more aspects of the disclosed embodiment, the at least one exposed case side imaged by the at least one camera is disposed so that the at least one of the case side concavity and the case flap in the open condition, resolved from the at least one of the case side concavity and the case exterior protrusion apparent on the imaged at least one exposed case side extends, from the at least one exposed case side, adjacent a conveyor seat surface on which the cased goods is seated.

In accordance with one or more aspects of the disclosed embodiment, the method further comprises, with another imaging system separate and distinct from the at least one camera, imaging the cased goods, separate and distinct from the at least one camera imaging of the cased goods, for inspection of the cased goods other than detection of the at least one of the case side concavity and the case open flap.

In accordance with one or more aspects of the disclosed embodiment, the other imaging system images the cased goods for processor validation of identity of each of the cased goods and conformity of each of the cased goods with case size parameters for the validated cased goods.

In accordance with one or more aspects of the disclosed embodiment, the processor is configured so that the cased goods inspection based on cased goods images from the other imaging system is resolved separate and distinct from resolving the at least one of the case side concavity and the case open flap from the case image data of the at least one camera.

In accordance with one or more aspects of the disclosed embodiment, the processor determines a presence of the at least one of the case side concavity and the case exterior protrusion of the cased goods from imaging of the other imaging system separate and distinct from the case image data captured with the at least one camera, and resolves the at least one of the case side concavity and the case exterior protrusion as being a respective case concavity and case open flap from the case image data of the at least camera separate and distinct from images of the other imaging system.

In accordance with one or more aspects of the disclosed embodiment, the processor determines a presence of the at least one of the case side concavity and the case exterior protrusion of the cased goods from the case image data captured by the at least one camera, independent of the images of the cased goods captured by the other imaging system.

While some reference is made herein to a "vision system", the aspects of the disclosed embodiment are not limited to any single nor to any combination of camera systems operating in the millimeter wave, Infra Red, visual, microwave, X-ray, gamma ray, etc. spectra. While a composite camera can be employed, separate spectrum specific cameras can also be employed severally or in combination. Any reference to cased goods comprising food stuffs (or other contents) is incidental and not intended to limit the scope of any claims appended hereto.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An inspection apparatus for inspection of cased goods, the inspection apparatus comprising:
    at least one conveyor configured to advance the cased goods past the inspection apparatus;
    at least one camera arranged to capture case image data of each of the cased goods advanced with the at least one conveyor past the inspection apparatus;
    a processor operably coupled to the at least one conveyor, and communicably coupled to the at least one camera to receive the case image data from the at least one camera; and
    wherein the processor is configured to characterize, from the case image data generated from a common image of the cased goods captured by the at least one camera, at least one of a case side concavity and a case exterior protrusion of the cased goods as a case flap in open condition.

2. The inspection apparatus of claim 1, wherein the processor is configured to resolve the case image data and determine the case exterior protrusion is a coherent planar surface, and is programmed with a parameter array of physical characteristic parameters that describe case flap coherency attributes determinative of the coherent planar surface defining an open case flap condition.

3. The inspection apparatus of claim 2, wherein the processor is configured to generate from the case image data, for each coherent planar surface determined, a physical characteristic array and apply the parameter array to the physical characteristic array so as to resolve the coherent planar surface as being an open case flap.

4. The inspection apparatus of claim 1, wherein the at least one camera is arranged to image each exposed case side of each cased goods advanced with the at least one conveyor past the apparatus so as to image, from the common image of each imaged case side, the at least one of the case side concavity and the case exterior protrusion apparent on each imaged case side.

5. The inspection apparatus of claim 1, wherein the at least one camera is arranged to capture the case image data of each of the cased goods advanced with the at least one conveyor past the inspection apparatus, so that the case image data embodies the at least one of the case side concavity and the case exterior protrusion with the at least one of the case side concavity and the case exterior protrusion apparent on at least one exposed case side and the at least one exposed case side is disposed in each exposed case side orientation of the cased goods.

6. The inspection apparatus of claim 5, wherein the at least one exposed case side imaged by the at least one camera is disposed so that the at least one of the case side concavity and the case flap in the open condition, resolved from the at least one of the case side concavity and the case exterior protrusion apparent on the imaged at least one exposed case side extends, from the at least one exposed case side, adjacent a conveyor seat surface on which the cased goods is seated.

7. The inspection apparatus of claim 1, further comprising another imaging system separate and distinct from the at least one camera, and the other imaging system images the cased goods, separate and distinct from the at least one camera imaging of the cased goods, for inspection of the cased goods other than detection of the at least one of the case side concavity and the case open flap.

8. The inspection apparatus of claim 7, wherein the other imaging system images the cased goods for processor validation of identity of each of the cased goods and conformity of each of the cased goods with case size parameters for the validated cased goods.

9. The inspection apparatus of claim 7, wherein the processor is configured so that the cased goods inspection based on cased goods images from the other imaging system is resolved separate and distinct from resolving the at least one of the case side concavity and the case open flap from the case image data of the at least one camera.

10. The inspection apparatus of claim 7, wherein the processor is configured so as to determine a presence of the at least one of the case side concavity and the case exterior protrusion of the cased goods from imaging of the other imaging system separate and distinct from the case image data captured with the at least one camera, and resolve the at least one of the case side concavity and the case exterior protrusion as being a respective case concavity and case open flap from the case image data of the at least camera separate and distinct from images of the other imaging system.

11. An inspection apparatus for inspection of cased goods, the inspection apparatus comprising:
at least one conveyor configured to advance the cased goods past the inspection apparatus;
at least one camera arranged to capture case image data of each of the cased goods advanced with the at least one conveyor past the inspection apparatus;
a processor operably coupled to the at least one conveyor, and communicably coupled to the at least one camera to receive the case image data from the at least one camera,
wherein:
the processor is configured to characterize, from the case image data of the cased goods captured by the at least one camera, of at least one case top or at least one case side with a concavity condition, wherein the processor is programmed to resolve, from the image data, an inward variance of the at least one case top or the at least one case side from predetermined planar coherence characteristics of the case top or case side; and
the processor is configured to determine, from the image data, for each resolved inward variance presence a physical characteristic describing the concavity condition of the at least one case top or the at least one case side.

12. The inspection apparatus of claim 11, wherein the processor is configured to resolve the case image data and determine the at least one case top or the at least one case side has an inward variance, and is programmed with a parameter array of physical characteristic parameters that describe inward variance attributes determinative of the inward variance defining the concavity condition.

13. The inspection apparatus of claim 12, wherein the processor is configured to generate from the case image data, for each inward variance determined, a physical characteristic array and apply the parameter array to the physical characteristic array so as to resolve the inward variance as being the concavity condition.

14. The inspection apparatus of claim 11, wherein the at least one camera is arranged to image each exposed case side of each cased goods advanced with the at least one conveyor past the inspection apparatus so as to image, from the common image of each imaged case side, the concavity condition apparent on each imaged case side.

15. The inspection apparatus of claim 11, wherein the at least one camera is arranged to capture the case image data of each of the cased goods advanced with the at least one conveyor past the inspection apparatus, so that the case image data embodies the concavity condition with the concavity condition apparent on at least one exposed case side and the at least one exposed case side is disposed in each exposed case side orientation of the cased goods.

16. The inspection apparatus of claim 11, further comprising another imaging system separate and distinct from the at least one camera, and the other imaging system images the cased goods, separate and distinct from the at least one camera imaging of the cased goods, for inspection of the cased goods other than detection of the concavity condition.

17. An inbound conveyor system for induction of cased goods in a logistics facility, the system comprising:
at least one conveyor configured to advance cased goods into the logistics facility;
a case inspection station, disposed in communication with the at least one conveyor so that cased goods advance past the case inspection station, the case inspection station having at least one case inspection camera configured so as to capture an image of a shadow of each of the cased goods advanced past the case inspection station;
at least another camera, connected to the case inspection station, separate and distinct from the at least one case inspection camera, and arranged to capture other case image data of each of the cased goods, advanced past the case inspection station, than case image data captured by the at least one case inspection camera; and
a processor operably coupled to the at least one conveyor, communicably coupled to the at least one case inspection camera, to receive the case image data from the at least one case inspection camera, and communicably coupled to the at least another camera, to receive the other case image data of each of the cased goods from the at least another camera, wherein the processor is configured to determine from the image of the shadow of each of the cased goods, imaged by the at least one case inspection camera, a predetermined characteristic of each of the cased goods dispositive of case form confirming a respective cased good has a case shape, and wherein the processor is configured that upon confirming the respective cased good has the case shape, determining from the other image data conformance of the respective cased good with a predetermined case form fit characteristic.

18. The inbound conveyor system of claim 17, wherein the predetermined case form fit characteristic informs fit up acceptance of the respective cased good within a predetermined fit up space or location of a storage array of the logistics facility.

19. The inbound conveyor system of claim 17, wherein the predetermined case form fit characteristic is an inward bulge or concavity, relative to a planar case side, of at least one side of the case shape of the respective cased goods.

20. A method in an inspection apparatus for inspection of cased goods, the method comprising:

advancing, with at least one conveyor, the cased goods past the inspection apparatus;

capturing, with at least one camera, case image data of each of the cased goods advanced with the at least one conveyor past the inspection apparatus; and providing a processor and receiving, with the processor, the case image data from the at least one camera, wherein the processor operably coupled to the at least one conveyor and is communicably coupled to the at least one camera, and the processor is configured to characterize, from the case image data generated from a common image of the cased goods captured by the at least one camera, at least one of a case side concavity and a case exterior protrusion of the cased goods as a case flap in open condition.

21. The method of claim 20, wherein the processor resolves the case image data and determines the case exterior protrusion is a coherent planar surface, the processor being programmed with a parameter array of physical characteristic parameters that describe case flap coherency attributes determinative of the coherent planar surface defining an open case flap condition.

22. The method of claim 20, wherein the at least one camera is arranged to image each exposed case side of each cased goods advanced with the at least one conveyor past the apparatus so as to image, from the common image of each imaged case side, the at least one of the case side concavity and the case exterior protrusion apparent on each imaged case side.

23. The method of claim 20, wherein the at least one camera is arranged to capture the case image data of each of the cased goods advanced with the at least one conveyor past the inspection apparatus, so that the case image data embodies the at least one of the case side concavity and the case exterior protrusion with the at least one of the case side concavity and the case exterior protrusion apparent on at least one exposed case side and the at least one exposed case side is disposed in each exposed case side orientation of the cased goods.

24. The method of claim 20, further comprising, with another imaging system separate and distinct from the at least one camera, imaging the cased goods, separate and distinct from the at least one camera imaging of the cased goods, for inspection of the cased goods other than detection of the at least one of the case side concavity and the case open flap.

* * * * *